(12) United States Patent  
Petersen et al.

(10) Patent No.: US 9,223,336 B2
(45) Date of Patent: Dec. 29, 2015

(54) REMOTE SOCKET APPARATUS

(75) Inventors: Kurt H. Petersen, Austin, TX (US); Paul H. Benson, Austin, TX (US); Stephen Paul LeBlanc, Austin, TX (US); Laylonie L. Le Van-Etter, Round Rock, TX (US); Curtis L. Shoemaker, Round Rock, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 808 days.

(21) Appl. No.: 13/473,108

(22) Filed: May 16, 2012

(65) Prior Publication Data

US 2012/0295486 A1 Nov. 22, 2012

Related U.S. Application Data

(60) Provisional application No. 61/486,883, filed on May 17, 2011.

(51) Int. Cl.
| | |
|---|---|
| *G02B 6/00* | (2006.01) |
| *G06F 1/00* | (2006.01) |
| *H04L 12/00* | (2006.01) |
| *G02B 6/44* | (2006.01) |
| *H02G 3/00* | (2006.01) |
| *H02G 3/30* | (2006.01) |
| *H04Q 11/00* | (2006.01) |

(52) U.S. Cl.
CPC ............... *G06F 1/00* (2013.01); *G02B 6/4448* (2013.01); *G02B 6/4466* (2013.01); *H02G 3/00* (2013.01); *H02G 3/305* (2013.01); *H04L 12/00* (2013.01); *G02B 6/445* (2013.01); *H04Q 11/0067* (2013.01)

(58) Field of Classification Search
USPC .............................................. 385/135; 398/45
See application file for complete search history.

(56) References Cited

U.S. PATENT DOCUMENTS

| | | | |
|---|---|---|---|
| 4,875,881 A | 10/1989 | Caveny | |
| 5,033,112 A | 7/1991 | Bowling | |
| 5,096,427 A | 3/1992 | Sadigh-Behzadi | |
| 5,647,045 A | 7/1997 | Robinson | |

(Continued)

FOREIGN PATENT DOCUMENTS

| | | |
|---|---|---|
| CN | 200972903 Y | 11/2007 |
| EP | 1215906 A2 | 6/2002 |

(Continued)

OTHER PUBLICATIONS

International Search Report for PCT/US2012/038124, mailed on Dec. 28, 2012, 3 pp.

(Continued)

*Primary Examiner* — Eric Wong
(74) *Attorney, Agent, or Firm* — Gregg Rosenblatt

(57) ABSTRACT

A remote socket apparatus comprises a socket to receive a remote electronics unit. The socket is configured to house multiple media to connect to remote electronics housed in the remote electronics unit. The socket includes a socket interface configured to mate with a remote electronics unit interface. At least one of the socket and remote electronics unit further includes an actuation mechanism configured to connect the multiple media simultaneously. The remote socket apparatus can be utilized in a network that provides in-building wireless (IBW) communications and in a converged network that also provides wired in-building telecommunications.

38 Claims, 47 Drawing Sheets

(56) References Cited

U.S. PATENT DOCUMENTS

| | | |
|---|---|---|
| 5,676,566 A | 10/1997 | Carlson, Jr. |
| 5,737,475 A | 4/1998 | Regester |
| 5,807,139 A | 9/1998 | Volansky |
| 6,058,235 A | 5/2000 | Hiramatsu |
| 6,086,414 A | 7/2000 | Tipton |
| 6,126,453 A | 10/2000 | Gomez |
| 6,179,476 B1 | 1/2001 | Besler |
| 6,457,874 B1 | 10/2002 | Clapp, Jr. |
| 2,305,886 A1 | 11/2003 | Burris |
| 6,793,524 B2 | 9/2004 | Clark |
| 6,896,547 B2 | 5/2005 | Caveney |
| 6,912,349 B2 | 6/2005 | Clark |
| 7,168,860 B2 | 1/2007 | Kim |
| 7,220,144 B1 | 5/2007 | Elliot |
| 7,227,082 B2 | 6/2007 | Caveney |
| 7,369,738 B2 | 5/2008 | Larson |
| 7,512,304 B2 | 3/2009 | Gronvall |
| 7,590,354 B2 | 9/2009 | Sauer |
| 7,782,202 B2 | 8/2010 | Downie |
| 7,787,823 B2 | 8/2010 | George |
| 7,848,654 B2 | 12/2010 | Sauer |
| 7,905,664 B1 | 3/2011 | Stevens |
| 7,931,505 B2 | 4/2011 | Howard et al. |
| 7,994,436 B2 | 8/2011 | Yamamoto |
| 8,111,998 B2 | 2/2012 | George |
| 8,155,525 B2 | 4/2012 | Cox |
| 8,175,459 B2 | 5/2012 | Thelen |
| 2005/0201711 A1 | 9/2005 | Koh |
| 2007/0116414 A1 | 5/2007 | Penumatcha |
| 2007/0248358 A1 | 10/2007 | Sauer |
| 2007/0286599 A1 | 12/2007 | Sauer |
| 2007/0292137 A1 | 12/2007 | Sauer |
| 2008/0186143 A1 | 8/2008 | George |
| 2008/0247592 A1 | 10/2008 | Kourzanov |
| 2009/0130884 A1 | 5/2009 | Howard |
| 2009/0269014 A1 | 10/2009 | Winberg |
| 2009/0324188 A1 | 12/2009 | Berglund |
| 2010/0054746 A1 | 3/2010 | Logan |
| 2010/0079248 A1 | 4/2010 | Greveling |
| 2010/0243096 A1 | 9/2010 | Berglund |
| 2010/0247052 A1 | 9/2010 | Berglund |
| 2011/0030190 A1 | 2/2011 | Larson |
| 2011/0030832 A1 | 2/2011 | Larson |
| 2011/0249941 A1 | 10/2011 | Allwood |
| 2011/0311226 A1* | 12/2011 | Smith et al. ............ 398/45 |
| 2012/0134666 A1 | 5/2012 | Casterline |

FOREIGN PATENT DOCUMENTS

| | | |
|---|---|---|
| EP | 2068186 A1 | 6/2009 |
| EP | 2253981 A1 | 11/2010 |
| EP | 2308130 | 4/2011 |
| EP | 2400330 A1 | 12/2011 |
| JP | 2007-114314 A | 5/2007 |
| JP | 4262103 B2 | 5/2009 |
| KR | 10-0971811 B1 | 7/2010 |
| WO | WO 2010-089029 | 8/2010 |
| WO | WO 2010-110955 | 9/2010 |
| WO | WO 2011-092060 | 8/2011 |
| WO | WO 2012-041780 | 4/2012 |

OTHER PUBLICATIONS

PCT Appl.No. PCT/US2012/034782, entitled "Horizontal Cabling System for In-Building Applications", filed Apr. 24, 2012.

U.S. Appl. No. 13/454569, entitled "Adhesive-Backed Coaxial Cable," filed Apr. 24, 2012.

Grant Decision for Russian Appl. No. 2013156283, dated Jun. 3, 2015, 7 pp.

Search Report for China Appl. No. 201280024071.4, dated Jun. 3, 2015, 2 pp.

* cited by examiner

REMOTE SOCKET APPARATUS

CROSS-REFERENCE TO RELATED APPLICATION

This application claims the benefit of U.S. Provisional Patent Application No. 61/486,883, filed May 17, 2011, the disclosure of which is incorporated by reference herein in its entirety.

BACKGROUND OF THE INVENTION

1. Field of the Invention

The present invention is directed to a remote socket apparatus. More particularly, the remote socket apparatus can be utilized in a network that provides in-building wireless (IBW) communications and in a converged network that also provides wired in-building telecommunications.

2. Background

Several hundred million multiple dwelling units (MDUs) exist globally, which are inhabited by about one third of the world's population. Due to the large concentration of tenants in one MDU, Fiber-to-the-X ("FTTX") deployments to these structures are more cost effective to service providers than deployments to single-family homes. Connecting existing MDUs to the FTTX network can often be difficult. Challenges can include gaining building access, limited distribution space in riser closets, and space for cable routing and management. Specifically, FTTX deployments within existing structures make it difficult to route cables within the walls or floors, or above the ceiling from a central closet or stairwell, to each living unit.

Conventionally, a service provider installs an enclosure (also known as a fiber distribution terminal (FDT)) on each floor, or every few floors, of an MDU. The FDT connects the building riser cable to the horizontal drop cables which run to each living unit on a floor. Drop cables are spliced or otherwise connected to the riser cable in the FDT only as service is requested from a tenant in a living unit. These service installations require multiple reentries to the enclosure, putting at risk the security and disruption of service to other tenants on the floor. This process also increases the service provider's capital and operating costs, as this type of connection requires the use of an expensive fusion splice machine and highly skilled labor. Routing and splicing individual drop cables can take an excessive amount of time, delaying the number of subscribers a technician can activate in one day, reducing revenues for the service provider. Alternatively, service providers install home run cabling the full extended length from each living unit in an MDU directly to a fiber distribution hub (FDH) in the building vault, therefore encompassing both the horizontal and riser with a single extended drop cable. This approach creates several challenges, including the necessity of first installing a pathway to manage, protect and hide each of the multiple drop cables. This pathway often includes very large (e.g., 2 inch to 4 inch to 6 inch) pre-fabricated crown molding made of wood, composite, or plastic. Many of these pathways, over time, become congested and disorganized, increasing the risk of service disruption due to fiber bends and excessive re-entry.

Better wireless communication coverage is needed to provide the desired bandwidth to an increasing number of customers. Thus, in addition to new deployments of traditional, large "macro" cell sites, there is a need to expand the number of "micro" cell sites (sites within structures, such as office buildings, schools, hospitals, and residential units). In-Building Wireless (IBW) Distributed Antenna Systems (DASs) are utilized to improve wireless coverage within buildings and related structures. Conventional DASs use strategically placed antennas or leaky coaxial cable (leaky coax) throughout a building to accommodate radio frequency (RF) signals in the 300 MHz to 6 GHz frequency range. Conventional RF technologies include TDMA, CDMA, WCDMA, GSM, UMTS, PCS/cellular, iDEN, WiFi, and many others.

Outside the United States, carriers are required by law in some countries to extend wireless coverage inside buildings. In the United States, bandwidth demands and safety concerns will drive IBW applications, particularly as the world moves to current 4G architectures and beyond.

There are a number of known network architectures for distributing wireless communications inside a building. These architectures include choices of passive, active and hybrid systems. Active architectures generally include manipulated RF signals carried over fiber optic cables to remote electronic devices which reconstitute the RF signal and transmit/receive the signal. Passive architectures include components to radiate and receive signals, usually through discrete antennas or a punctured shield leaky coax network. Hybrid architectures include native RF signal carried optically to active signal distribution points which then feed multiple coaxial cables terminating in multiple transmit/receive antennas. Specific examples include analog/amplified RF, RoF (Radio over Fiber), fiber backhaul to pico and femto cells, and RoF vertical or riser distribution with an extensive passive coaxial distribution from a remote unit to the rest of the horizontal cabling (within a floor, for example). These conventional architectures can have limitations in terms of electronic complexity and expense, inability to easily add services, inability to support all combinations of services, distance limitations, or cumbersome installation requirements.

Conventional cabling for IBW applications includes RADIAFLEX™ cabling available from RFS (www.rfsworld.com), standard ½ inch coax for horizontal cabling, ⅞ inch coax for riser cabling, as well as standard optical fiber cabling for riser and horizontal distribution.

Physical and aesthetic challenges exist in providing IBW cabling for different wireless network architectures, especially in older buildings and structures. These challenges include gaining building access, limited distribution space in riser closets, and space for cable routing and management.

SUMMARY

According to an exemplary aspect of the present invention, a remote socket apparatus comprises a socket to receive a remote electronics unit. The socket is configured to house multiple media to connect to remote electronics housed in the remote electronics unit. The socket includes a socket interface configured to mate with a remote electronics unit interface. At least one of the socket and remote electronics unit further includes an actuation mechanism configured to connect the multiple media simultaneously.

In one aspect, the multiple media includes one or more insulated copper wires for providing power to the remote electronics unit, cabling for RF signal distribution, and cabling for RF signal transmission to antennas. In another aspect, the cabling for RF signal transmission to antennas comprises at least one of one or more coaxial cables, one or more twin-axial cables and one or more twin lead cables. In another aspect, the cabling for RF signal distribution comprises at least one of one or more optical fibers, one or more twisted pair wires, and one or more coaxial cables. In another aspect, the cabling for RF signal distribution is provided from horizontal cabling accessed at the socket location.

In another aspect, the socket is mounted overtop the horizontal cabling.

In another aspect, the actuation mechanism connects the multiple media simultaneously in a single action.

In another aspect, the socket includes a cover and a generally planar support plate that is mountable to a wall.

In another aspect, the actuation mechanism is disposed in the socket and comprises a pivoting support bar structure coupled to extendable guide rails configured to engage the remote electronics unit interface. In another aspect, the actuation mechanism lowers the extendable guide rails when the support bar structure is moved away from the support plate. In another aspect, the actuation mechanism raises the extendable guide rails when the support bar structure is moved towards the support plate. In another aspect, the actuation mechanism lowers the extendable guide rails when pivoting arms disposed opposite one another are pulled in a direction apart from each other in a plane parallel to the support plate.

In another aspect, the actuation mechanism raises the extendable guide rails when pivoting arms disposed opposite one another are pushed in a direction toward each other in a plane parallel to the support plate.

In another aspect, the remote socket apparatus also includes a slack storage structure supported by the actuation mechanism, the slack storage structure being configured to store and route excess lengths of optical fibers. In another aspect, the slack storage structure comprises a plurality of slack storage reels supported on a rotatable frame.

In another aspect, the socket interface comprises a multi-piece structure that includes an interface body supported by an interface backbone, the interface body having a plurality of ports to receive multiple media connectors. In another aspect, the interface body is formed from a molded plastic and the interface backbone is formed from a metal. In another aspect, the interface body includes at least one coaxial connector having a coaxial cable coupled to a distributed RF antenna.

In another aspect, the coaxial cable comprises an adhesive-backed cable.

In another aspect, the one or more copper wires are coupled to horizontal cabling via a power tap and one or more power connectors disposed on the socket interface.

In another aspect, the cabling for RF signal distribution comprises a plurality of optical fibers, the optical fibers being terminated via field terminated optical connectors.

In another aspect, the field terminated optical connectors comprise LC connectors disposed in an LC connector adapter mounted in the socket interface.

In another aspect, the LC connector adapter is secured to the interface via lead-in mount members having a tapered construction for guiding approaching LC connectors into the LC connector adapter during a connection process.

In another aspect, at least one of the socket interface and the remote electronics unit interface includes a small, pluggable optical-to-electrical transceiver, such as a small form factor pluggable (SFP) module to receive optical fiber connectors.

In another aspect, the remote electronics unit comprises a remote radio circuit for wireless signal distribution. In another aspect, the remote electronics unit comprises one of a wireless access point for Wi-Fi transmission and a low power wireless sensor.

In another aspect, the remote electronics unit interface comprises a multi-piece structure that includes an interface body supported by an interface backbone, the interface body having a plurality of ports to receive multiple media connectors. In another aspect, the interface body is formed from a molded plastic and the interface backbone is formed from a metal.

In another aspect, the remote electronics unit interface comprises engagement slots located near edges of the remote electronics unit interface, with each engagement slot configured to receive an engagement pin disposed on an end of the extendable guide rail.

In another aspect, the remote electronics unit comprises a remote electronics unit cover to enclose the remote electronics unit, the remote electronics unit cover including a plurality of vents to permit air passage in and out of the remote electronics unit. In another aspect, the remote electronics unit comprises a support plate to support the remote electronics.

In another aspect, guide fingers extend from a top portion of the remote electronics unit support plate to provide an installer with a gross alignment prior to actuating a connection.

In another aspect, the actuation mechanism is disposed in the remote electronics unit.

In another aspect, the actuation mechanism comprises a folding arm structure coupled to extending guide rails configured to engage the socket interface.

In another aspect, when the remote electronics unit interface is fully connected to the socket interface, the remote radio circuit is connected to one or more distributed RF antennas, one or more RF signal carriers, and one or more power lines.

In another aspect, the remote socket apparatus further comprises a central guide pin disposed in a central portion of the socket interface, the central guide pin configured to be received by a central guide port formed in the remote electronics unit interface. The central guide pin is configured to prevent a sideways slide of the interfaces with respect to each other during connection.

According to another exemplary aspect of the present invention, a socket for receiving a remote electronics unit having a remote electronics unit interface comprises a socket interface having a plurality of ports to receive a plurality of connectors that accommodate different types of media. The socket also includes means for supporting the socket interface in the socket. The socket also includes means for connecting the multiple connectors disposed in the socket interface to corresponding connectors disposed in the remote electronics unit interface simultaneously in a single action.

In another aspect, the socket contains an integrated antenna that transmits or receives wireless signals.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

Figure 1:
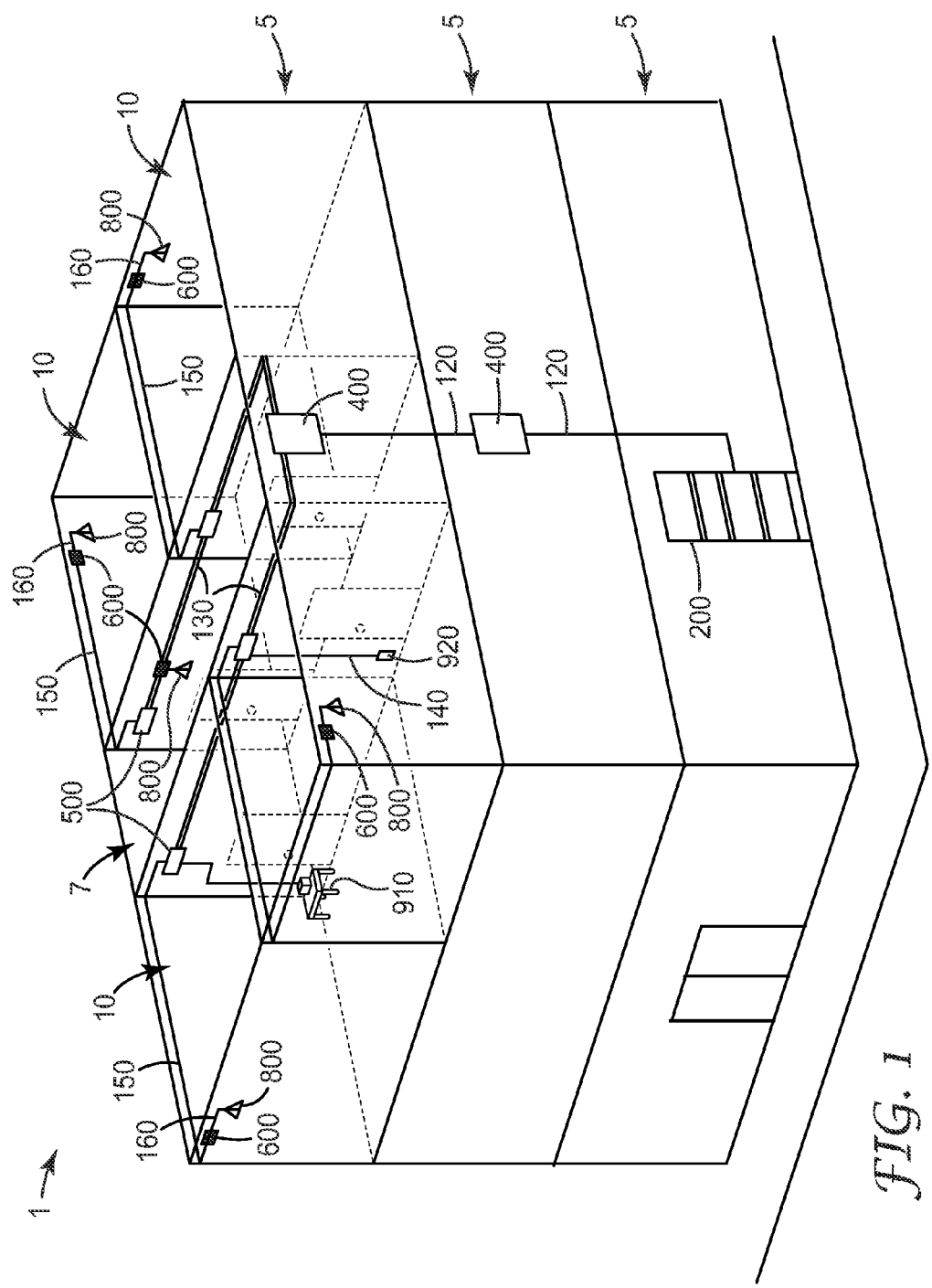
FIG. 1 shows a schematic view of an exemplary MDU having a converged in-building network installed therein according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention is directed to a remote socket apparatus for use in a converged in-building network. More particularly, the network described herein is a combined network solution to provide wired in-building telecommunications as well as an in-building wireless (IBW) network. The network described herein is a modular system which includes a variety of nodes which are interconnected by a ducted horizontal cabling. The remote socket apparatus may also be used in a network that only provides for wireless communications.

The horizontal cabling solutions provide signal pathways that can include standard radio frequency (RF) signal pathways for coaxial (coax) cables, copper communication lines such as twisted pair copper wires, optical fiber, and/or power distribution cabling which serve both the in-building wireless network and the FTTX network for data and communication transfers. The horizontal cabling can be adhesive-backed to allow installation on existing wall or ceiling surfaces reducing the need for drilling holes, feeding cables through walls and/or otherwise damaging existing structures. The horizontal cabling has a low impact profile for better aesthetics while still providing multiple channels of RF/cellular, twisted pair copper wires, and fiber optic fed data traffic to be distributed, enabling flexible network design and optimization for a given indoor environment.

FIG. 1 shows an exemplary multi-dwelling unit (MDU) 1 having an exemplary converged network solution installed therein. The MDU includes four living units 10 on each floor 5 within the building with two living units located on either side of a central hallway 7.

A feeder cable (not shown) brings wired communications lines to and from building (e.g. MDU 1) from the traditional communication network and coax feeds bring the RF or wireless signals into the building from nearby wireless towers or base stations. All of the incoming lines (e.g. optical fiber, coax, and traditional copper) are fed into a main distribution facility or main distribution rack 200 in the basement or equipment closet of the MDU. The main distribution rack 200 organizes the signals coming into the building from external networks to the centralized active equipment for the in building converged network. Power mains and backup power can also be distributed through the main distribution rack. Additionally, fiber and power cable management, which supports the converged network, and manages the cables carrying the signals both into the building from the outside plant and onto the rest of the indoor network can be located in the main distribution facility. The main distribution rack(s) 200 can hold one or more equipment chassis as well as telecommunication cable management modules. Exemplary equipment which can be located on the rack in the main distribution facility can include, for example, a plurality of RF signal sources, an RF conditioning drawer, a primary distributed antenna system (DAS) hub, a power distribution equipment, and DAS remote management equipment. Exemplary telecommunication cable management modules can include, for example, a fiber distribution hub, a fiber distribution terminal or a patch panel.

Riser cables or trunk cables 120 run from the main distribution rack 200 in the main distribution facility to the area junction boxes 400 located on each floor 5 of the MDU 1. The area junction box provides the capability to aggregate horizontal fiber runs and optional power cabling on each floor. At the area junction box, trunked cabling is broken out to a number of cabling structures containing optical fibers or other communication cables and/or power cables which are distributed within the MDU by horizontal cabling 130 described above. These cabling structures can utilize the adhesive-backed cabling duct designs described herein. A point of entry box 500 is located in the central hallway at each living unit to split off power and communication cables from the horizontal cabling 130 to be used within the living unit.

A remote socket 600 can be disposed over horizontal cabling 130 in hallway 7 and can be connected to a distributed antenna 800 to ensure a strong wireless signal in the hallway.

Figure 2:
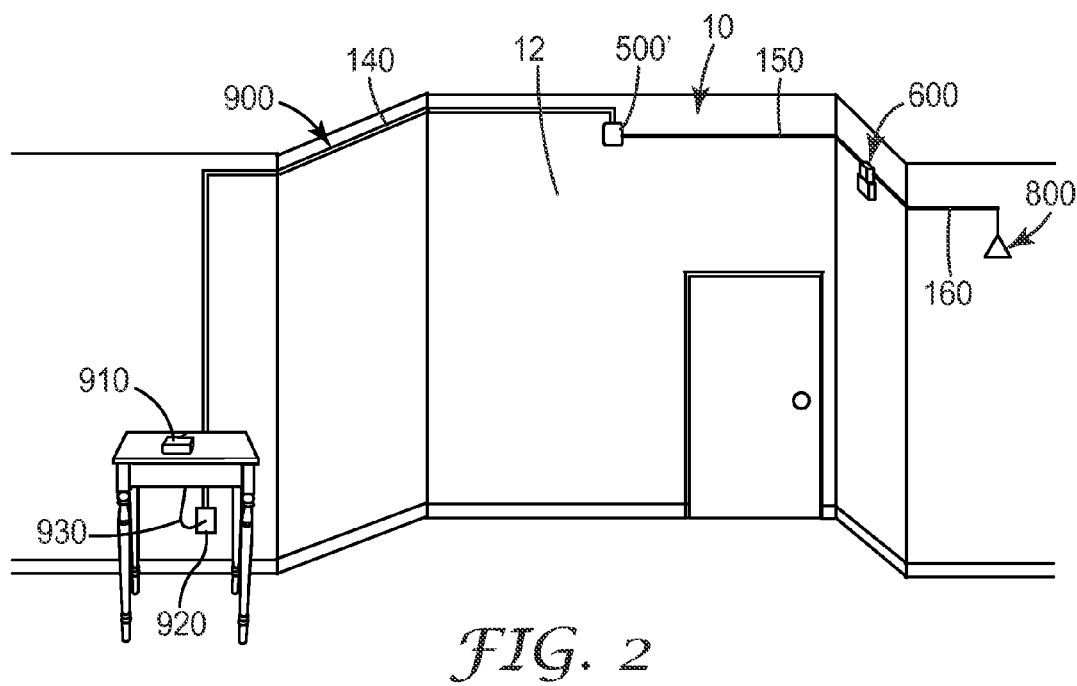
FIG. 2 shows a schematic view of a portion of a converged in-building network installed in a living unit of an MDU according to an embodiment of the present invention.

The cables enter the living unit though a second point of entry box 500' (FIG. 2) within the living unit 10. The point of entry box in the living unit can be similar to point of entry box 500 shown in the hallway 7 in FIG. 1, or it can be smaller because fewer communication lines or cables are typically handled in the second point of entry box in the living unit. The cables entering the living unit through point of entry box 500' feed remote sockets 600 as well connections to communication equipment 910 inside of each living unit or a wall receptacle 920 to which a piece of communication equipment can be connected by a fiber jumper 930 (FIG. 2). Exemplary communication equipment can include a single family unit optical network terminal (SFU ONT), desktop ONT, or similar device (e.g., a 7342 Indoor Optical Terminal, available from Alcatel-Lucent or a Motorola ONT1120GE Desktop ONT).

The optical fibers and power cables which feed the remote socket can be disposed in wireless duct 150. Wireless duct 150 can be adhesively mounted to the wall or ceiling within the MDU. The wireless duct will carry one or more optical fibers and at least two power lines within the duct. Exemplary wireless ducts are described in U.S. Patent Publication Nos. 2009-0324188 and 2010-0243096, incorporated by reference herein in their entirety.

The remote socket 600 can include remote repeater/radio electronics or a wireless access point (WAP) to facilitate a common interface between the active electronics and the structured cabling system. The remote socket facilitates plugging in the remote radio electronics which convert the optical RF to electrical signals and further distributes this to the distributed antennas 800 for radiation of the analog RF electrical signal for the IBW distribution system.

The distributed antennas 800 can be connected to the remote socket 600 by a short length of coaxial cable 160. The antennas are spaced around the building so as to achieve thorough coverage with acceptable signal levels. In one exemplary embodiment, coaxial cable 160 can include an adhesive backing layer to facilitate attachment of the coaxial cable to a wall or ceiling within the MDU. An exemplary adhesive backed coaxial cable is described in U.S. patent application Ser. No. 13/454,569, incorporated by reference herein in its entirety.

Optical drop fibers can be carried from the point of entry box 500 in the hallway to an anchor point within the living unit 10, such as wall receptacle 920 or a piece of communication equipment 910, via telecommunication duct 140. In a preferred aspect, the telecommunication duct 140 is a low profile duct that can be disposed along a wall, ceiling, under carpet, floor, or interior corner of the living unit in an unobtrusive manner, such that the aesthetics of the living unit are minimally impacted. Exemplary low profile ducts are described in U.S. Patent Publications Nos. 2011-0030832 and 2010-0243096, incorporated by reference herein in their entirety.

FIG. 2 shows a schematic view of a portion of the converged in-building network installed in a living unit 10 of an exemplary building, such as MDU 1 (see FIG. 1). The system includes a wired telecommunication portion such as a fiber to the home (FTTH) system and a wireless communication system.

An exemplary drop access system 900 which is a subsystem of FTTH system includes a final drop or telecommunication duct 140 that is installed in a living unit 10 of an exemplary building, such as MDU 1 (see FIG. 1). Please note that while drop access system 900 is described herein as being installed in a building such as an MDU, it may also be utilized in a single family home or similar residence, an office building, a hospital or other building where it may be advantageous to provide an optical fiber transmission system for voice and data signals as would be apparent to one of ordinary skill in the art given the present description.

Drop access system 900 includes a telecommunication duct 140 which contains one or more communications lines (such as drop fibers or electrical drop lines, not shown in FIG. 2) for connection with the horizontal cabling/service line(s) of the building, such as an MDU. The communications lines preferably can comprise one or two optical fibers, although an electrical wire, coaxial/micro-coaxial cable, twisted pair cables, Ethernet cable, or a combination of these, may be used for data, video, and/or telephone signal transmission. In one aspect, a communications line can comprise a discrete (loose) drop fiber, such as 900 µm buffered fiber, 500 µm buffered fiber, 250 µm fiber, or other standard size communications fiber. The optical fiber can be single mode or multi-mode. Example multi-mode fibers can have a 50 µm core size, a 62.5 µm core size, an 80 µm core size, or a different standard core size. In another alternative aspect, the drop fiber can comprise a conventional plastic optical fiber. The final drop fiber(s) can be field terminated with an optical fiber connector, such as described in U.S. Pat. No. 7,369,738. Other optical fiber connectors, such as SC-APC, SC-UPC, or LC, can be utilized.

In addition, although the exemplary aspects described herein are often specific to accessing optical fiber lines, it would be understood by one of ordinary skill in the art given the present description that the drop access system 900 can be configured to accommodate an electrical wire drop and/or a hybrid combination drop as well. For example, the electrical wire drop can comprise conventional Cat 5/Cat 6 wiring or conventional coax wiring, such as RG6 shielded and/or unshielded cables.

Drop access system 900 comprises one or more point-of-entry units 500' located at one or more access location points within the living unit to provide access to the horizontal cabling provided within the MDU. In a preferred aspect, a point of entry unit comprises a low profile access base unit (mountable over or onto at least a portion of the telecommunication duct 140 and wireless duct 150) that is located at an access location point.

An exemplary drop access system and method of installing the horizontal cabling provided within the MDU is described in U.S. Patent Publication No. 2009-0324188, incorporated by reference herein in its entirety.

In one aspect, the drop line(s) (e.g., fiber(s)) within the telecommunication duct 140 can be coupled to the service provider line via a standard coupling located in a drop access box 500 (see FIG. 1) disposed in a hallway of the MDU. The drop line(s), such as a terminated drop fiber(s), or other communication lines, can be carried from the point-of-entry box 500' to a second anchor point within the living unit, in a preferred aspect, wall receptacle 920, via telecommunication duct 140. In a preferred aspect, the telecommunication duct 140 is disposed along a wall, ceiling, under carpet, floor, or interior corner of the living unit in an unobtrusive manner, such that the aesthetics of the living unit are minimally impacted. Telecommunication duct 140 can be configured as an adhesive-backed duct as is described in US Patent Publication No. 2011-0030190, incorporated by reference herein in its entirety.

As mentioned previously, drop access system 900 includes a second anchor point at a distance from the point-of-entry to receive the drop line(s) and provide a connection with telecommunication equipment 910 (i.e. an optical network terminal (ONT)) that is located within the living unit. In a preferred aspect, the second anchor point comprises a multimedia wall receptacle 920 that is configured to receive the drop line(s) (e.g., drop fiber(s) or drop wire(s)) and provide a connection with the ONT, such as a single family unit optical network terminal (SFU ONT), desktop ONT, or similar device (e.g., a 7342 Indoor Optical Terminal, available from Alcatel-Lucent or a Motorola ONT1120GE Desktop ONT).

According to an exemplary aspect, the wall receptacle 920 is configured to distribute networking cables throughout the living unit. As such, wall receptacle 920 can be configured to provide multiple, multimedia connections, using, e.g., coaxial ground blocks or splitters, RJ11 adapters (such as couplers or jacks), RJ45 adapters (such as couplers or jacks), or fiber SC/APC adapters/connectors. As shown in FIG. 2, fiber jumper 930 can connect the receptacle to the ONT.

The optical fibers and power cables which feed the remote socket can be routed through wireless duct 150 from point of entry box 500' to the remote socket 600. Wireless duct 150 can be adhesively mounted to the wall or ceiling within the MDU. The wireless duct will carry one or more optical fibers and at least two power lines within the duct.

Remote socket 600 can include remote repeater/radio electronics to facilitate a common interface between the active electronics and the structured cabling system. The remote socket facilitates plugging in the remote radio electronics which convert the optical RF to electrical signals and further distributes this to the distributed antennas 800 for radiation of the analog RF electrical signal for the IBW distribution system.

The distributed antennas 800 can be connected to the remote socket 600 by a short length of coaxial cable 160. In one exemplary embodiment, coaxial cable 160 can include an adhesive backing layer to facilitate attachment of the coaxial cable to a wall or ceiling within the MDU.

Figure 3:
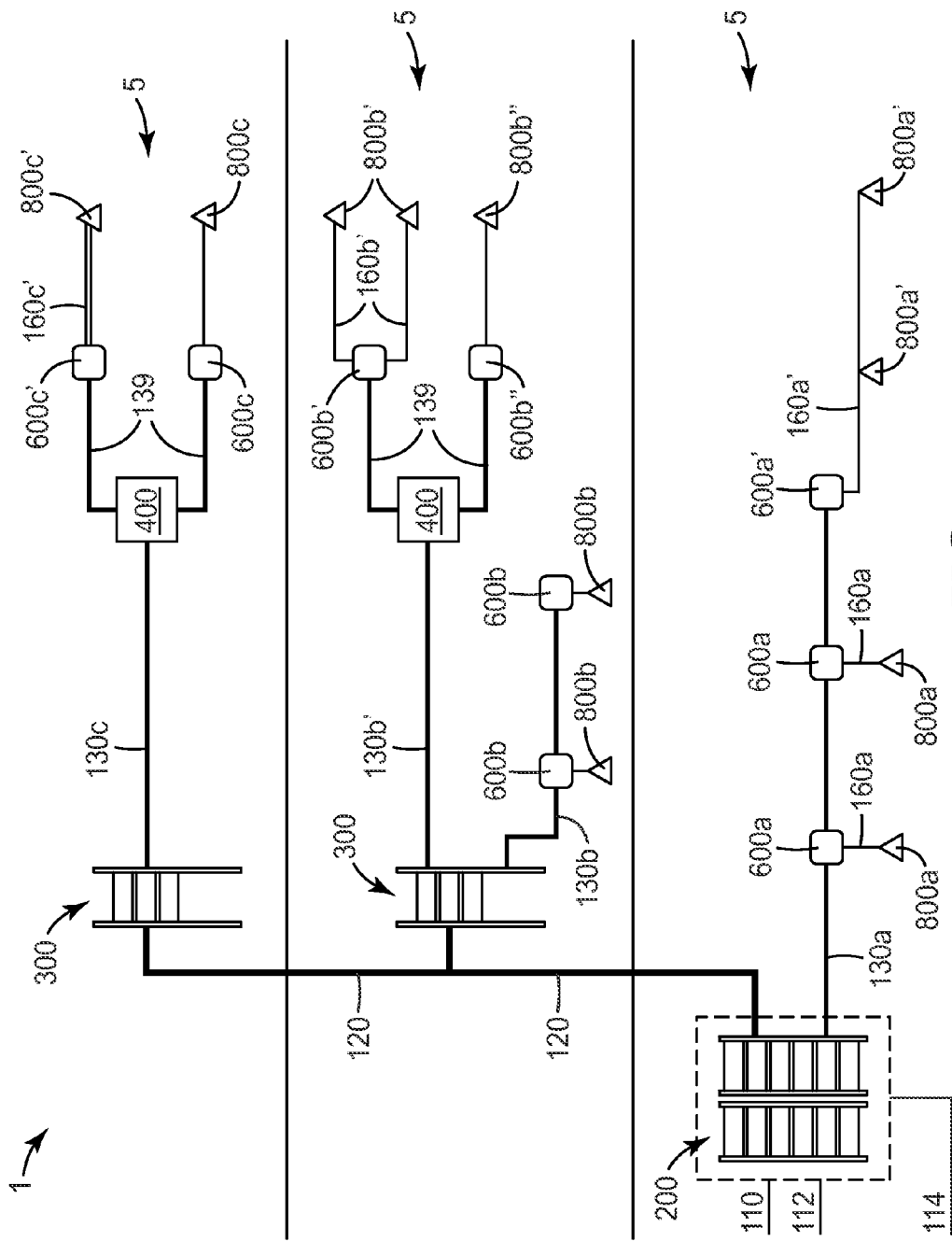
FIG. 3 is an alternative schematic view showing the wireless network portion of a converged in-building network installed therein according to an embodiment of the present invention.

FIG. 3 shows a wireless network portion of a converged in-building network installed in a multi-story building. The building in this schematic drawing includes three stories or floors 5.

Feeder cables 110 for wired communications lines (e.g. copper or optical fiber) from the traditional communication network and coax feeder cables 112 bring the RF or wireless signals into the building from nearby wireless towers or base stations. All of the incoming lines (e.g. optical fiber, coax, and traditional copper) are fed into a main distribution facility or main distribution rack 200 in an equipment closet usually located on the ground floor or basement of the building. The main distribution rack 200 organizes the signals coming into the building from external networks to the centralized active equipment for the in building converged network. Power mains 114 and backup power can also be distributed through the main distribution rack. Additionally, fiber and power cable management which supports the converged network, both wired and wireless networks, manages the cables carrying the signals both into the building from the outside plant and onto the rest of the indoor network can be located in the main distribution facility. The main distribution rack(s) 200 can hold one or more equipment chassis as well as telecommunication cable management modules.

Horizontal cabling 130a can distribute wireless and wired signals to locations in the building close to the main distribution rack 200 such as to locations on the same floor as the main distribution rack as shown in FIG. 3. Horizontal cabling 130a will include a plurality of optical fibers, and two or more power lines. Optionally, horizontal cabling 130a can also include one or more copper communication lines. Horizontal cabling 130a directly carries the wireless signals to one or more remote sockets 600a, 600a' sequentially spaced along the length of the horizontal cabling and finally to distributed antennas 800a, 800a' which are attached to each remote socket by a coaxial cables 160a, 160a'. The number of optical fibers and power cables carried by the horizontal cabling will depend on several factors. A first factor is the number of remote sockets being supported on the branch of horizontal cabling for the particular wireless portion of the converged network. Another factor is the number of optical fiber fed wired communication links supporting the FTTx portion of the converged network. Yet another factor is how many fibers are required to support each node of the respective portions of the network (i.e. how many remote sockets plus how many FTTx nodes). Each remote socket may utilize one to two optical fiber inputs, one to two optical fiber outputs and/or two power lines. FTTx nodes are typically served by up to four optical fibers. The coaxial cables can include either a single coax cable 160a, 160a', 160b' or two coaxial cables 160c' to provide a dual link to antenna 800c'.

Each remote socket can support one antenna as shown for remote sockets 600a-c or can support a plurality of antennas 800a', 800b' as shown for remote sockets 600a', 600b'. When more than one antenna is attached to a remote socket, the antennas 800b' can be attached in a star configuration as shown for remote sockets 600b' by coaxial cables 160b' or antennas 800a' can be sequentially spaced along the coaxial cable, such as coaxial cable 160a', which extends from remote socket 600a'.

Riser cables or trunk cables 120 can run from the main distribution rack 200 to a local equipment rack 300 located in an equipment closure on each floor or on alternate floors of the building as required for a particular network configuration. FIG. 3 shows a local equipment rack on each of the second and third floors of the building represented in the schematic drawing. In an exemplary aspect, riser cable 120 will include a plurality of optical fibers and/or a plurality of copper communication lines. DC power can be added into the horizontal cabling via local equipment rack 300, which will be described in additional detail below. Alternatively, power can be carried to the remote electronics (i.e. the remote sockets) through the riser cable from the main distribution rack.

On the second floor of the building 1 shown in FIG. 3, a portion of the remote sockets 600b are fed by horizontal cabling 130b. A second grouping of remote sockets can be fed by horizontal cabling 130b' which passes through area junction box 400. Secondary horizontal cabling 139 routes cables from area junction box 400 to remote sockets 600b', 600b''.

Figure 4:
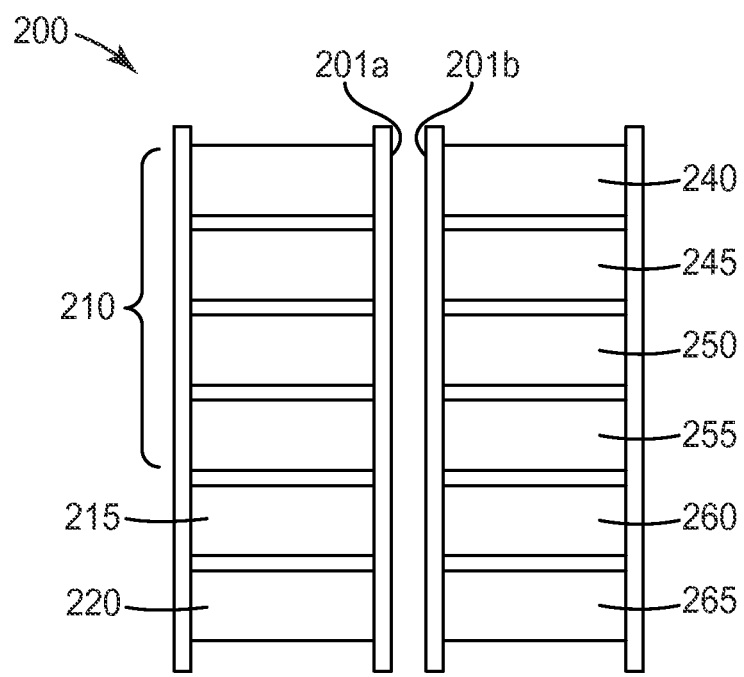
FIG. 4 is a schematic diagram of an exemplary local equipment rack according to an embodiment of the present invention.

FIG. 4 shows a schematic representation of main distribution rack 200. The main distribution rack 200 organizes the signals coming into the building from external networks to the centralized active equipment for the in building converged network. The main distribution rack(s) 200 can hold one or more equipment chassis as well as telecommunication cable management modules. The main distribution rack can be modular, offering a common configuration of the active primary and secondary network equipment used to support both the wireless distribution system and the wired FTTH MDU system. In an exemplary aspect, the main distribution rack can utilize multiple racks in the main distribution facility of the building.

In the exemplary aspect shown in FIG. 4, main distribution rack 200 utilizes two sub-racks 201a, 201b. The sub-racks can be configured as conventional 19" equipment racks, 21" equipment racks or any other equivalent racking system. The first sub-rack 201a can be configured to hold two to four RF signal sources 210, an RF conditioning drawer 215, and a primary distributed antenna system (DAS) hub 220.

The incoming RF signals from each service provider are introduced into the exemplary converged network by the RF signal sources 200 located in the main distribution rack. The RF signal sources are frequently owned by a given service provider. The signal sources can be a bi-directional amplifier, a base transceiver station or other type of RF signal source equipment configuration. These signal sources transmit and receives the RF signal on the owning service providers licensed radio frequency. Exemplary RF signal sources include the RBS 2000 Series Indoor Base Stations available from Ericsson (Stockholm, SE), the Flexi Multiradio 10 Base Station available from Nokia Siemens Networks (Espoo, FI), or the Node-A Repeater available from Commscope, Inc. (Hickory, N.C.).

RF conditioning drawer 215 serves as a point of interface for the RF signal sources. RF conditioning drawer organizes and conditions (couplers, attenuation, etc.) the incoming RF signals from the RF signal sources and combines the multiband signals for input into the active DAS equipment. An exemplary RF conditioning drawer or unit includes the POI Series products from Bravo Tech, Inc (Cypress, Calif.).

The primary DAS hub 300 takes the signals from the RF conditioning drawer converts the RF signals to optical signals and inputs the optical signals into signal mode optical fibers which carry the signals to the remote radio socked where they are converted back into RF signals which are passed on to the distributed antennas for broadcast into the environment. Exemplary primary DAS hubs are Zinwave's 3000 Distributed Antenna System Primary Hub available from Zinwave (Cambridge, UK) or the ION™-B Master Unit Subrack available from Commscope, Inc. (Hickory, N.C.). Each primary DAS hub can serve a set number of remote units. The remote units can be secondary DAS hubs which can be located in either the main distribution rack or the local equipment racks or the remote sockets. If there are more remote sockets than can be served by the primary DAS hub a secondary DAS hub can be linked to the Primary DAS hub to expand the capacity of the system.

The second sub-rack 201b can be configured to hold a fiber distribution hub 240, a fiber distribution terminal 245, a secondary DAS hub 250, a power distribution module 255, an uninterruptable power supply 260 and a DAS remote management system 265.

The fiber distribution hub 240 can provide a high density fiber connection point between the optical fiber feeder cables and the in-building fiber network. The fiber distribution terminal 245 on the other hand can cross-connect, interconnect and manage optical fibers coming from the fiber distribution hub with the optical fibers within the horizontal cabling for a given floor of subsection of the converged system. Exemplary fiber distribution hubs and terminals can be selected from 3M™ 8400 Series Fiber Distribution Units available from 3M Company (St. Paul, Minn.).

As previously mentioned, secondary DAS hub 200 can be added to the network to serve an increased number of remote units. In particular, secondary DAS hub 200 in sub-rack 201b can serve remote units (e.g. remote sockets) on the main floor of the building. Exemplary secondary DAS hubs are Zinwave's 3000 Distributed Antenna System Secondary Hub available from Zinwave (Cambridge, UK) which can feed up to eight remote sockets or the ION™-B Master Unit Subrack available from Commscope, Inc. (Hickory, N.C.).

Active and passive distributed antenna systems are just one example of a method to distribute wireless signals within a building. In accordance with alternative aspects of the invention, additional ways to distribute wireless signals within a building can be implemented, including the use of distributed radio systems where small picocell or femtocells units are distributed throughout the building at the remote socket locations.

Power distribution module 255 can be a 48 Vdc power distribution module to provide power through the horizontal cabling to the remote electronics in the area junction box and/or the remote sockets. The uninterruptable power supply 260 provides power to essential electronics in the event of a blackout to either maintain their functionality at a base level or to permit an orderly shutdown of the equipment. Exemplary uninterruptable power supply are available from Tripp Lite (Chicago, Ill.) or American Power Conversion Corporation (W. Kingston, R.I.).

Figure 39:
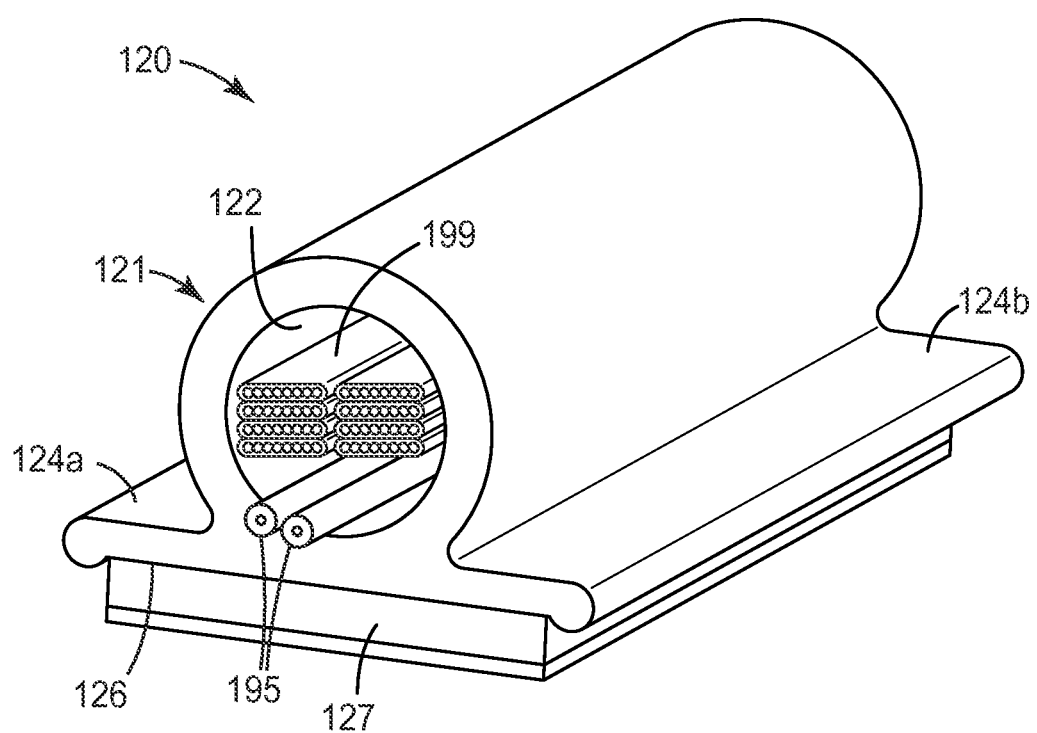
FIG. 39 is an isometric view of an exemplary riser cable according to another aspect of the invention.

Riser cables or trunk cables 120 carry RF and optical fiber communication signals from the main distribution rack in the main distribution facility to a branch point on each floor of the building. FIG. 39 shows an exemplary trunk or riser cable 120 for use in a converged network. Riser cable 120 can be in the form of a duct having a main body 121 having a central bore 122 provided therethrough. In this aspect, the central bore 122 is sized to accommodate a plurality of optical fiber ribbons 199 in the form of RF communication lines and optical fiber communication lines for the wired system and at least two power lines 195 therein. In this example, central bore is sized to accommodate eight optical fiber ribbons 199 having eight optical fibers in each ribbon. Of course, a greater or a fewer number of optical fiber ribbons and/or optical fibers in each ribbon can be utilized, depending on the application. The optical fibers can be optimized for carrying RoF or FTTH signals. For example, the optical fibers can comprise single mode optical fibers. Multi-mode fibers can also be utilized in some applications.

In another alternative aspect, the adhesive-backed riser cable can further include one or more communication channels configured as Ethernet over twisted pair lines, such as CAT5e, CAT6 lines. In another alternative, power can be transmitted over the conducting core of one or more of the coax lines.

Riser cable 120 can also include a flange or similar flattened portion to provide support for the horizontal cabling as it is installed on or mounted to a wall or other mounting surface, such as a floor, ceiling, or molding. In a preferred aspect, the flange includes flange portions 124a, 124b which have a rear or bottom surface with a generally flat surface shape. In a preferred aspect, an adhesive layer 127 comprises an adhesive, such as an epoxy, transfer adhesive, acrylic adhesive, pressure sensitive adhesive, double-sided tape, or removable adhesive, disposed on all or at least part of bottom surface 126 of the flange portions. Further discussion of exemplary adhesive materials is provided below.

The above described riser cable 120 delivers power and communication lines from the main distribution rack to a centralized branch point, such as an area junction box 400 or a local equipment rack, located on each floor of the building. Alternatively, the riser cable 120 can deliver power and communication lines to branch points in other types of buildings such as office buildings, hospitals or educational facilities for examples. The signals can then be disseminated by runs of horizontal cabling to remote sockets or point of entry boxes.

Figure 5:
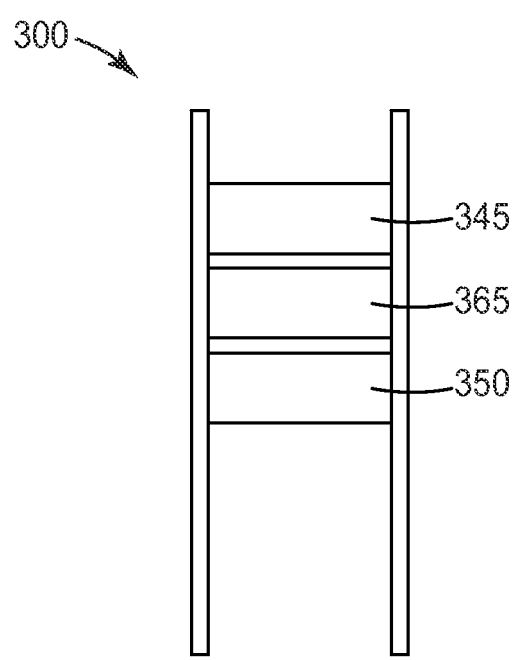
FIG. 5 is a schematic diagram of an exemplary main distribution rack according to an embodiment of the present invention.

FIG. 5 shows a schematic representation of local equipment rack 300. The local equipment rack is a point of presence (POP) rack or cabinet. The local equipment rack can be localized in an appropriate equipment room or other suitable location on every other floor or every floor of the MDU depending on the size (i.e. square footage) of the floor. The local equipment rack can be configured as conventional 19" equipment racks, 21" equipment racks or any other equivalent racking system. The riser cable(s) provide the signal inputs from the main distribution rack. Each local equipment rack can include a fiber distribution terminal 345, a secondary DAS hub 350, and a power distribution module 365. Fiber distribution terminal 345 interconnects optical fibers from the riser cable with the optical fibers contained in the horizontal cabling on each floor of the building as well as connecting optical fibers from the riser cable to the secondary DAS hub 350. In addition, the fiber distribution terminal 345 will connect the fibers from the secondary DAS hub and connect them to the optical fibers that support the wireless portion of the converged network. Power distribution module 365 can be a 48 Vdc power distribution module to provide power through the horizontal cabling to the remote electronics in the area junction box and/or the remote sockets.

The area junction box 400 can provide a branch point between the horizontal cabling coming from the local equipment rack to secondary horizontal cabling runs to feed remote sockets as well as the FTTH network. For example, each area junction box can accommodate up to 12 FTTH drops and fiber support for up to eight remote sockets each requiring at least two optical fiber connections. In addition each area junction box will provide support of the power lines necessary feed up to eight remote sockets. An exemplary area junction box can include the 3M™ VKA 2/GF optical fiber distribution box available from 3M Company (St. Paul, Minn.).

As mentioned previously, horizontal cabling 130 can deliver power and communications lines for both the wired and wireless communications platforms along each floor of the MDU. Horizontal cabling provides signal pathways between the local distribution or branch points to the remote electronics in the wireless network and between the local distribution point and the individual living units or service delivery points in the building. In a preferred aspect of the invention, the horizontal cabling can be provides as an adhesive-backed structured cabling duct. However other forms of horizontal cabling can still be utilized in the converged network described herein.

Figure 6A:
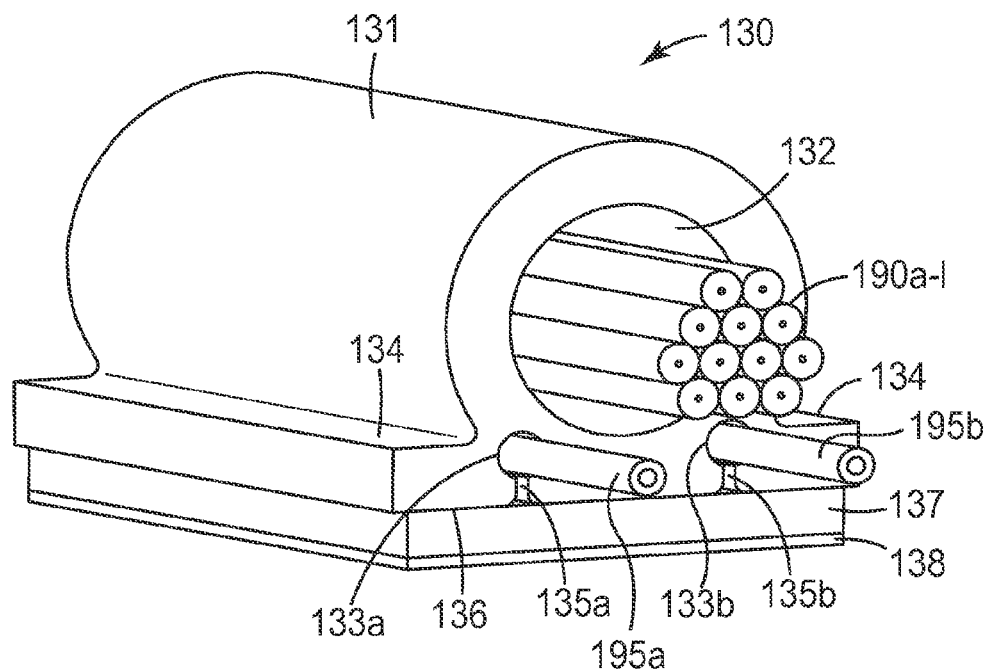
FIGS. 6A-6C are isometric views of exemplary horizontal cabling according to an aspect of the invention.

FIG. 6A shows an exemplary form of horizontal cabling 130 for use in a converged network. Horizontal cabling 130 can be in the form of a duct having a main body 131 having a central bore 132 and additional bores 133a, 133b formed in the flange structure 134 of the duct, provided therethrough. In this aspect, the central bore 132 is sized to accommodate a plurality of optical fibers 190 in the form of RF communication lines and optical fiber communication lines for the wired system therein. In this example, bore 132 is sized to accommodate twelve optical fibers 190a-190l. Of course, a greater or a fewer number of optical fibers can be utilized, depending on the application. The optical fibers can be optimized for carrying RoF or FTTX signals. For example, the optical fibers can comprise single mode optical fibers. Multi-mode fibers can also be utilized in some applications.

The additional bores 133a, 133b can provide additional signal channels and/or power lines. In this aspect, a first additional channel 133a carries a first power line 195a and second additional channel 133b carries a second power line 195b. Alternatively, first and second additional channels 133a, 133b can carry coaxial cables. Access to first and second additional channels 133a, 133b can optionally be provided via access slits 135a, 135b, respectively. In another alternative aspect, the adhesive-backed cabling can further include one or more communication channels configured as Ethernet over twisted pair lines, such as CAT5e, CAT6 lines. In another alternative, power can be transmitted over the conducting core of one or more of the coax lines.

The duct structure of horizontal cabling 130 can be a structure formed from a polymeric material, such as a polymeric material, such as a polyolefin, a polyurethane, a polyvinyl chloride (PVC), or the like. For example, in one aspect, the duct structure can comprise an exemplary material such as a polyurethane elastomer, e.g., Elastollan 1185A10FHF. In a further aspect, the duct of horizontal cabling 130 can be directly extruded over the communications lines in an overjacket extrusion process. Alternatively, the duct of horizontal cabling 130 can be formed from a metallic material, such as copper or aluminum, as described above. The duct of horizontal cabling 130 can be provided to the installer with or without access to access slit(s) 135.

As previously mentioned, the duct of horizontal cabling 130 can also include a flange 134 or similar flattened portion to provide support for the horizontal cabling as it is installed on or mounted to a wall or other mounting surface, such as a floor, ceiling, or molding. In a preferred aspect, the flange 134 includes a rear or bottom surface 136 that has a generally flat surface shape. In a preferred aspect, an adhesive layer 137 comprises an adhesive, such as an epoxy, transfer adhesive, acrylic adhesive, pressure sensitive adhesive, double-sided tape, or removable adhesive, disposed on all or at least part of bottom surface 136. In one aspect, adhesive layer 137 comprises a factory applied 3M VHB 4941F adhesive tape (available from 3M Company, St. Paul Minn.). In another aspect, adhesive layer 137 comprises a removable adhesive, such as a stretch release adhesive. By "removable adhesive" it is meant that the horizontal cabling 130 can be mounted to a mounting surface (preferably, a generally flat surface, although some surface texture and/or curvature are contemplated) so that the horizontal cabling 130 remains in its mounted state until acted upon by an installer/user to remove the duct from its mounted position. Even though the duct is removable, the adhesive is suitable for those applications where the user intends for the duct to remain in place for an extended period of time. Suitable removable adhesives are described in more detail in PCT Patent Publication No. WO 2011/129972, incorporated by reference herein in its entirety. A removable liner 138 can be provided and can be removed when the adhesive layer is applied to a mounting surface.

Figure 6B:
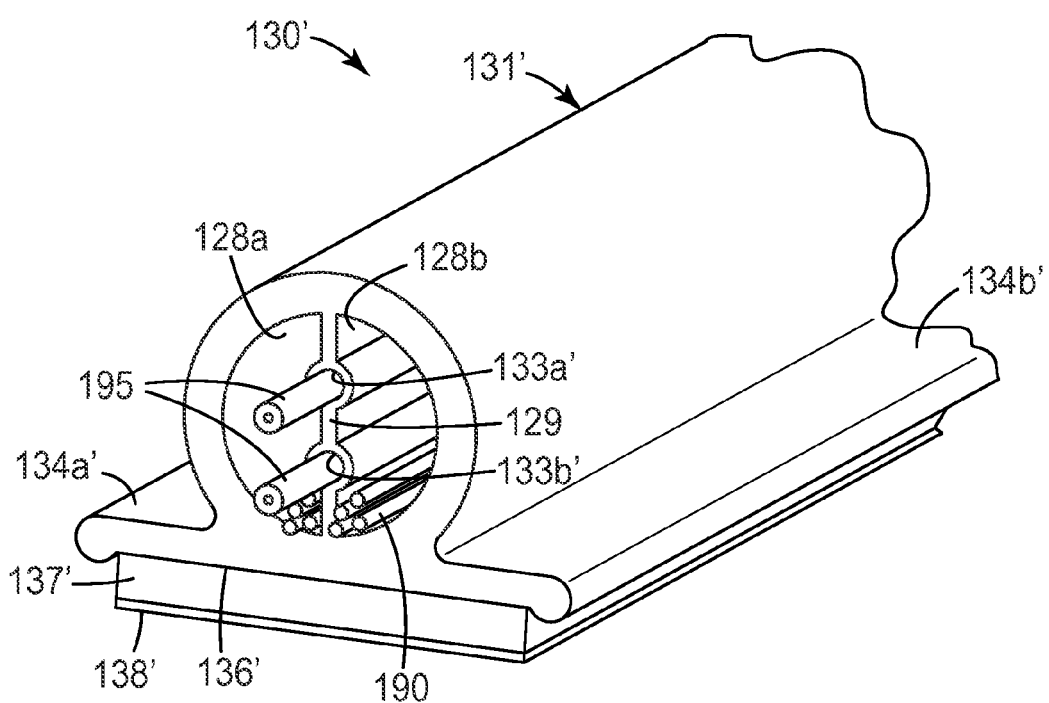

In a second aspect of the invention, adhesive-backed horizontal cabling 130' accommodates one or more RF signal channels to provide horizontal cabling for IBW applications or optical fibers to support a fiber to the home network. As shown in FIG. 6B, the horizontal cabling 130' includes a main body 131' having a conduit portion with a cavity provided therethrough. The cavity can be divided by a septum 129 to form two bore portions 128a, 128b extending through the conduit portion. Each bore portion 128a, 128b is sized to accommodate one or more communication lines (RF communication lines, copper communication lines or optical fiber communication lines) to support an IBW and/or a wired communication network. In use, the duct can be pre-populated with one or more coax cables, copper communication lines, optical fibers, and/or power lines. In a preferred aspect, the RF communication lines are configured to transmit RF signals having a transmission frequency range from about 300 MHz to about 6 GHz.

Horizontal cabling 130' can include one or more lobed portions formed in septum 129. Each lobed portion can have an auxiliary bore 133a', 133b' formed therethrough. The auxiliary bores can carry strength members (not shown) or embedded power lines 195. The power lines can be insulated or non-insulated electrical wires, (e.g. copper wires). The power lines can provide low voltage DC power distribution for remote electronics (such as remote radios or WiFi access points) that are served by this structured cable. When power lines 195 are embedded in the septum 129, the power lines can act as strength members to prevent the duct from stretching during installation. The power lines 195 within the septum may be accessed by an IDC type of connection (not shown) by making a window cut in the main body 131' of the duct. Embedding the power lines in the septum allows the location of the wires to be known and fixed, facilitating the use of IDC or other connectors to make electrical connections to the power lines.

The separate bore portions 128a, 128b can be populated with optical fibers 190 or insulated wires as described previously. The separate bore portions enable craft separation between fiber and copper, or network separation between the wireless portion of the network and the FTTH portion of the converged system. Other exemplary horizontal cabling structures having more than one bore portion are described in PCT Patent Application No. PCT/US2012/034782, incorporated by reference herein in its entirety.

Horizontal cabling 130' also includes a flange or similar flattened portion to provide support for the cabling as it is installed on or mounted to a wall or other mounting surface, such as a floor, ceiling, or molding. Horizontal cabling 130' includes a double flange structure, with flange portions 134a', 134b', positioned below the centrally positioned conduit portion. In an alternative aspect, the flange can include a single flange portion. In alternative applications, a portion of the flange can be removed for in-plane and out-of-plane bending.

In a preferred aspect, flange portions 134a', 134b' include a rear or bottom surface 136' that has a generally flat surface shape. This flat surface provides a suitable surface area for adhering the horizontal cabling 130' to a mounting surface, a wall or other surface (e.g., dry wall or other conventional building material) using an adhesive layer 137'. Adhesive layer 137' can comprises an adhesive as described previously. In an alternative aspect, adhesive backing layer 137' includes a removable liner 138'. In use, the liner can be removed and the adhesive layer can be applied to a mounting surface.

Figure 6C:
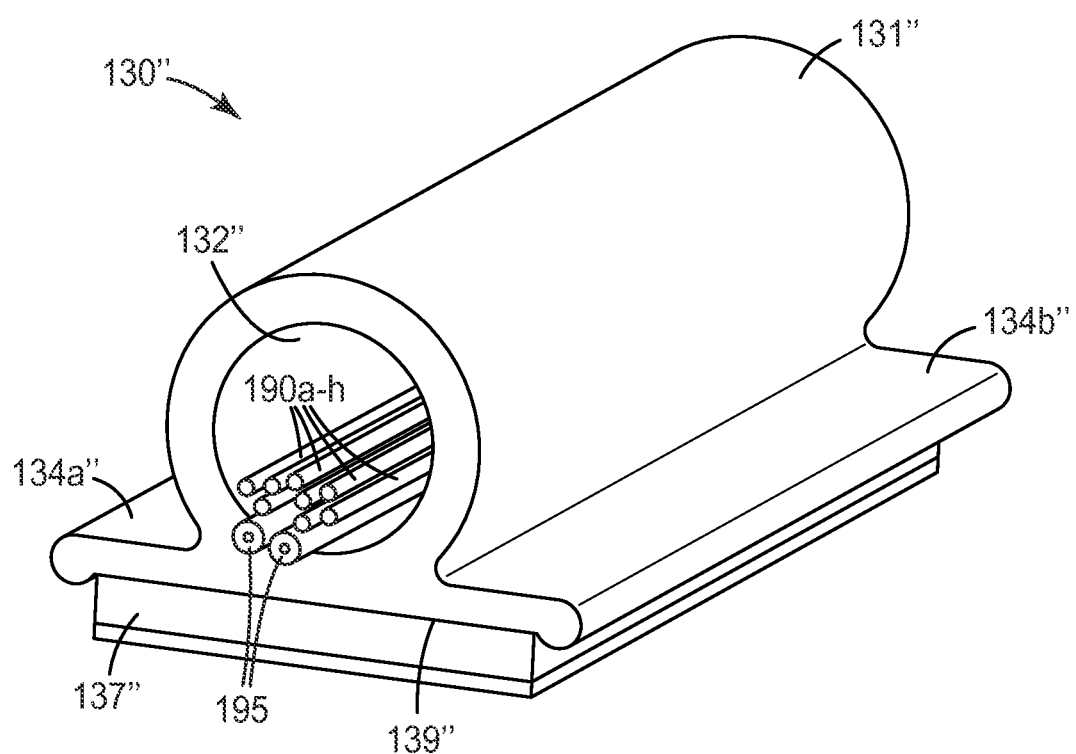

FIG. 6C shows another exemplary form of horizontal cabling 130" for use in a converged network. Horizontal cabling 130" can be in the form of a duct having a main body 131" having a central bore 132" provided therethrough. In this aspect, the central bore 132" is sized to accommodate a plurality of optical fibers 190 in the form of RF communication lines and optical fiber communication lines for the wired system and at least two power lines 195 therein. In this example, central bore is sized to accommodate eight optical fibers 190a-190h. Of course, a greater or a fewer number of optical fibers can be utilized, depending on the application.

The optical fibers can be optimized for carrying RoF or FTTH signals. For example, the optical fibers can comprise single mode optical fibers. Multi-mode fibers can also be utilized in some applications.

In another alternative aspect, the adhesive-backed cabling can further include one or more communication channels configured as Ethernet over twisted pair lines, such as CAT5e, CAT6 lines. In another alternative, power can be transmitted over the conducting core of one or more of the coax lines.

As previously mentioned the duct of horizontal cabling 130" can also include a flange or similar flattened portion to provide support for the horizontal cabling as it is installed on or mounted to a wall or other mounting surface, such as a floor, ceiling, or molding. In a preferred aspect, the flange having flange portions 134a", 134b" includes a rear or bottom surface that has a generally flat surface shape. In a preferred aspect, an adhesive layer 137" comprises an adhesive, such as an epoxy, transfer adhesive, acrylic adhesive, pressure sensitive adhesive, double-sided tape, or removable adhesive, disposed on all or at least part of bottom surface 139" of the flange portions as described above.

The above described horizontal cabling delivers power and communication lines through the hallway of an MDU so that these lines can be accessed at various living units within the MDU. Alternatively, the horizontal cabling can deliver power and communication lines to node points in other types of buildings such as office buildings, hospitals or educational facilities for examples. The signals can then be disseminated further by additional runs of secondary horizontal cabling or wired data and telecommunication lines can be provided to individual worksites or workstations by low profile telecommunications ducts.

Figure 8:
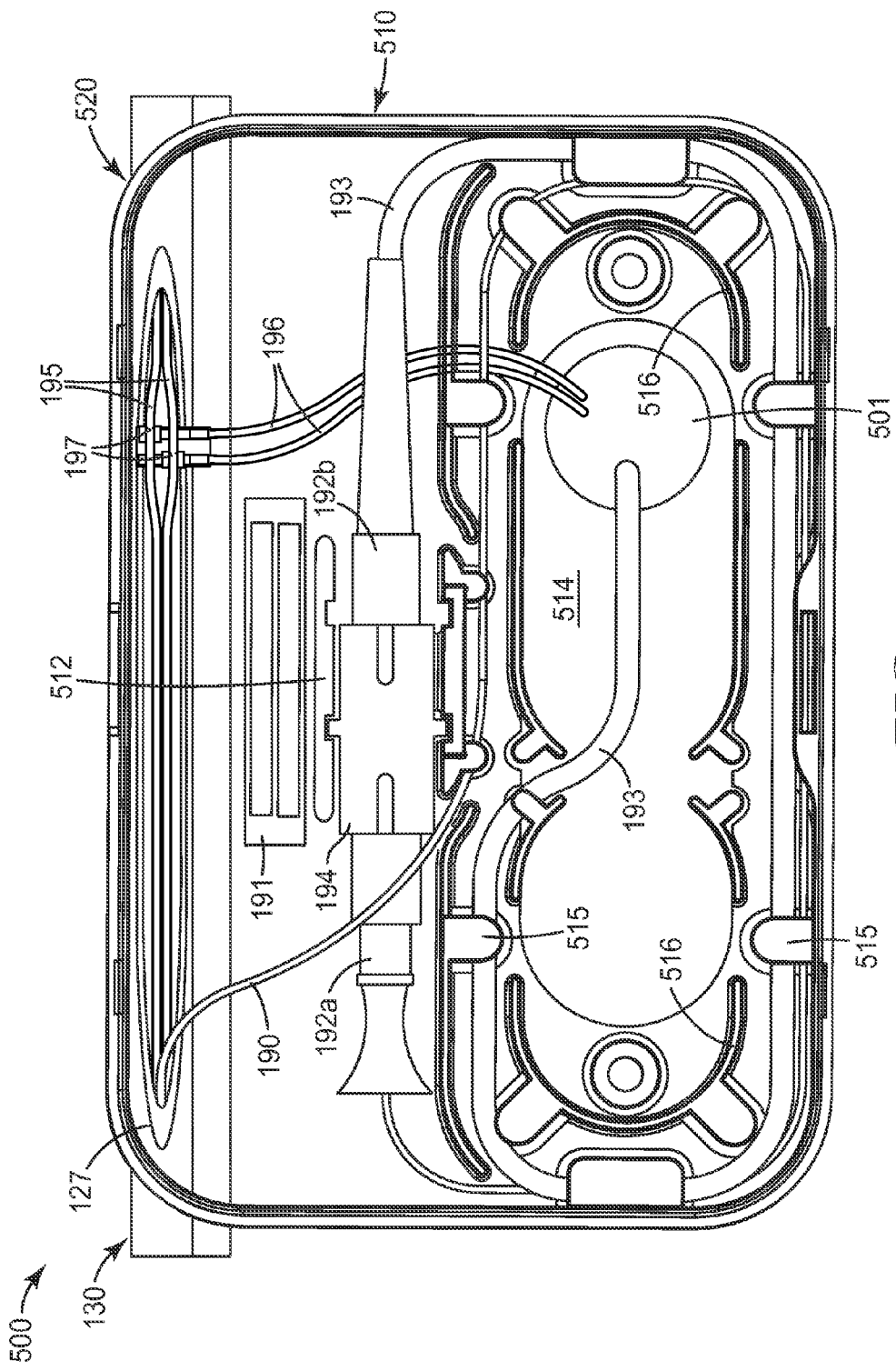
FIG. 8 is an isometric view of an exemplary point of entry box according to an aspect of the invention.

FIG. 8 shows the base portion 510 of an exemplary point of entry (POE) box 500 that is used to access the communication lines and/or the power lines delivered by the horizontal cabling 130. The POE box 500 can be located over an access hole 501 in the wall near one or more access points in the hallway of an MDU. The base portion 510 and cover (not shown) can be formed from a rigid plastic material or metal. The POE box 500 (cover and base) can have a low profile and/or decorative outer design (such as a wall sconce, rosette, interlaced knot, mission square, shell, leaf, or streamlined industrial design), and the access box can be color-matched to the general area of the installation, so that the box does not detract from the aesthetic appeal of the location where it is installed. The POE box can optionally be provided with lighting devices for illumination. Further, the cover may further include a decorative overlay film laminated to the outer surface(s). Such a film can comprise a 3M™ Di Noc self-adhesive laminate (available from 3M Company), and can resemble wood grain or metallic surfaces of the surrounding architecture.

POE box 500 includes a mounting section 520 that provides for straightforward mounting of the POE box 500 onto the horizontal cabling 130. Mounting section 520 is configured to closely fit onto and over horizontal cabling 130. In this manner, POE box 500 can be mounted to horizontal cabling 130 after the duct (and the communication lines therein) have been installed. For example, mounting section 520 includes a cut-out portion configured to fit over the outer shape of horizontal cabling 130.

Within the interior of base section 510, one or more communications lines disposed within horizontal cabling 130 can be accessed and connected to one or more drop wires or drop fibers of a particular living unit. In this particular exemplary aspect, an optical fiber 190 from horizontal cabling 130 can be coupled to FTTH drop fiber cable 193 from a particular living unit. The communication fiber(s) 190 can be accessed either through the same or separate window cuts 127 made in conduit portion of the duct of the horizontal cabling. In one exemplary aspect, POE box 500 can connect two fibers from the horizontal cabling to two FTTH drop fiber cables or can connect two fibers to two wireless service fibers which will carry the RF signals to the remote socket, or the POE box can accommodate both functions simultaneously.

Figure 9:
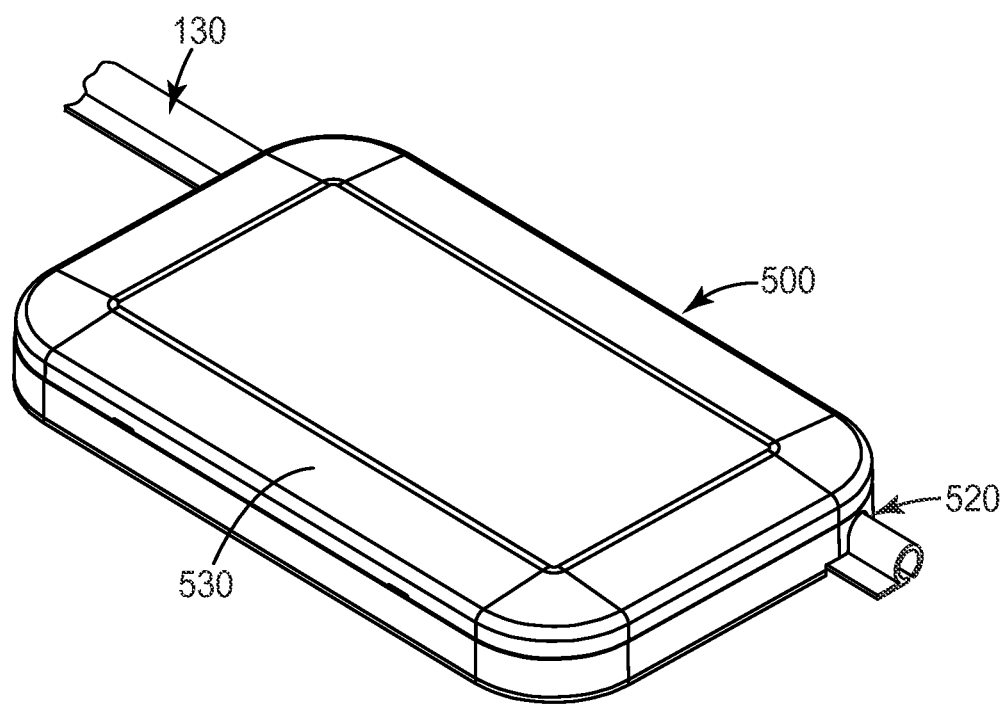
FIG. 9 is an alternative isometric view of an exemplary point of entry box according to an aspect of the invention.

In one aspect, POE box 500 can accommodate one or more coupling devices, such as optical splices and/or fiber connector couplings or adapters for connecting standard optical connectors. In this example, POE box 500 can include one or more splice holders 191 configured to accommodate a fusion and/or mechanical splice. The base portion 510 of the POE box 500 can also include a coupling mounting area 512 that includes one or more adapter or coupling slots, brackets and/or leaf springs to receive an optical fiber connector adapter 194 of one or several different types. In an exemplary aspect, the mounting area can accommodate two optical fiber connector adapters stacked atop one another. In an alternative aspect, the splice holders and the coupling mounting area can be placed in a different area of the access box. In a further alternative, the cover 530 (shown in FIG. 9) can be configured to include a coupling mounting area.

The POE box 500 can further include a fiber slack storage section 514 to route the accessed fiber(s). In this example, optical fiber 190 can be routed (either from the left hand side or right hand side of the mounting section) along one or more fiber guides 515. The fiber is protected from over-bending by bend radius control structures 516 formed in or on base portion 510 in the fiber slack storage section. The fiber slack storage section 514 can include both long and short fiber loop storage structures, such as shown in FIG. 8. In addition, the coupling/adapter orientation can be independent of the service fiber entry point. Also, the wrap direction of the fiber can be reversed using a cross-over section provided in the fiber slack storage section 514 for consistency in mounting configuration of the connectors used within the access box. In one example, up to 50 feet of 900 µm buffered fiber and up to three feet of 3 mm fiber slack can be stored in POE box 500. In an alternative aspect, the cover 530 (FIG. 9) can also accommodate slack storage.

The fiber 190 can be guided to the splice holders 191 or the mounting area of the fiber connector adapter 194 depending on the type of coupling mechanism to be utilized in connecting the optical fibers. In one exemplary embodiment, the fibers feeding the in-living unit FTTH system can be connected utilizing the fiber connector adapter while the fibers serving the in-living unit wireless system (not shown in FIG. 8) can utilize optical fiber splice connections. Fiber connector adapter 194 may be provided in the access box or it may be supplied by the installer and mounted in the coupling mounting area. Fiber connector adapter 194 can comprise a conventional in-line optical fiber coupler or adapter (i.e. an SC connector adapter, an LC connector adapter, etc).

In the example of FIG. 8, optical fiber 190 is field terminated with an optical fiber connector 192a. For example, connector 192a can comprise an optical fiber connector that includes a pre-polished fiber stub disposed in ferrule that is spliced to a field fiber with a mechanical splice, such as described in U.S. Pat. No. 7,369,738. The fiber 190 can be coupled to a drop cable 193 having a connector 192b, such as a conventional SC connector, via fiber connector adapter 194. Other conventional connectors can be utilized for connectors 192a, 192b as would be apparent to one of ordinary skill in the art given the present description.

This exemplary POE box design provides for the placement of splices and/or connectors within the POE box 500 without the need for additional splice trays, inserts, or extra components. Further, the connector coupling can be removed independently (e.g., to connect/disconnect fibers/wires) without disturbing the slack storage area. Moreover, all connections can be housed entirely inside the POE box 500, increasing installation efficiency and cabling protection.

In addition POE box 500 can also provide space for connecting power lines in the horizontal cabling 130 to power lines being fed into the living unit being served by the POE box. For example, power tap device 197 that connects power lines 195 disposed within the horizontal cabling 130 to auxiliary power lines 196 entering the living unit through access hole 501. These auxiliary power lines can be conventional low voltage power lines and are used to provide power to the remote electronics unit described below. An exemplary power tap device includes the 3M™ Scotchlok™ UB2A connector, available from 3M Company (St. Paul, Minn.).

In an alternative aspect, point of entry box 500 be include the 3M™ 8686 termination box available from 3M Company (St. Paul, Minn.).

The remote socket 600 will now be described in more detail.

Figure 10:
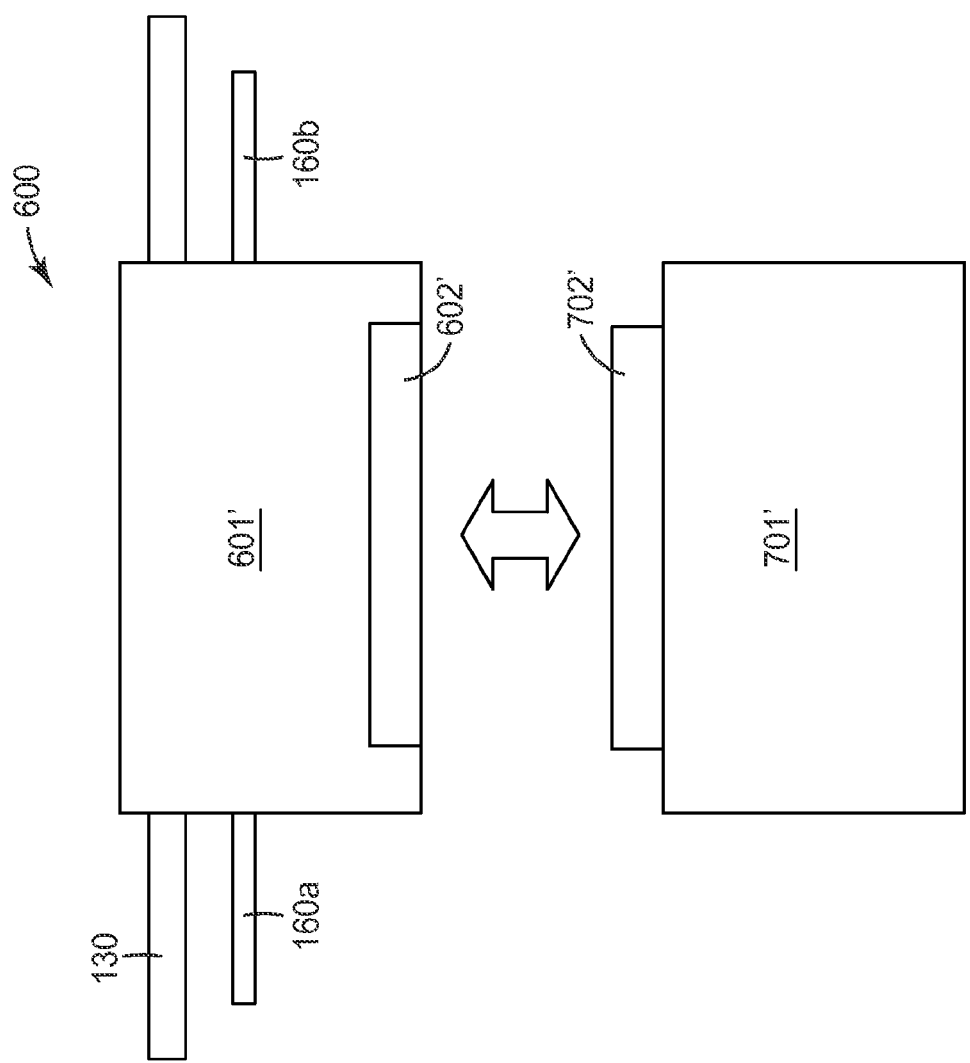
FIG. 10 is a schematic view of a remote socket according to an aspect of the invention.
Figure 44:
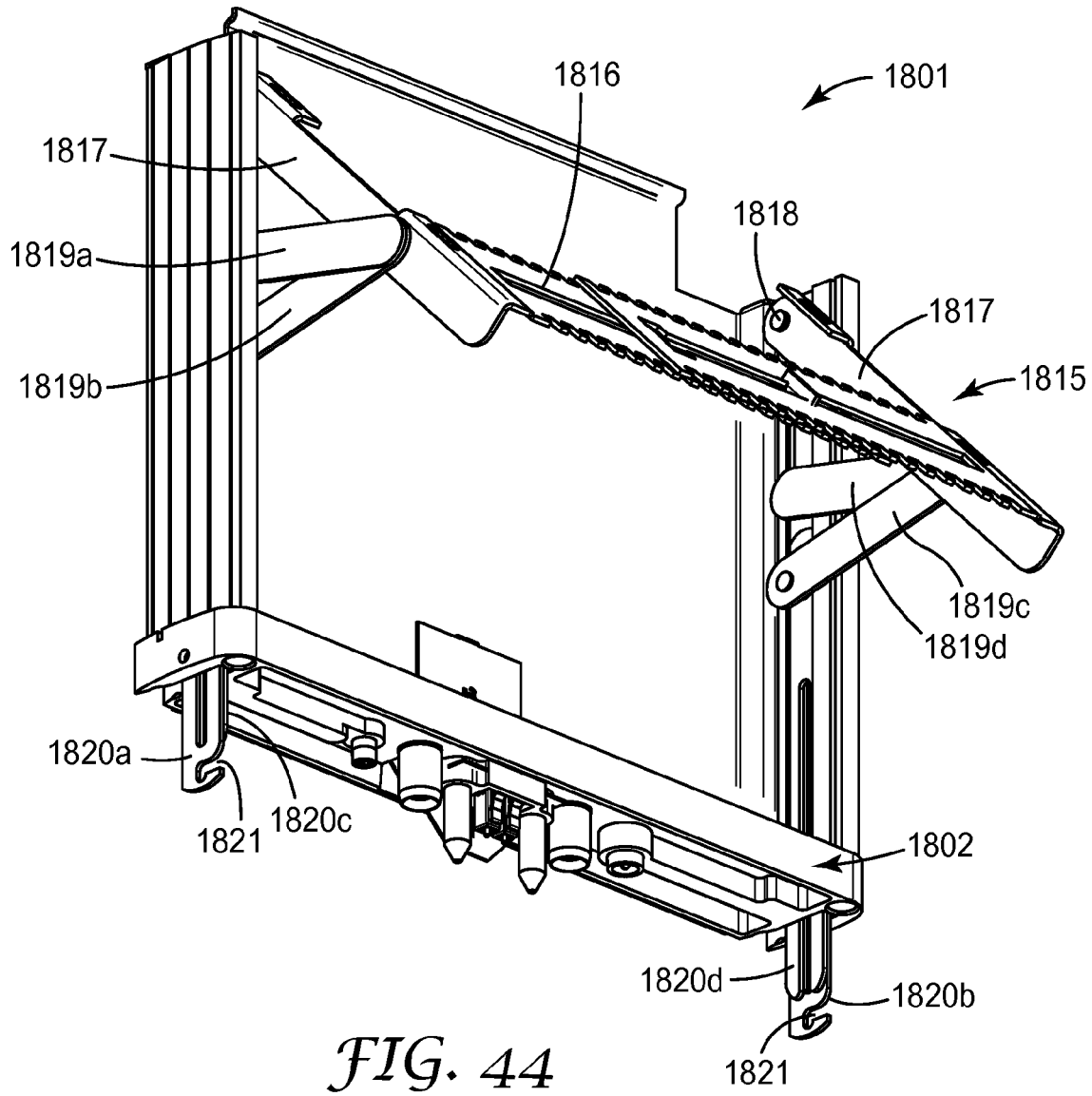
FIG. 44 is an isometric partial view of another alternative remote socket according to another aspect of the invention.
Figure 45:
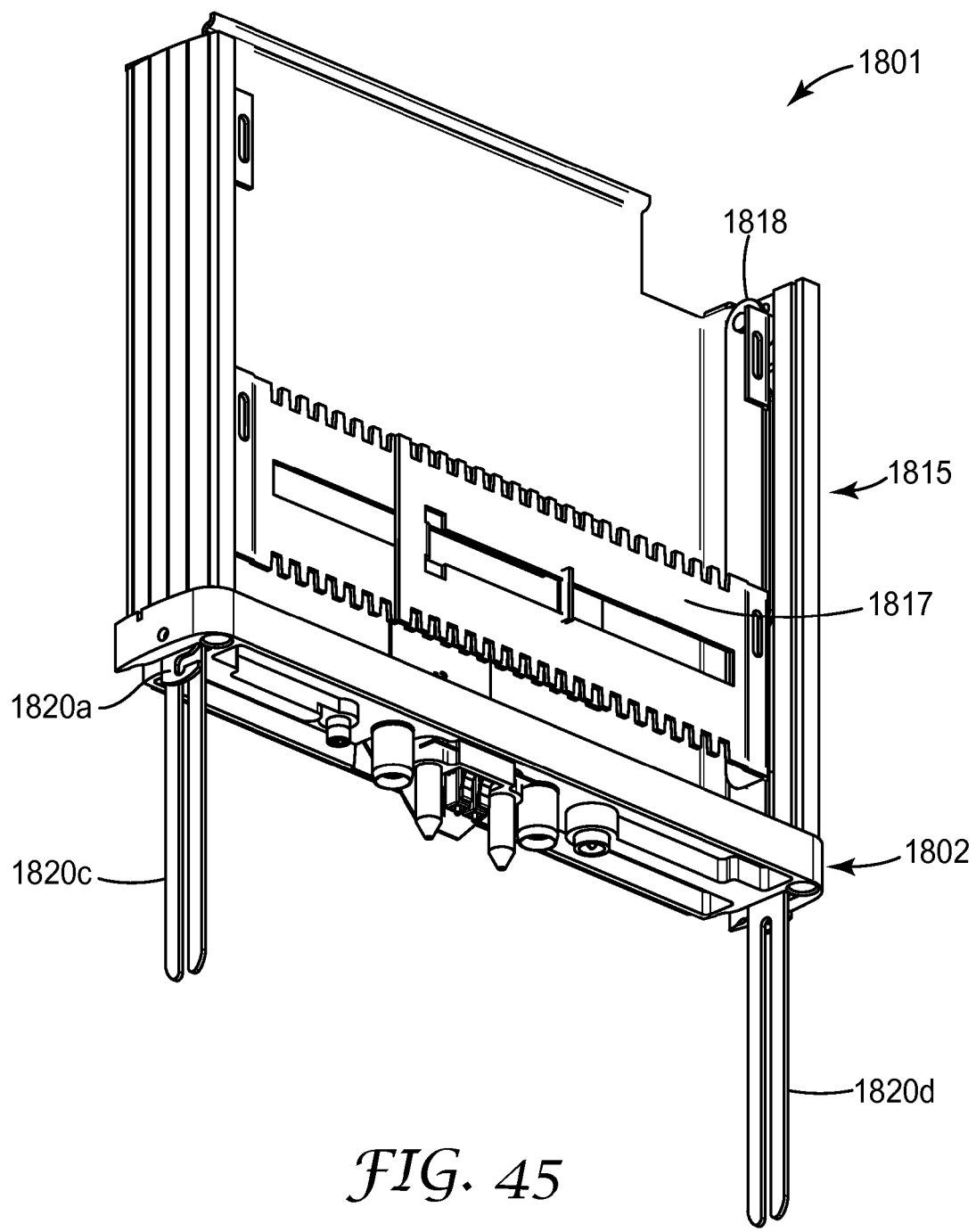
FIG. 45 is another isometric view of the alternative remote socket of FIG. 44 according to another aspect of the invention.

FIG. 10 shows a schematic view of a remote socket according to an aspect of the invention. FIGS. 11-24 show different views of a first embodiment of a remote socket according to an aspect of the invention. FIGS. 25-28 show different views of an alternative embodiment of a remote socket according to an aspect of the invention. FIGS. 29-32 show different views of another alternative embodiment of a remote socket according to an aspect of the invention. FIGS. 40-43 show different views of another alternative embodiment of a remote socket according to an aspect of the invention. FIGS. 44-45 show different views of yet another alternative embodiment of a remote socket according to an aspect of the invention.

As shown in schematic view in FIG. 10, a remote socket 600 includes a socket 601' that acts as a base or docking station to receive a remote electronics unit 701'. This remote socket 600 facilitates and manages the connection of remote electronics to the communication cables described herein. The remote socket interface is designed for plug and play, meaning that new radios can be installed in the system without changing any of the cabling to and from the remote socket. This plug-in feature facilitates maintenance of the radios and upgrade of the radios to the next generation of service (for example from 2G to 3G, or 3G to 4G, etc).

Unit 701' is also referred to herein as a remote radio unit, as this implementation represents one aspect of the invention. However, in alternative aspects of the invention, remote electronics unit 701' may include remote radio units for wireless (PCS, Cellular, GSM, etc) signal distribution, wireless access points for 802.11 (Wi-Fi) transmission, ONT (optical network terminal) units for enterprise grade GPON (gigabit passive optical network), or low power wireless sensors units (such as ZigBee devices) or other networkable devices (e.g. CCTV, security, alarm sensors, RFID sensors, etc.). The socket 601' also allows for the straightforward disconnection of the remote electronics unit '701. In this manner, the remote electronics unit 701 may be replaced from time to time with updated units that plug into socket 601'.

In an alternative aspect, the socket 601' may receive a universal jumper (not shown), which can act as a test jumper to test the integrity of the lines connected to socket 601'. In addition, the universal jumper may be utilized to connect an otherwise non-compliant radio (or other electronic equipment) into the network via the universal jumper.

The connection between the socket 601' and the remote electronics unit 701' is accomplished via socket interface 602' and remote electronics unit interface (plug) 702'. The socket 601' manages the connection of several different types of communication cables: one or more insulated copper wires for DC powering of the electronics/radio unit; one or more optical fibers, twisted pairs, or coaxial cables for RF signal distribution; and one or more coaxial or twin-axial cables for RF signal transmission to antennas. As described in further detail below, the different remote socket embodiments of the present invention can connect multiple media simultaneously through the use of a single, integrated actuation mechanism contained within the remote socket itself.

In another aspect, the socket interface 602' (and/or the remote electronics unit interface 702') can further include a keying feature, such as a simple mechanical keying mechanism, to prevent incompatible electronics units from being mated at the remote socket. For example, an architecture may utilize radios implemented with a CWDM SFP module that is fixed at a given CWDM transmit wavelength. In this aspect, the socket interface 602' (and/or the remote electronics unit interface 702') can be keyed so that only a radio with the correct CWDM wavelength is plugged into the given socket location.

The remote electronics unit 701' converts the signal sent over the structured cable, such as horizontal cable 130, to an RF electrical signal that can be radiated by an antenna attached to the same socket via, for example, coaxial cables 160a and 160b. Frequently, the wireless signal distributed by a DAS hub is sent over optical fibers, such as described above, in the form of a directly modulated analog optical signal or a digitally modulated optical signal. In an alternative aspect, socket 601' includes an integrated antenna that transmits or receives wireless signals.

In a preferred aspect, for a wireless downlink signal, the remote radio (see e.g., remote radio 750 shown in FIG. 12) housed in the unit 701' contains optical-to-electrical conversion (by a PIN photodiode, for example), followed by a low noise, RF pre-amplifier and a RF power amplifier. These RF amplifiers can be narrow band or wide band (>200 MHz). The amplified RF signal is then sent to an antenna, such as distributed antenna 800 (FIG. 1), described further herein, to radiate the wireless signal to mobile user equipment within the building. Wireless signals transmitted by the mobile user equipment (or up-link wireless signals) are picked up by a receiving antenna attached to the remote socket. In some cases the receiving antenna is the same as the downlink transmitting antenna, where the downlink and uplink signals are separated by means of a duplexer; in other cases, there are separate transmitting and receiving antennas for each radio link. The uplink signal is amplified by a low noise amplifier and then converted to a signal form for transmission over the structured cabling system. For an analog radio over fiber system, the uplink RF signal is used to directly modulate a laser diode (for example, a vertical cavity surface emitting laser (VCSEL), or a distributed feedback laser diode). The optical signal from the laser is then coupled into a fiber for transport over the horizontal structured cabling. Other signal forms may be used for uplink and downlink transmission, including digitally modulated optical signals and digitally modulated electrical signals.

Figure 11:
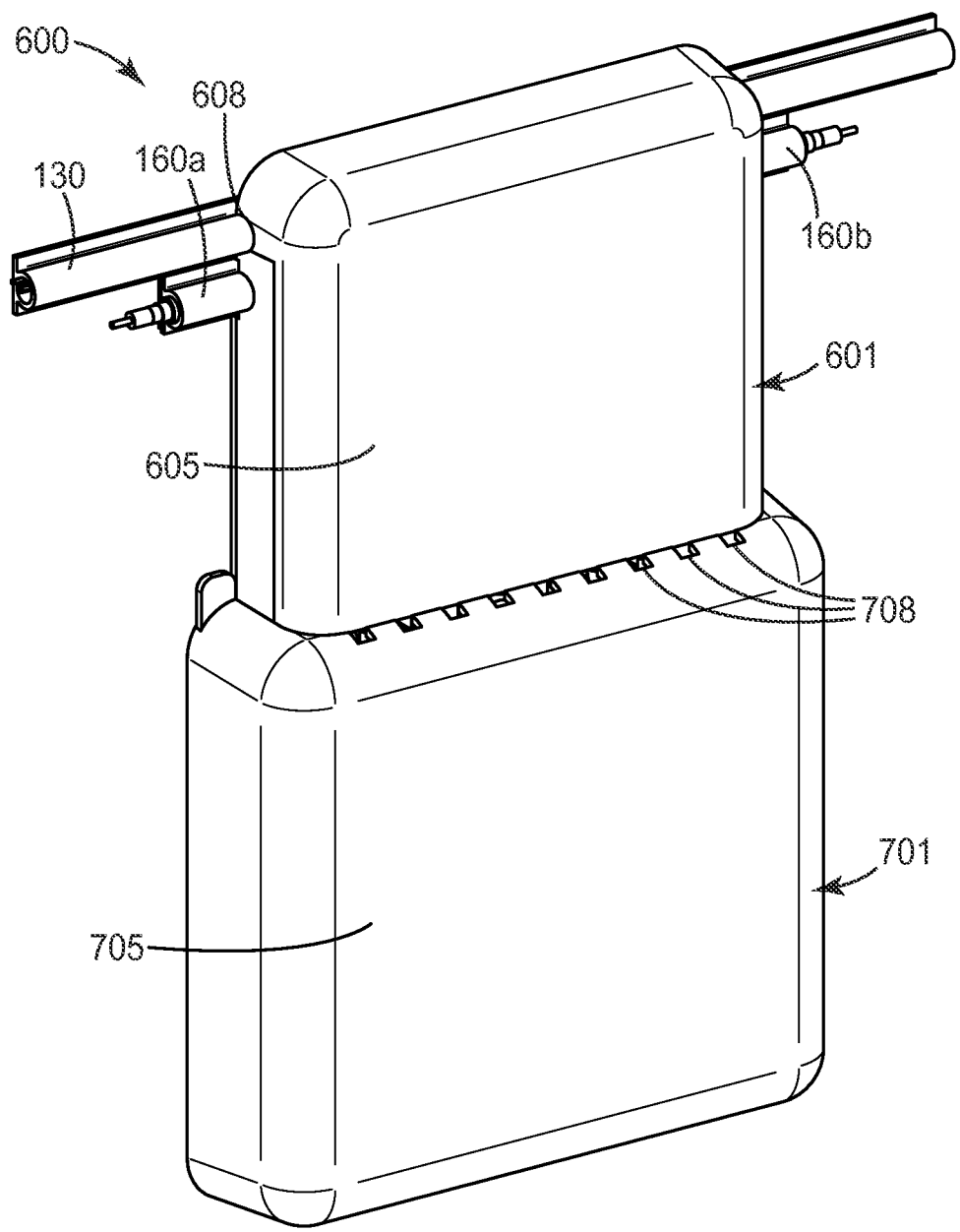
FIG. 11 is an isometric view of an exemplary remote socket according to another aspect of the invention.

An example implementation of a remote socket according to an embodiment of the present invention is remote socket 600 shown in FIGS. 11-24. Remote socket 600 is a wall mountable unit having a socket 601 that acts as a base or docking station to receive a remote electronics unit 701. FIG. 11 shows remote socket 600 in a fully engaged and closed state, where a connection is made between the socket 601 and the remote electronics unit 701. In a preferred aspect of the invention, the remote electronics unit 701 can simply be plugged into socket 601 in a single action to activate the remote electronics.

As shown in FIG. 11, socket 601 includes a cover 605 that houses the contents of socket 601. The cover 605 is preferably a low profile cover that has an aesthetically pleasing appearance and snugly fits over frame portion 611 (see FIGS. 12 and 23). In addition, cover 605 can include cover cut outs 608 that can conform to the outer shape of horizontal cabling 130 and (in some aspects) coaxial cables 160*a*, 160*b* to allow cover 605 to fit over horizontal cabling 130 and/or coaxial cables 160*a*, 160*b*. Cover 605 is preferably made from a rigid plastic material, although it can also be made from a metal or composite. Cover 605 can optionally include indentations or other surface gripping structures to aid an installer during the connection process, as explained in more detail below.

Remote electronics unit 701 also includes a cover 705 that houses the contents of electronics unit 701. Cover 705 is preferably a low profile cover that has an aesthetically pleasing appearance. In addition, cover 705 can further include vents 708 that provide airflow passages for air to enter and exit the electronics unit 701. Cover 705 is preferably made from a rigid plastic material, although it can also be made from a metal or composite. Cover 705 preferably fits snugly about the perimeter of support plate 710 (see FIG. 12).

Figure 12:
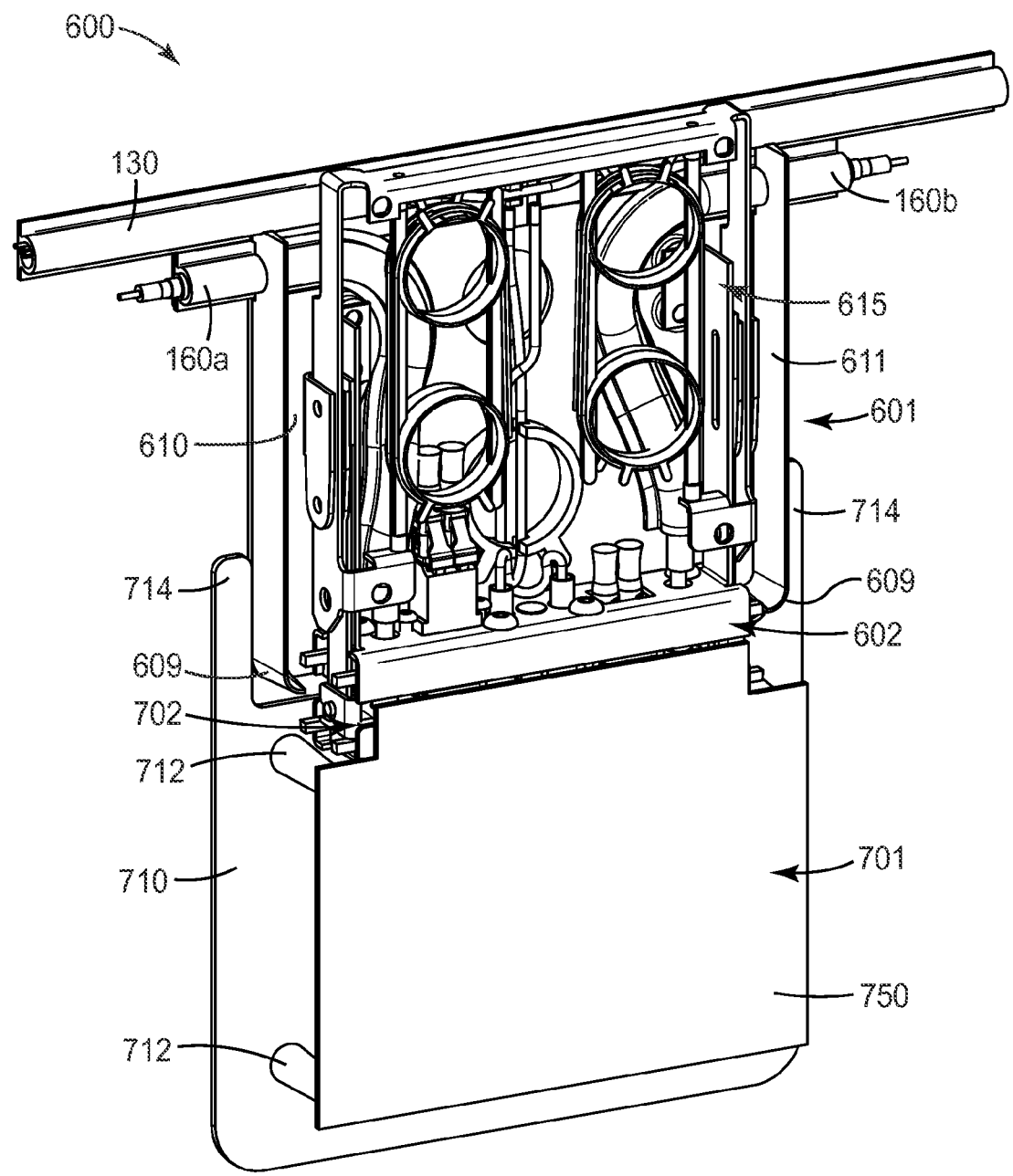
FIG. 12 is an isometric partial view of the exemplary remote socket of FIG. 11 according to another aspect of the invention.

FIG. 12 shows remote socket 600 with covers 605, 705 removed for simplicity. Socket 601 includes a frame portion 611, made from rigid metal or plastic that aligns with an edge of cover 605. The frame portion 611 provides general alignment for the installation of the remote electronics unit 701, as explained in further detail below. A support plate 610 provides further support for the socket 601 and the components therein and provides a rear mounting surface against a wall.

As shown in FIG. 12, exemplary socket 601 houses an actuation mechanism 615 that provides for connection of the socket interface 602 with the remote electronics unit interface 702 in a single action. As described in more detail below, actuation mechanism 615 can be constructed as a fully integrated apparatus that obviates the needs for separate tooling and enables simultaneous connection of the multiple media of the socket interface 602 with the corresponding media of the remote electronics unit interface 702. In an alternative embodiment of the invention, the actuation mechanism can be disposed within the remote electronics unit (see e.g., FIGS. 25-28).

The remote electronics unit 701 includes a generally planar support plate 710 to support an electronics unit, here a remote radio circuit 750, which is mounted on posts 712, that provides for wireless communication within the building or structure. In this exemplary aspect, the remote radio circuit 750 is configured as a printed circuit board (PCB) or card that is coupled to the remote electronics unit interface 702. Of course, the construction of the remote radio does not have to be that of a PCB or card, as other remote radio designs can be accommodated by unit 701.

In a preferred aspect, the remote radio can be powered via DC power lines connected to the remote electronics unit 701 via the socket/radio interface 602, 702. As mentioned above, the remote radio 750 can be configured to provide optical-to-electrical conversion and RF power amplification, where amplified RF signal is sent to an antenna to radiate the wireless signal to mobile user equipment within the building. Wireless signals transmitted by the mobile user equipment are picked up by a receiving antenna attached to the structured cabling described herein, and the uplink signal is amplified and converted by the remote radio 750 to a signal form for transmission over the structured cabling system. An AC231 module from Fiber Span [Branchburg, N.J.] is an example of a small, low power, broadband, RoF transceiver that could be housed in unit 701. In alternative aspects, the remote radio 750 can be replaced by cameras, sensors, alarms, monitors and Wi-Fi, picocell or femtocell types of equipment.

In addition, in this exemplary aspect, the remote electronics unit 701 can include guiding structures, such as guide fingers 714 that extend from a top portion of the support plate 710 to provide an installer with a gross alignment prior to actuating the connection. For example, during installation, the guide fingers can contact guide pieces 609 formed on the frame portion 611 of the socket 601 that extend outward from the support plate 610, to provide an initial alignment off of the wall where the socket is already mounted.

Figure 13:
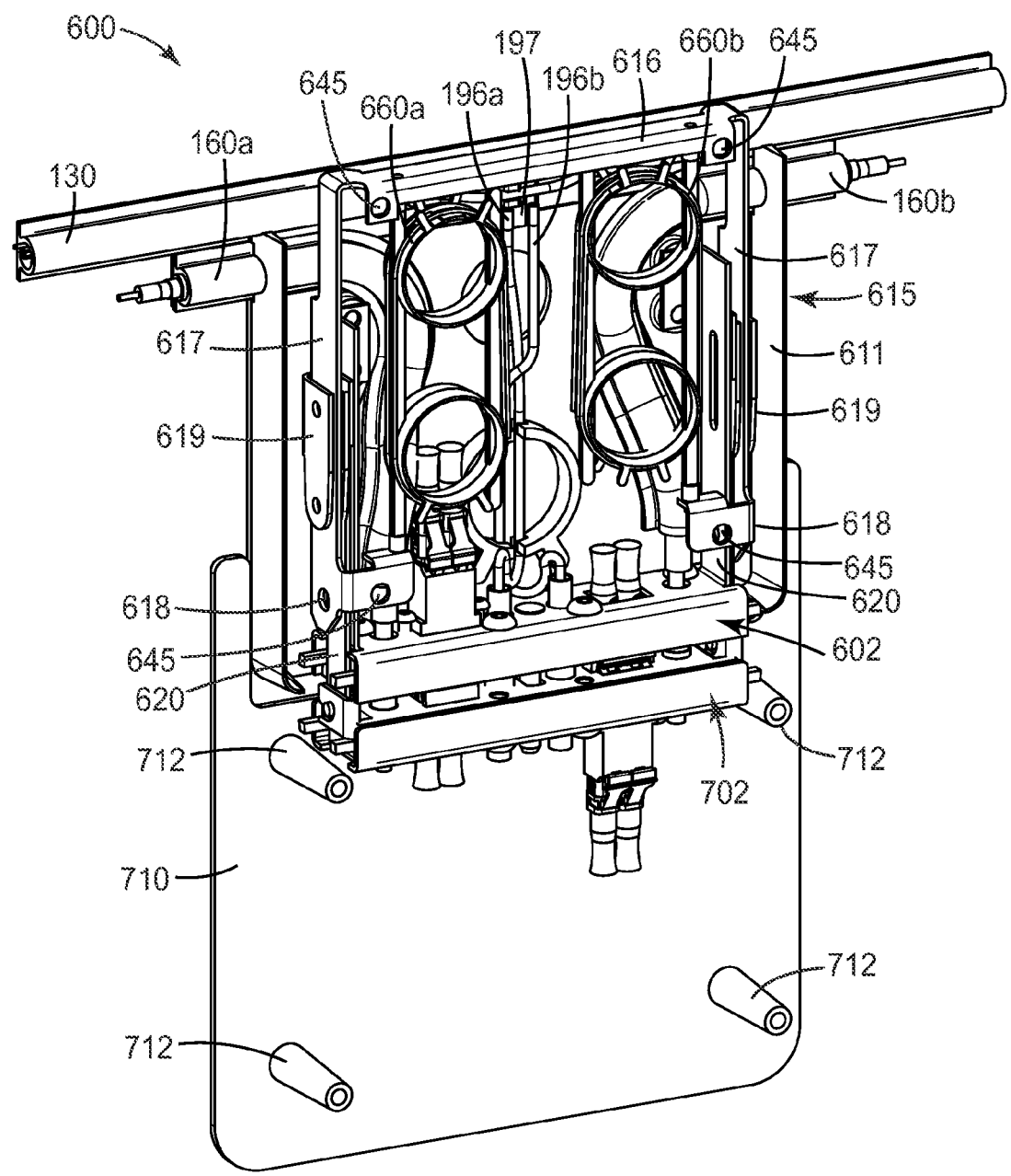
FIG. 13 is an isometric partial view of the exemplary remote socket of FIG. 11 according to another aspect of the invention.

FIG. 13 shows remote socket 600 without covers 605, 705 and with the remote radio circuit 750 removed for simplicity. As mentioned above, exemplary socket 601 houses an actuation mechanism 615 that provides for connection of the socket interface 602 with the remote electronics unit interface 702. In this exemplary aspect, the actuation mechanism 615 includes a cross support bar 616 that stretches across vertical support bars 617. This support structure pivots outward (away from the support plate 610) about pivot mechanism 618, located at either side of the socket interface 602. The actuation mechanism 615 is designed to lower and raise two extendable guide rails 620 (connected to the vertical support bars 617 via compression/tension links 619) that can engage the remote electronics unit interface 702, as described in more detail with respect to FIG. 16 and further below. In a preferred aspect, the support structure for the actuation mechanism 615 can also be used to help maintain proper positioning of the cover 605, which can include protrusions on its underside (not shown) that are received in guide holes 645 formed at various locations on the support structure for the actuation mechanism. This guide hole engagement helps prevent unwanted movement of the cover after installation of the socket 601.

Figure 16:
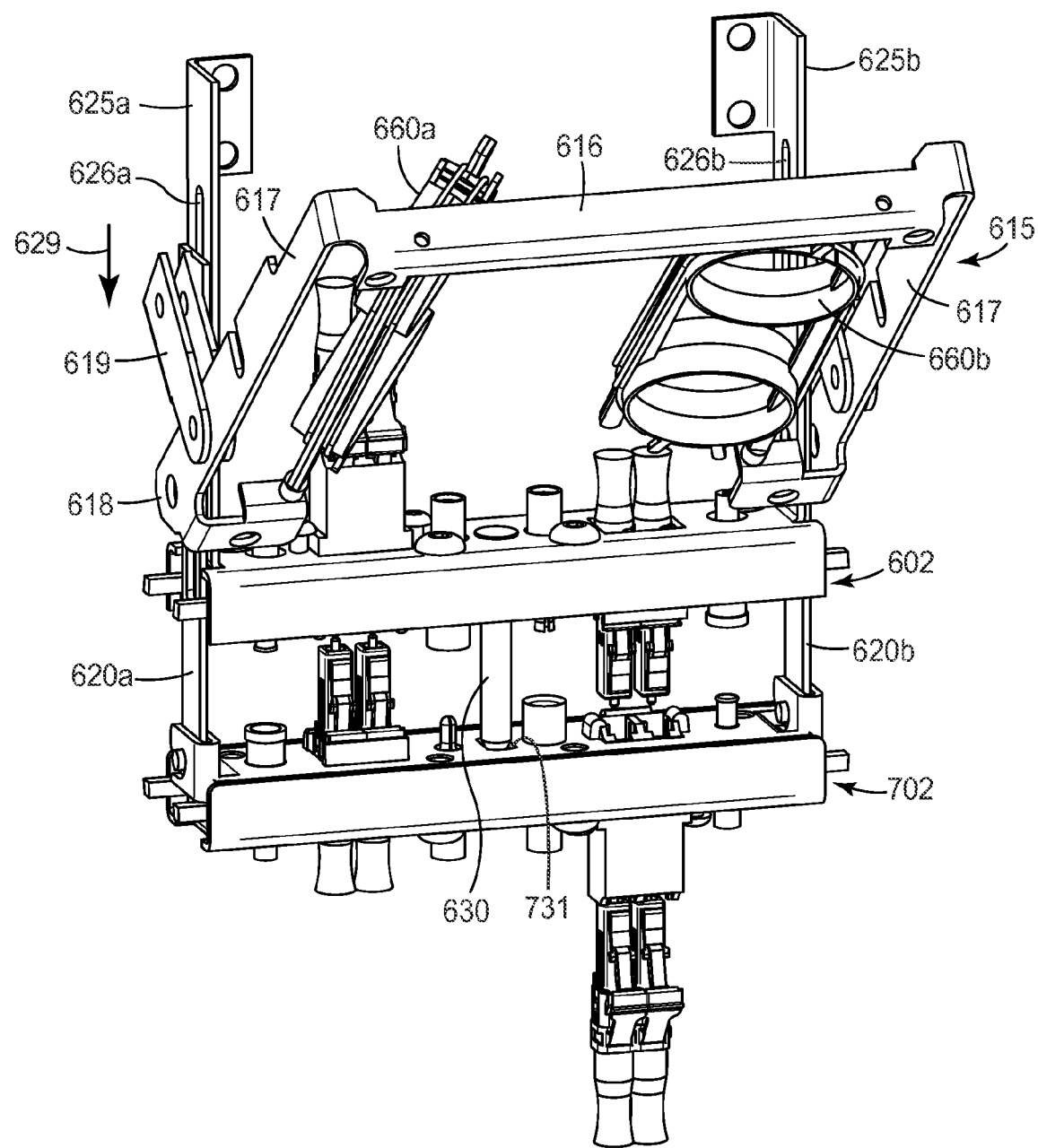
FIG. 16 is an isometric partial view of the exemplary remote socket of FIG. 11 in a disconnected state according to another aspect of the invention.

In another aspect of this embodiment, the support structure for the actuation mechanism 615 can also be used to support one or more slack storage structures 660*a*, 660*b*. The slack storage structures 660*a*, 660*b* provide storage for excess lengths of optical fibers pulled from horizontal cabling 130, and are described in more detail below. As shown in FIG. 13, the slack storage structures 660*a*, 660*b* can be coupled between cross bar 616 and pivot mechanism 618. In a preferred aspect, as is shown in FIG. 16, the slack storage structures 660*a*, 660*b* can be rotatable within the socket 601. Additional slack storage structures, such as auxiliary slack storage reel 661 (see FIG. 14) and pivoting fiber guides can be provided to reduce axial strain on the terminated fibers.

Other media from horizontal cabling 130, such as power lines, can be provided at the socket. For example, FIG. 13 shows a power tap device 197 that connects power lines disposed within the horizontal cabling 130 to the socket interface 602 via auxiliary power lines 196*a*, 196*b*. These auxiliary power lines can be conventional low voltage power lines and are used to provide power to the remote electronics unit 701. An exemplary power tap device includes the 3M™ Scotchlok™ UB2A connector, available from 3M Company (St. Paul, Minn.).

In an alternative aspect of the invention, DC power can be provided to each remote socket location via separate, dedicated power lines, such that power taps are not required.

In addition, as shown in FIG. 13, coaxial cables 160*a*, 160*b* can extend through the socket 601 along support plate 610 directly into the coaxial connectors mounted in the socket interface 602. The coaxial cables 160a, 160b can be configured similarly to the adhesive-backed structured cabling described herein with respect to FIGS. 7A-7C. Alternatively, the coaxial cables do not have to be adhesively-backed and can comprise conventional, small coaxial cables such as LMR195 or LMR240, available from Times Microwave, Systems (Wallingford, Conn.).

Figure 14:
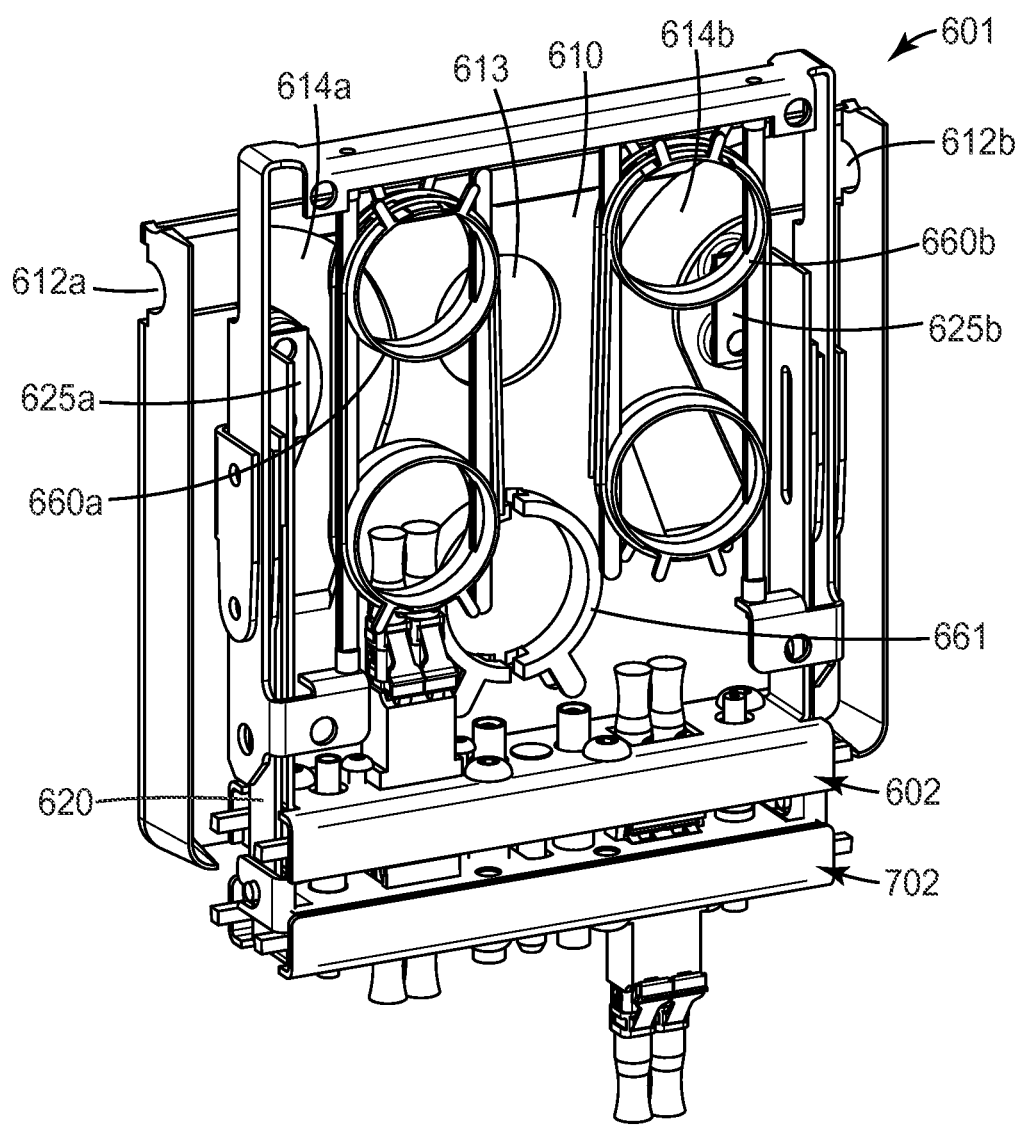
FIG. 14 is an isometric partial view of the exemplary remote socket of FIG. 11 according to another aspect of the invention.

FIG. 14 shows a more detailed view of the socket 601 with the structured cabling removed from the figure. As such, frame cutouts 612a, 612b can be viewed, where these cutouts are configured to fit over the outer surface of the coaxial cables 160a, 160b routed from the socket 601. In a preferred aspect of this embodiment, the support plate 610 can include cable channels 614a, 614b (see also FIG. 22) which provide a path for the coaxial cables 160a, 160b to exit the socket 601 and allow the adhesive backing of coaxial cables 160a, 160b to contact the wall surface. In addition, support plate 610 includes a rear access port 613 (see also FIG. 22) that can be utilized to access additional cabling or other equipment that may be brought in through the mounting wall. FIG. 14 also provides a clearer view of guide rail support brackets 625a, 625b, which are mounted to support plate 610 and are provided to further support the extendable guide rails 620. In addition, auxiliary slack storage reel 661 can be disposed on support plate 610 to help store and route additional optical fibers within socket 601.

Figure 15:
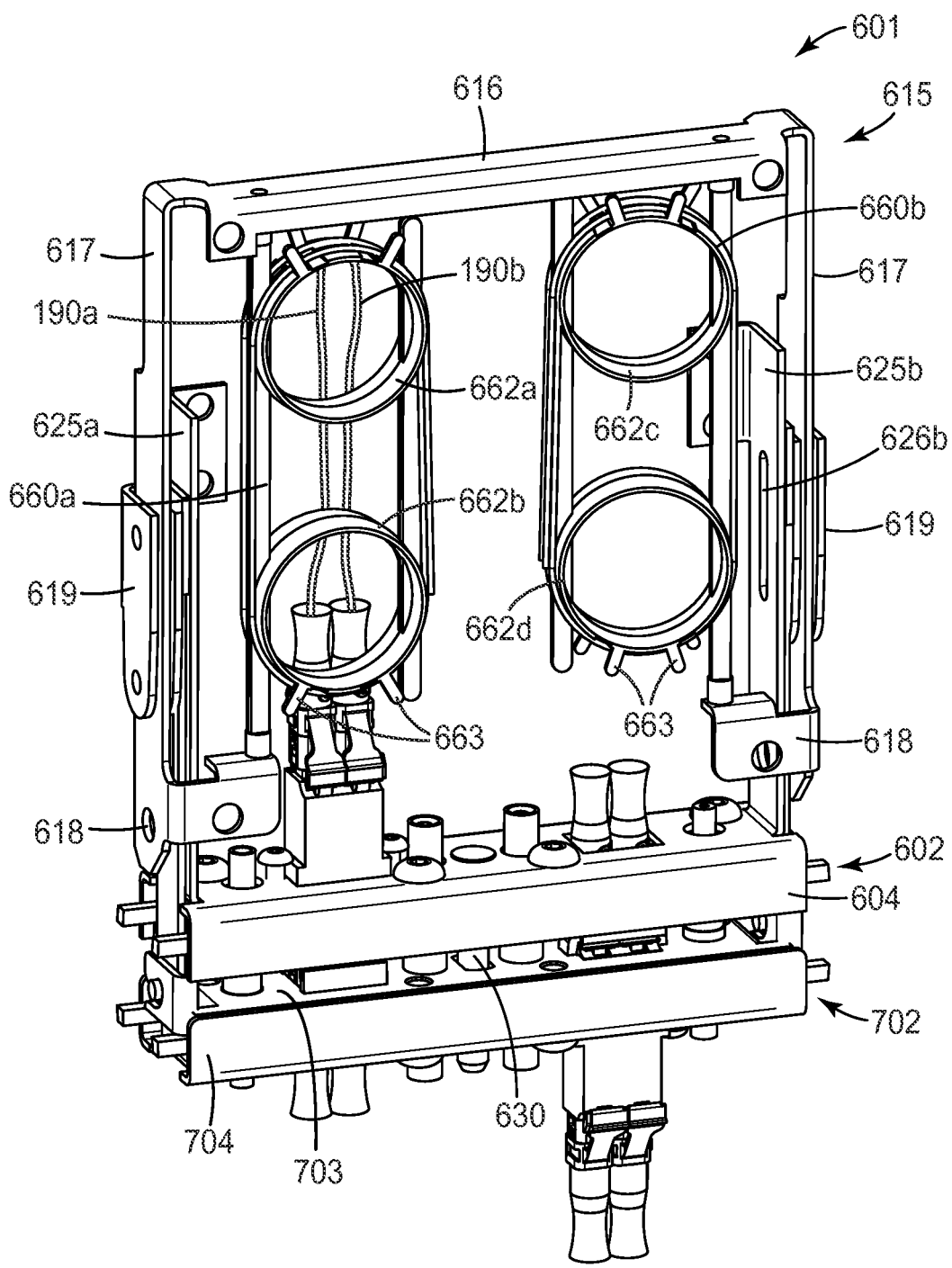
FIG. 15 is an isometric partial view of the exemplary remote socket of FIG. 11 according to another aspect of the invention.

FIG. 15 shows a more detailed view of socket 601 with the support plate 610 removed. In this exemplary aspect, slack storage structure 660a contains fiber reels 662a and 662b, and slack storage structure 660b contains fiber reels 662c and 662d. The optical fibers 190a, 190b have been removed from the horizontal cabling (not shown in this figure for simplicity) for connection to the remote electronics unit interface 702. In particular, excess lengths of the optical fibers are stored and routed via slack storage structure 660a such that each fiber can be terminated using a field terminated optical connector 192a, 192b (described in more detail below). In addition, each of the fiber reels 662a-662d includes one or more retention structures 663 that helps to prevent the optical fibers from being displaced from their storage reels. In alternative aspects, for some applications, socket 601 can accommodate up to four optical fibers removed from the horizontal cabling at the socket location.

In an exemplary aspect of the invention, each of the interfaces 602, 702 includes a two piece structure, where an interface body 603, 703 is supported by an interface backbone 604, 704, formed from a rigid material, such as sheet metal that provides additional support for the multimedia components mounted on the interface body. In this manner, the interface body elements can comprise molded plastic pieces having the exact same structure (e.g., coming from the same molding process), each interface body having a plurality of ports to receive multiple media connectors. As a result, alignment between socket interfaces can be more easily achieved during connection.

FIGS. 11-15 show interfaces 602, 702 in a connected state. In FIG. 16, interfaces 602, 702 are shown in a separated, disconnected state. In addition, FIG. 16 shows the support bars 616, 617 pulled forward, which lowers the extendable guide rails 620a, 620b in the direction of arrow 629. As shown, the compression/tension link 619 maintains a connection between the vertical support bars 617 and the extendable guide rails 620a, 620b. The guide rails are further supported by guide rail support brackets 625a, 625b, each of which includes one or more longitudinal slots 626a, 626b, that permits the raising and lowering of extendable guide rails 620a, 620b via the pivot mechanism 618, which is secured to the guide rail support brackets 625a, 625b. The guide rail support brackets 625a, 625b can be secured to the support plate 610 (not shown in FIG. 16) via conventional fasteners (not shown).

Figure 17:
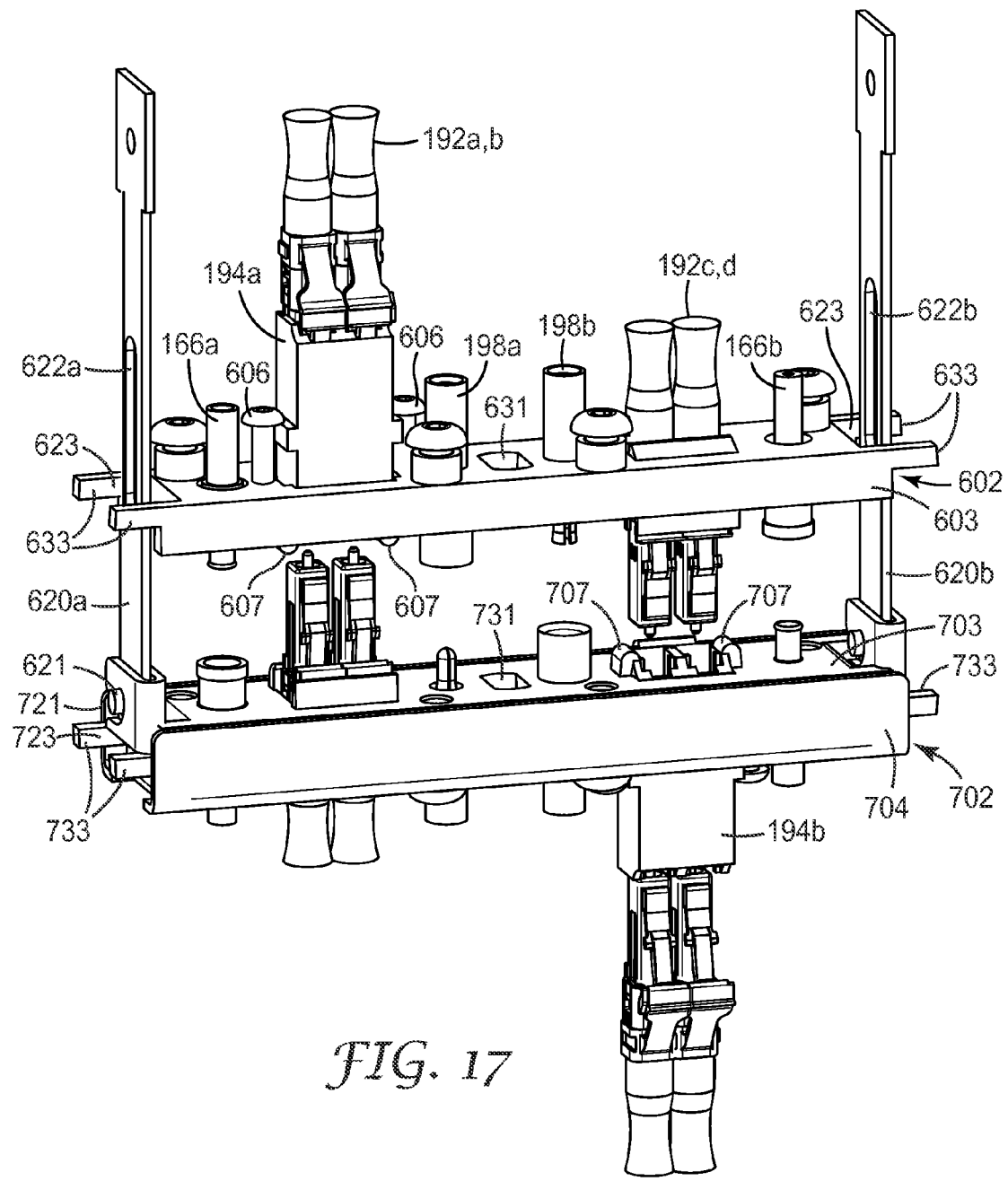
FIG. 17 is an isometric partial view of the exemplary remote socket of FIG. 11 in a disconnected state according to another aspect of the invention.
Figure 18:
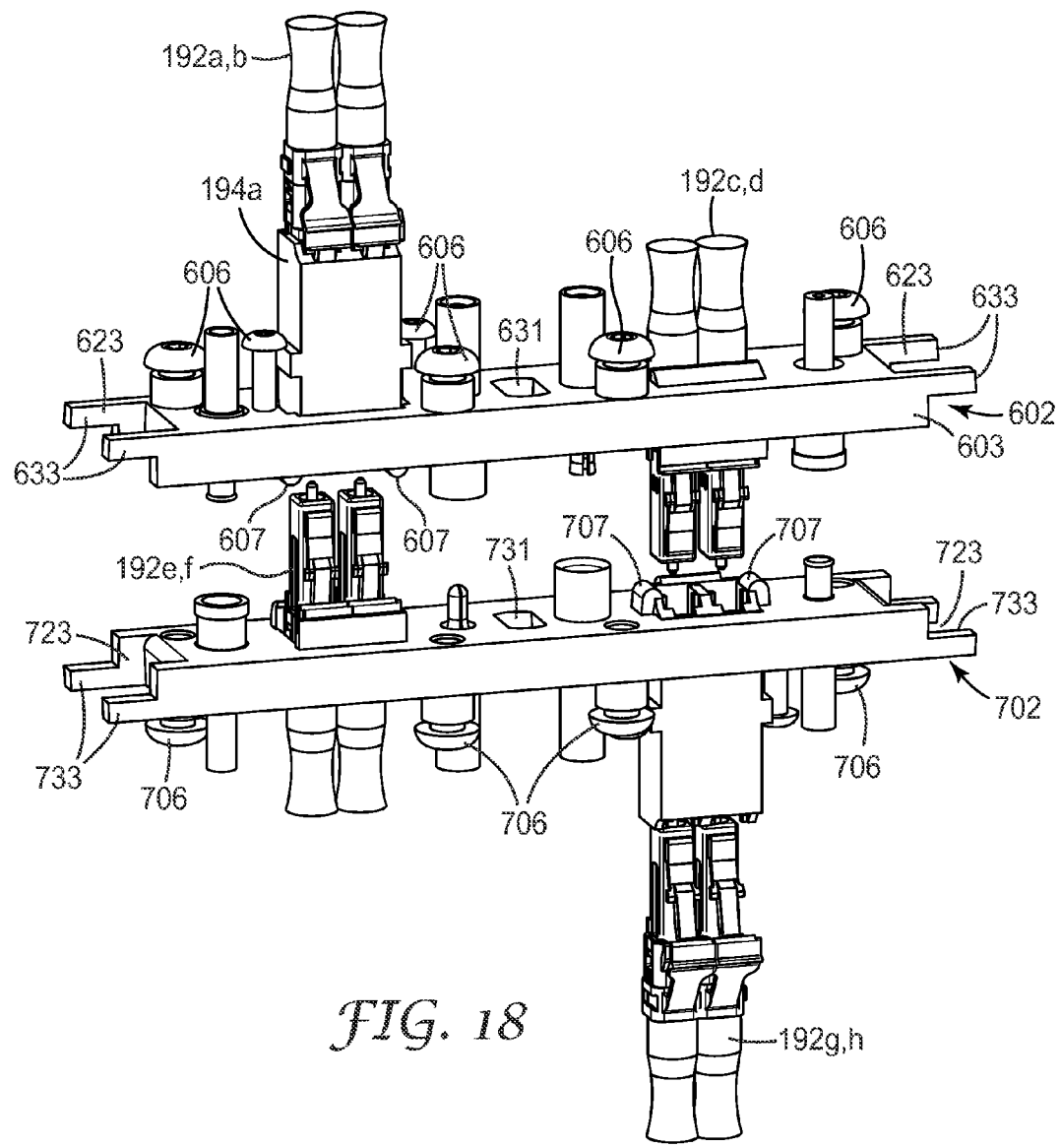
FIG. 18 is an isometric partial view of the exemplary remote socket of FIG. 11 in a disconnected state according to another aspect of the invention.

FIG. 16 also shows a central guide pin 630 disposed in a central portion of socket interface 602 (see central guide pin port 631 shown in FIGS. 17 and 18). In a preferred aspect, the central guide pin 630 is received by a central guide port 731 formed in the remote electronics unit interface 702. The central guide pin can be configured to prevent a sideways slide of the interface bodies with respect to each other, as well as help align the interfaces during connection. In addition, FIG. 16 shows slack storage structures 660a, 660b in partial rotated states.

FIG. 17 shows the socket and remote electronics unit interfaces 602, 702, in a separated, disconnected state. In addition, the support bars of the actuation mechanism have been removed for simplicity, as has the socket interface backbone 604. As is shown in this exemplary aspect, the extendable guide rails 620a, 620b can each include a latching pin 621 that engages with a corresponding engagement slot 721 provided on the remote electronics unit interface 702. Each extendable guide rail can slide though a recess region 623 formed between protrusions 633 on an end portion of the socket interface body 603. The corresponding recess 723 formed between protrusions 733 of the remote electronics unit interface body 703 can support the structure having engagement slot 721. FIG. 17 also shows that the extendable guide rails 620a, 620b each include a guide rail slot 622a, 622b that allows the extendable guide rails 620a, 620b to pass through the pivot mechanism 618.

FIGS. 17 and 18 provide a more detailed view of several exemplary connectors that can be utilized in the remote socket. In FIGS. 17 and 18, the socket interface 602 and the remote electronics unit interface 702 are in a separated, disconnected state. As mentioned above, the socket manages the connection of several different types of communication cables: one or more insulated copper wires for DC powering of the electronics/radio unit; one or more optical fibers, twisted pairs, or coaxial cables for RF signal distribution, and one or more coaxial or twin-axial cables for RF signal transmission to antennas. As such, the interface 602, 702 includes corresponding connectors for each of those different media. For example, socket interface 602 includes coaxial connectors 166a, 166b to provide a connection to the coaxial cables linking the remote socket to one or more of the distributed antennas. For example, commercially available MMCX connectors made by Amphenol RF (Danbury, Conn.) can be utilized. In addition, low voltage power line connectors 198a, 198b can be provided on socket interface 602 to provide power to the remote electronics unit. For example, commercially available power pin connectors, such as Molex 093-series of plugs and socket receptacles, and/or components thereof, can be utilized. Other similarly constructed commercially available power connectors can also be utilized.

In addition, field terminated optical fiber connectors, 192a,b and 192c,d can be provided to couple the RF optical fiber signals to the remote electronics unit. In this exemplary aspect, the connectors 192a,b and 192c,d are duplex LC connectors available from 3M Company, St. Paul Minn. that are mounted in a standard LC duplex fiber connector adapters, such as connector adapter 194a mounted in interface body 603 and connector adapter 194b mounted in interface body 703. In alternative aspects, different optical connector formats may be utilized.

Each of the aforementioned connectors can be mounted on the interface body 603, 703 via a corresponding port formed in the body. Various fasteners 606, 706 can be used to secure different connectors or connector mounts in place. In a further exemplary aspect, for the optical fiber connectors, lead-in mount members 607, 707 are provided on the interface facing surfaces of the interface bodies 603, 703 to help secure the fiber connector adapters in their mounting positions. In addition, lead-in mount members 607, 707 can have a tapered or sloped construction for guiding the approaching LC connectors into the connector adapter during the connection process.

In an alternative aspect, socket interface optical fiber connectors 192a,b can be plugged into a small, pluggable optical-to-electrical transceiver, such as a small form factor pluggable (SFP) module, that is mounted in the socket interface 602. The SFP module converts the optical signal to an electrical signal that is then received by the remote electronics unit 701 upon connection. This alternative aspect permits an all-electrical interface with the remote electronics unit. Note that the SFP module is one example of a modular, small, pluggable optical-to-electrical transceiver. Additional examples of such modular transceiver include: SFP+, XFP, QSFP+, CFP, CFP3, CFP4, etc.

Figure 19:
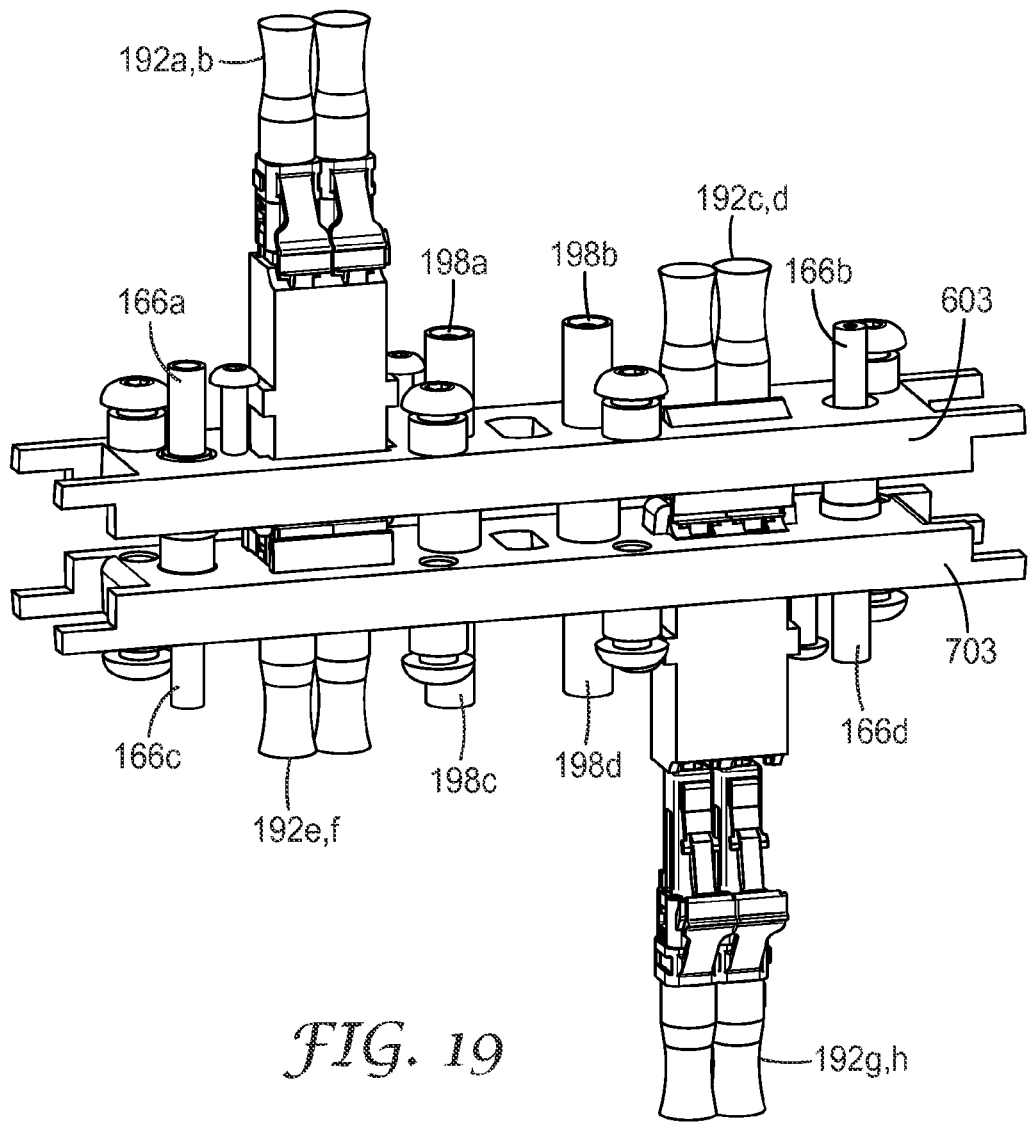
FIG. 19 is an isometric partial view of the exemplary remote socket of FIG. 11 in a connected state according to another aspect of the invention.

FIG. 19 shows a more detailed view of the socket interface body 603 and the remote electronics unit interface body 703 in a connected state, where each form of media is connected via the exemplary connectors described herein. In particular, socket interface coaxial connectors 166a, 166b are connected to their counterpart remote electronics unit connectors 166c, 166d; socket interface power connectors 198a, 198b are connected to their counterpart remote electronics unit power connectors 198c, 198d; and socket interface optical fiber connectors 192a,b, 192c,d are connected to their counterpart remote electronics unit optical fiber connectors 192e,f, 192g,h.

Figure 20:
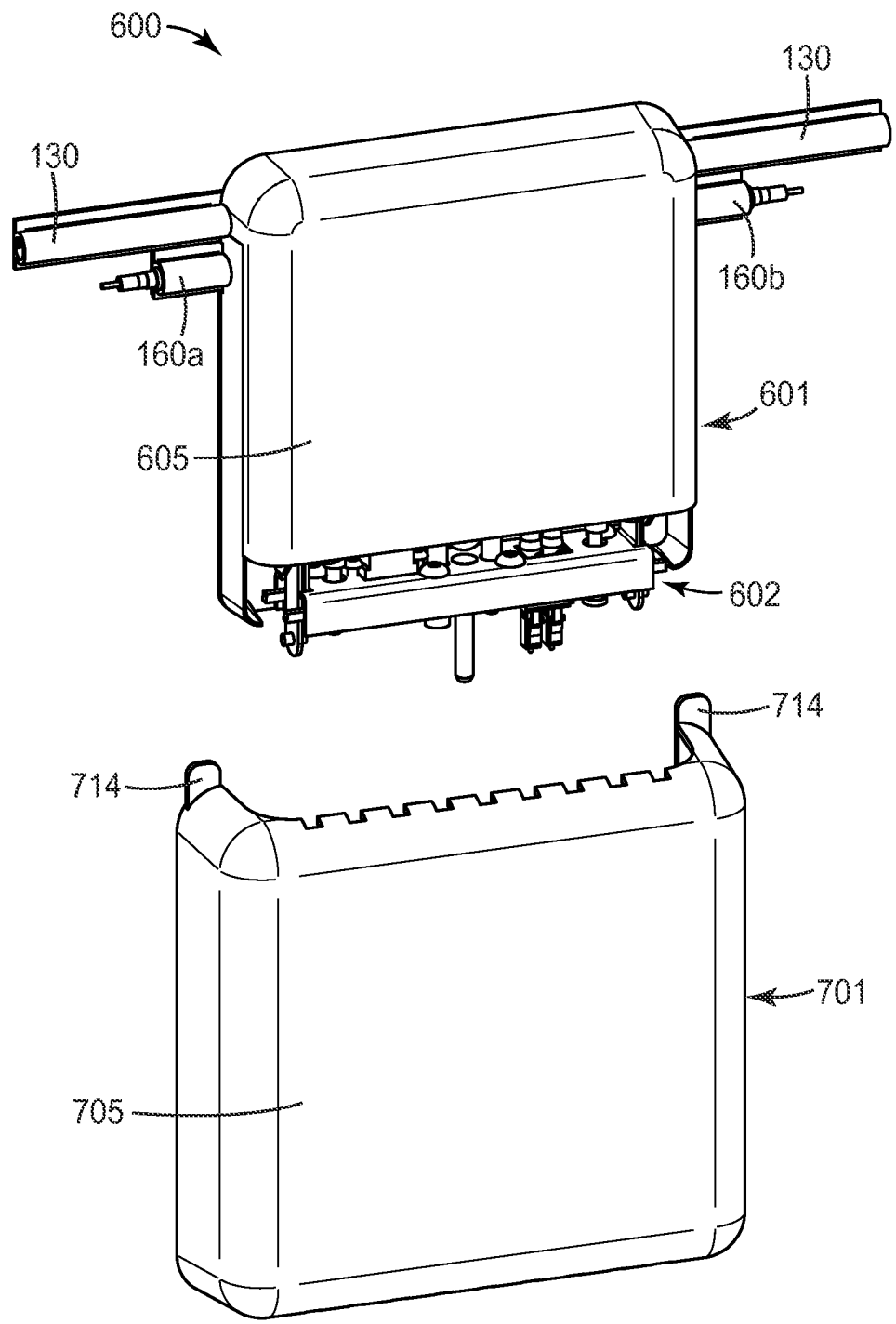
FIG. 20 is an isometric view of the exemplary remote socket of FIG. 11 in a disconnected state according to another aspect of the invention.

In another preferred aspect, an exemplary installation process to connect the remote electronics unit 701 with the socket 601 will now be described with respect to FIGS. 20-24. In this example, the remote electronics unit 701 includes a remote radio unit that operates according to RF over fiber principles. FIG. 20 shows an exemplary socket 601 and an exemplary remote electronics unit 701 in a separated, disconnected state. The socket 601 is installed in a room or hallway within a building at a suitable location coinciding with the location of the horizontal cabling 130 installed within the building.

A window cut 159 (see FIG. 21) can be made in the horizontal cabling 130 to provide access to one or more optical fibers disposed in the duct that are designed to carry a directly modulated analog optical signal or a digitally modulated optical signal. The socket 601 can then be mounted at that window cut location via conventional fasteners (not shown), such as screws or bolts that extend through the socket support plate 610 into the mounting wall. The socket 601 fits over the window cut so the remaining fibers in the horizontal cabling are not exposed once the socket 601 is installed. Although not shown, excess lengths of the one or more fibers accessed from the horizontal cabling 130 can be routed and stored on the slack storage structures 660a, 660b. For example, two optical fibers can be field terminated into optical fiber connectors such as the field terminated LC optical connectors 192a,b described above. An exemplary optical fiber field termination process is described U.S. Patent Publication No. 2009-0269014, incorporated by reference herein in its entirety.

In addition, the power lines disposed in horizontal cabling 130 can be tapped, such as by a power tap 197 and connected to terminated power lines, such as auxiliary power lines 196a, 196b. The terminated ends of auxiliary power lines 196a, 196b can be connected to power connectors, such as connectors 198a, 198b described above. Also, the RF coaxial connectors, such as coaxial connectors 166a, 166b can be coupled to coaxial cables, such as the adhesive-backed coax cables 160a, 160b (shown in FIG. 21), or alternative coaxial connectors. In the exemplary installation process of the present invention, the order in which the different media are coupled to the connectors of the socket interface 602 is not significant.

Figure 21:
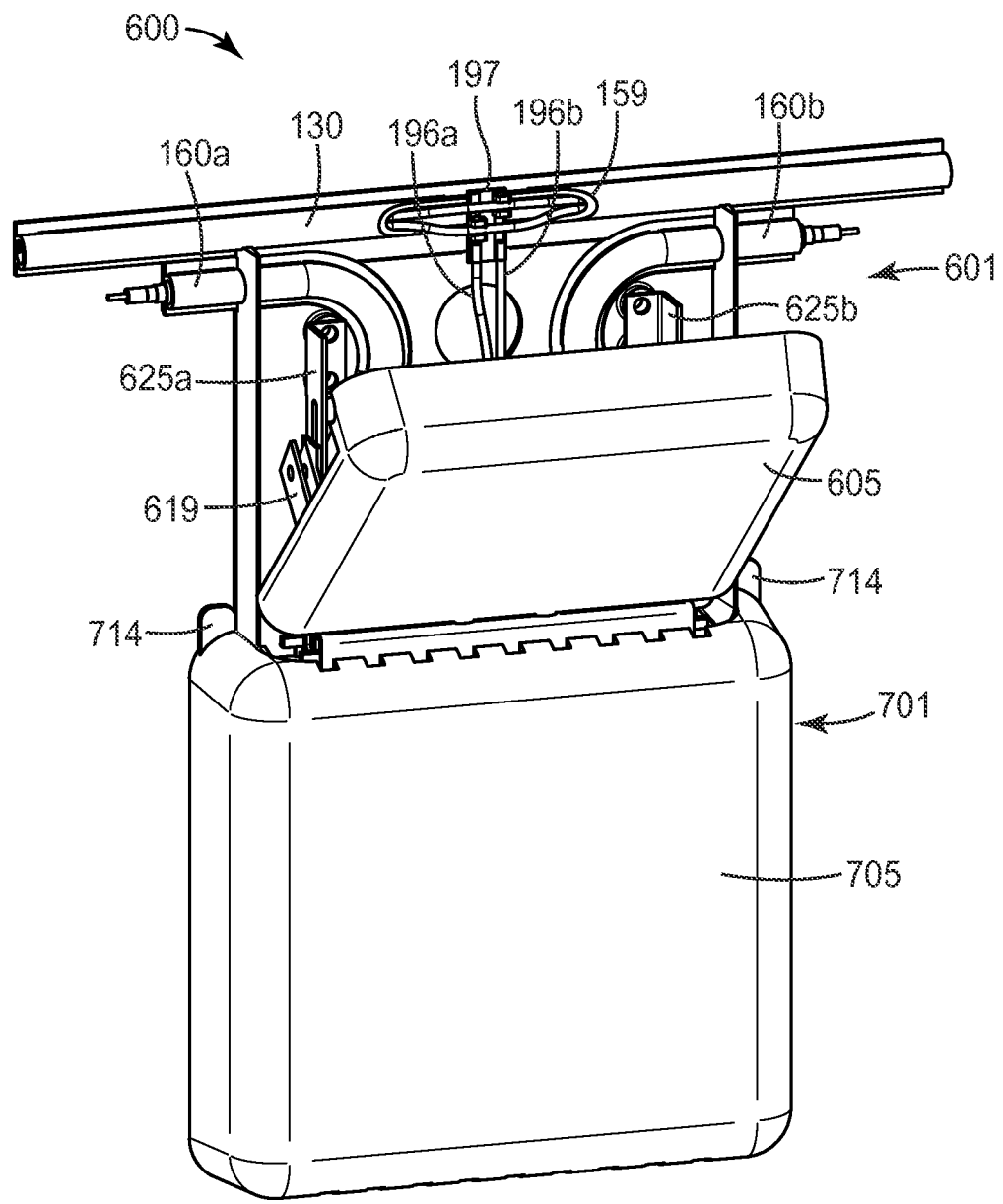
FIG. 21 is an isometric view of the exemplary remote socket of FIG. 11 during the installation process according to another aspect of the invention.
Figure 22:
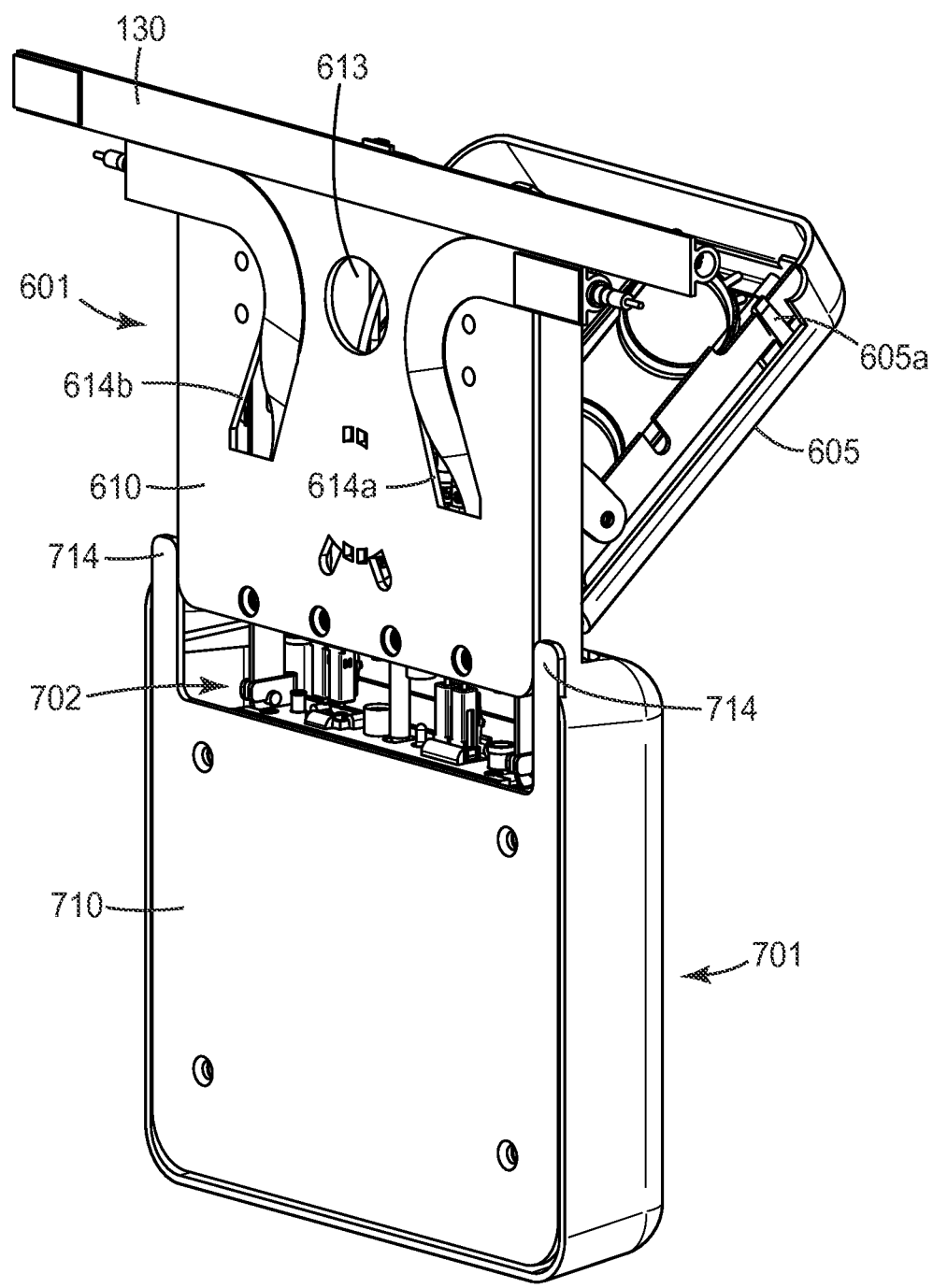
FIG. 22 is an isometric rear view of the exemplary remote socket of FIG. 11 during the installation process according to another aspect of the invention.
Figure 23:
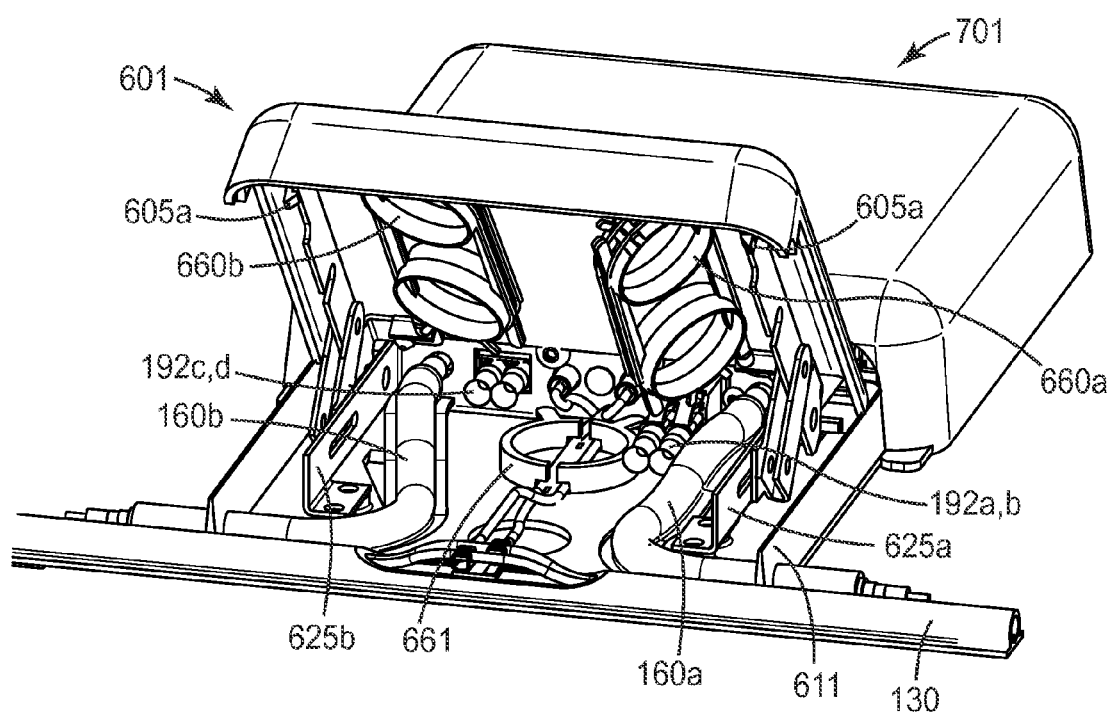
FIG. 23 is an isometric view of the exemplary remote socket of FIG. 11 during the installation process according to another aspect of the invention.
Figure 24:
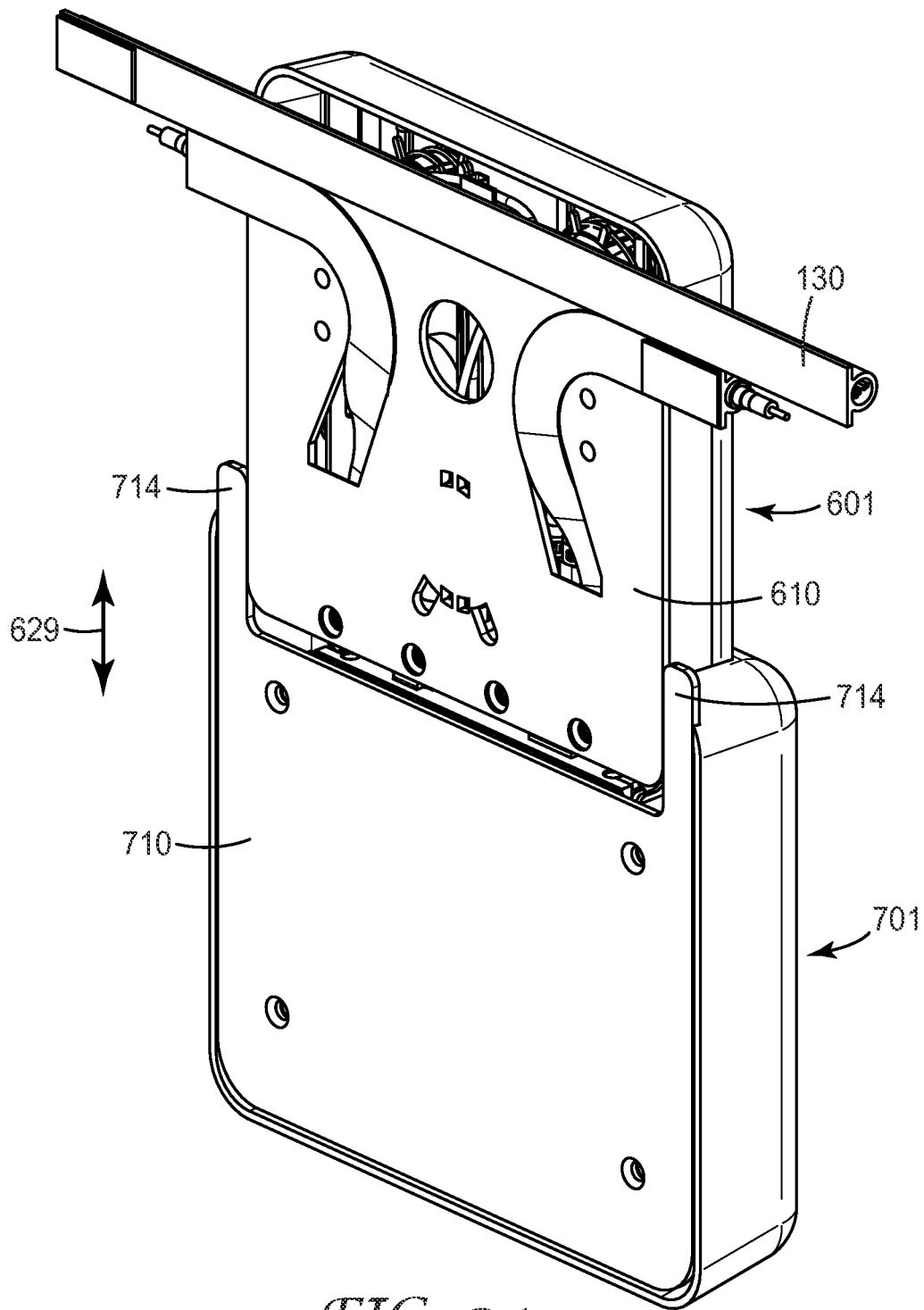
FIG. 24 is an isometric rear view of the exemplary remote socket of FIG. 11 during the installation process according to another aspect of the invention.

When the connections to the socket interface 602 are complete, the cover 605 can be placed onto the support bar portion of the actuation mechanism via conventional latches 605a, such as is shown in FIGS. 22 and 23. As is shown in FIGS. 21-23, the socket cover 605 and actuation mechanism 615 can be pulled from the wall to place the extendable guide rails in a lowered position. In a preferred aspect, the width of the socket can be from about 4 inches to about 6 inches, so the installer may use a single hand to grip the cover 605 to pull the actuation mechanism forward.

The remote electronics unit, here configured as a remote radio unit 701, can then be connected to the socket 601. In a preferred aspect, the remote radio unit 701 will be preconnectorized, with its components already connected to the remote radio unit interface 702. The remote radio unit 701 can be guided upward along or off the mounting wall using the guide fingers 714 as an initial alignment tool. As the remote radio unit 701 gets nearer the socket 601, the remote radio unit 701 will contact the extendable guide rails (see e.g., FIG. 22, which shows the initial contact from the rear side). The latch pins 621 on both sides of the socket (see e.g., FIG. 17) are received by the engagement slots 721 and the central guide pin 630 is initially received by port 731.

At this stage, the remote radio unit 701 is supported by the extendable guide rails. To actuate the connection of all of the different media connections simultaneously in a single action, the installer simply pushes the cover 605 toward the mounting wall, thereby raising the extendable guide rails, which brings the remote electronics unit interface 702 into contact with the socket interface 602 (see e.g., FIG. 24). When the edges of cover 605 are flush with the side frame portion 611, the connection is complete. Although not shown, the cover can include a pin or lock to use as a security mechanism to prevent unwanted or unintentional disconnection of the radio unit from the socket. Of course, if later disconnection is required, the cover can be pulled forward (away from the wall) and the remote electronics unit will be lowered for straight forward removal.

As mentioned above, while the socket connection actuation mechanism is preferably located on the socket, in an alternative aspect, the actuation mechanism can be provided on the remote electronics unit. In addition, the construction of the actuation mechanism can also be different and still provide for connection of the socket interface with the remote electronics unit interface in a single action. For example, FIGS. 25-28 show an alternative remote socket 600", which includes a socket interface 602" and a remote electronics unit interface 702" having an integral actuation mechanism 715.

Figure 25:
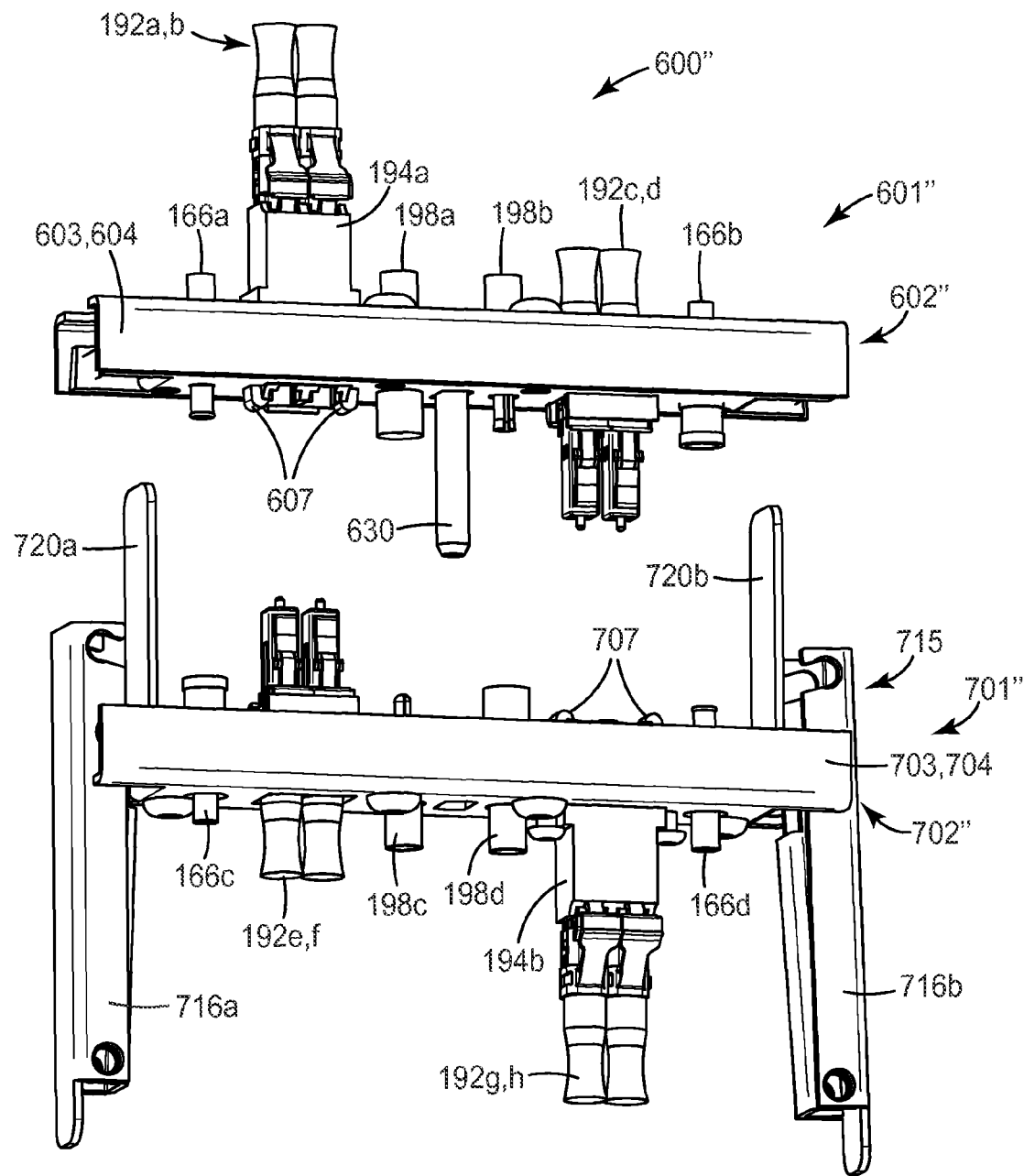
FIG. 25 is an isometric partial view of an alternative remote socket actuation mechanism according to another aspect of the invention.

In this alternative aspect, the covers, radio circuit, and general support structures for the socket 601" and remote electronics unit 701" can have a construction similar to those shown with respect to FIGS. 11-24, but have been removed for simplicity. FIG. 25 shows the socket interface 602" and the remote electronics unit interface 702" in a separated, disconnected state. Similar to the embodiments described above, the socket 601" manages the connection of several different types of communication cables: one or more insulated copper wires for DC powering of the electronics/radio unit; one or more optical fibers, twisted pairs, or coaxial cables for RF signal distribution; and one or more coaxial or twin-axial cables for RF signal transmission to antennas. As such, the interface 602", 702" includes corresponding connectors for each of those different media. Note that the interface bodies (603, 703) and backbones (604, 704) can have the same construction as described above.

In this example, socket interface 602" includes coaxial connectors 166*a*, 166*b* to provide a connection to the coaxial cables linking the remote socket to one or more of the distributed antennas. For example, commercially available MMC connectors can be utilized. In addition, low voltage power line connectors 198*a*, 198*b* can be provided on socket interface 602" to provide power to the remote electronics unit. For example, commercially available power pin connectors such as Molex 093-series of plugs and socket receptacles, and/or components thereof, can be utilized.

In addition, field terminated optical fiber connectors, 192*a,b* and 192*c,d* can be provided to couple the RF optical fiber signal to the remote electronics unit. In this exemplary aspect, the connectors 192*a,b* and 192*c,d* are duplex LC connectors available from 3M Company, St. Paul Minn. that are mounted in a standard LC duplex fiber connector adapter, such as connector adapter 194*a* mounted in interface body 603 and connector adapter 194*b* mounted in interface body 703.

Each of the aforementioned connectors can be mounted on the interface body 603, 703 via a corresponding port formed in the body. Various fasteners can be used to secure the different connectors or connector mounts in place. In a further exemplary aspect, for the optical fiber connectors, lead-in mount members 607, 707 are provided on the interface facing surfaces of the interface bodies 603, 703 to help secure the fiber connector adapters in their mounting positions. In addition, lead-in mount members 607, 707 can have a tapered or sloped construction for guiding the approaching LC connectors into the connector adapter during the connection process.

Figure 26:
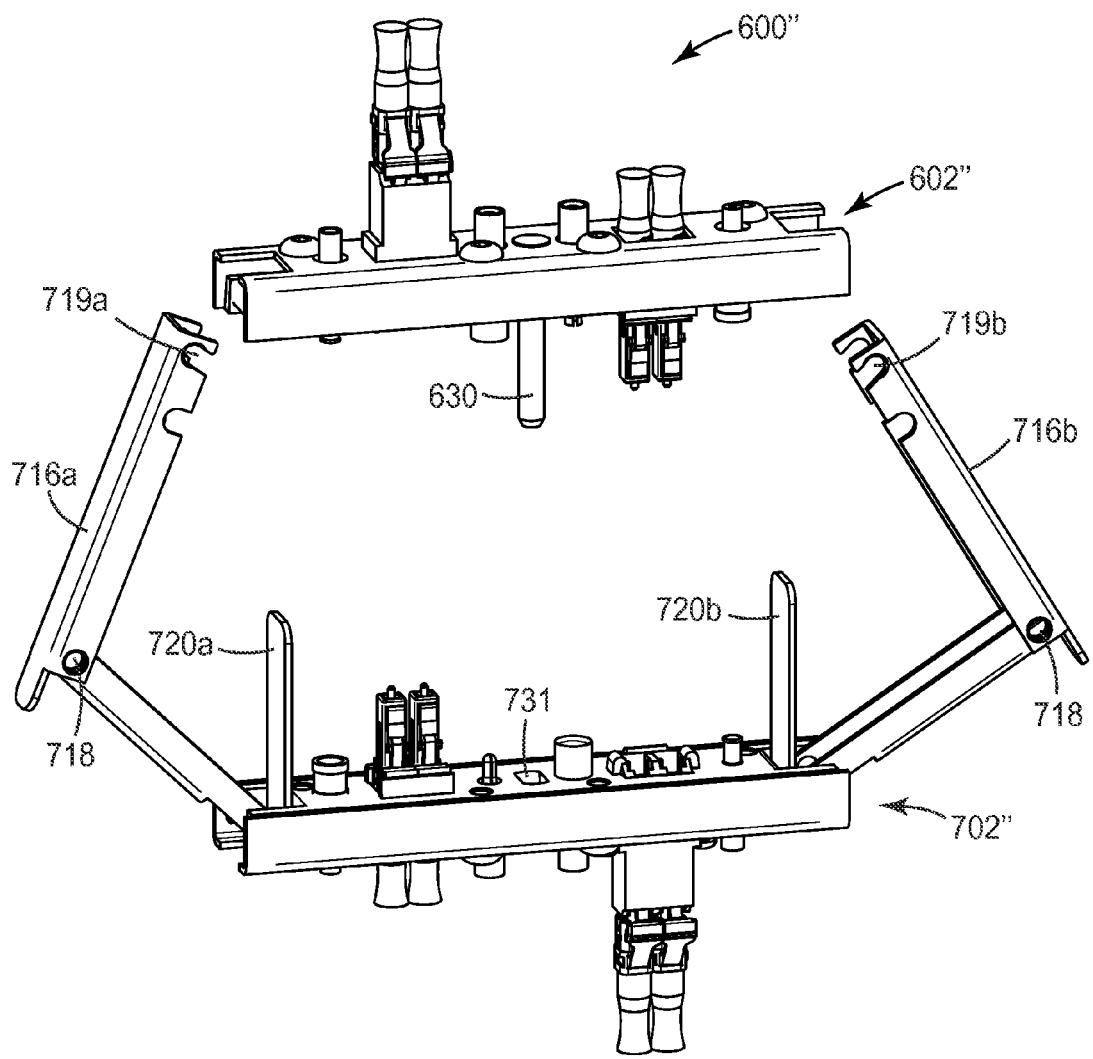
FIG. 26 is another isometric partial view of the alternative remote socket actuation mechanism of FIG. 25 according to another aspect of the invention.
Figure 27:
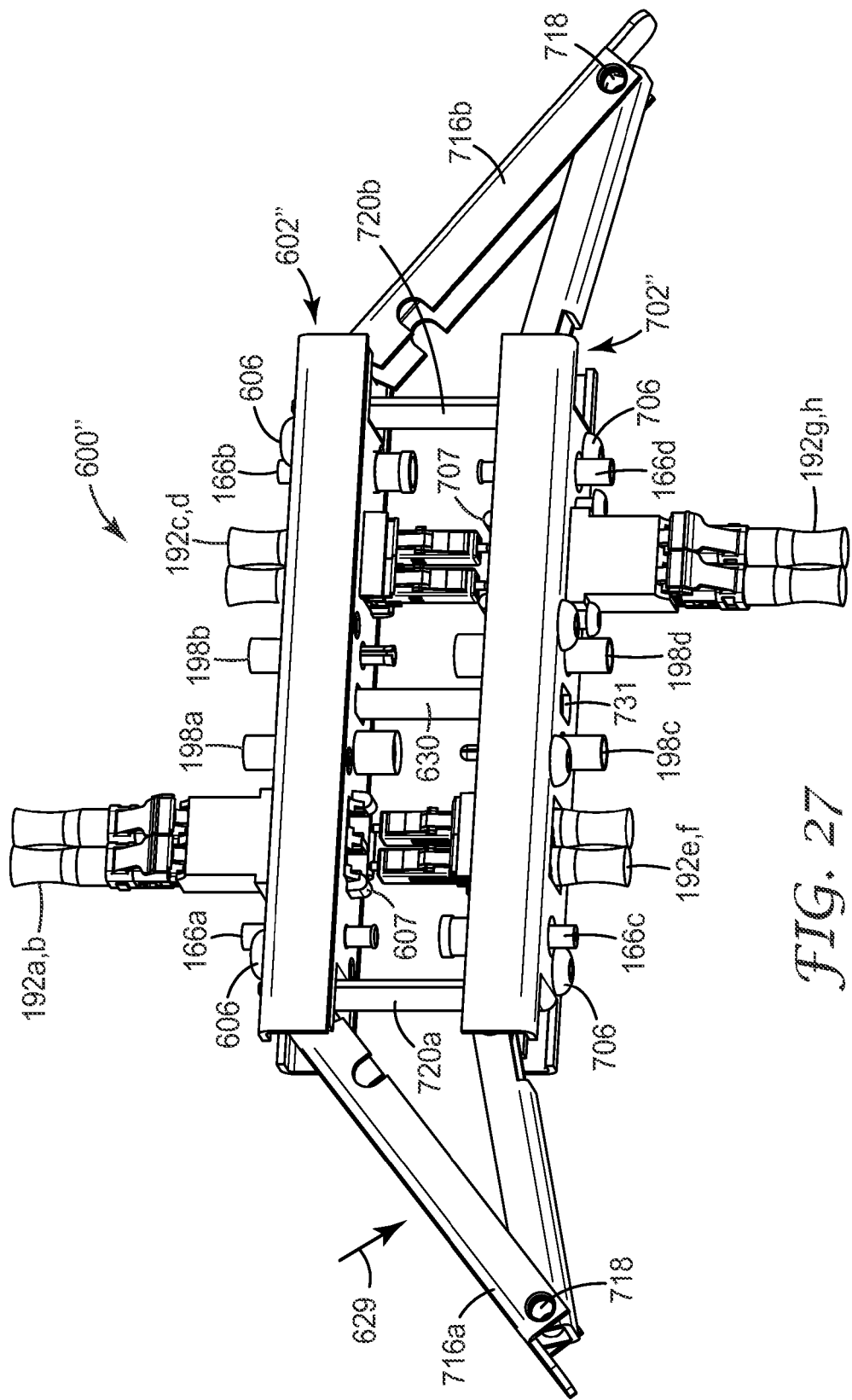
FIG. 27 is another isometric partial view of the alternative remote socket actuation mechanism of FIG. 25 according to another aspect of the invention.

The actuation mechanism 715 of this alternative remote socket is integral with the remote electronics unit 701". The actuation mechanism 715 includes a pair of folding latch arms 716*a* and 716*b* that are configured to extend beyond the interface body 703 and latch onto socket interface 602". As shown in FIG. 26, folding latch arms 716*a* and 716*b* each include two arm segments joined via pivot point 718. The distal ends of each of the folding latch arms 716*a* and 716*b* can further include one or more engagement slots 719*a* and 719*b*, respectively. During a connection sequence, the folding latch arms 716*a* and 716*b* are unfolded as shown in FIG. 26. The folding latch arms 716*a* and 716*b* are brought towards the socket interface 602" (which is already mounted to a mounting wall, such as is described above) until the engagement slots 719*a*, 719*b* each engage a cross pin (hidden from view) mounted onto each end portion of the socket interface 602". In addition, guide rails 720*a*, 720*b* are slid into the recess portions formed on each end portion of the socket interface 602". FIGS. 26 and 27 also show a central guide pin 630 disposed in a central portion of socket interface 602". In a preferred aspect, the central guide pin 630 is received by a central guide port 731 formed in the remote electronics unit interface 702". The central guide pin can be configured to prevent a sideways slide of the interface bodies with respect to each other, as well as help align the interfaces during connection. Alternatively, the central guide pin 630 can be disposed in remote electronics unit interface 702" and can be received by a central guide port formed in the socket interface 602".

When engagement has occurred, the folding latch arms 716*a*, 716*b* are brought downward in the direction of arrow 629, which raises the remote electronics unit interface 702" towards the socket interface 602", thus simultaneously initiating the connection of coaxial connector 166*a* to connector 166*c*, coaxial connector 166*b* to connector 166*d*, power connectors 198*a* and 198*b* to connectors 198*c*, 198*d*, respectively, and optical fiber connectors 192*a,b* and 192*c,d* to connectors 192*e,f* and 192*f,g*, respectively.

Figure 28:
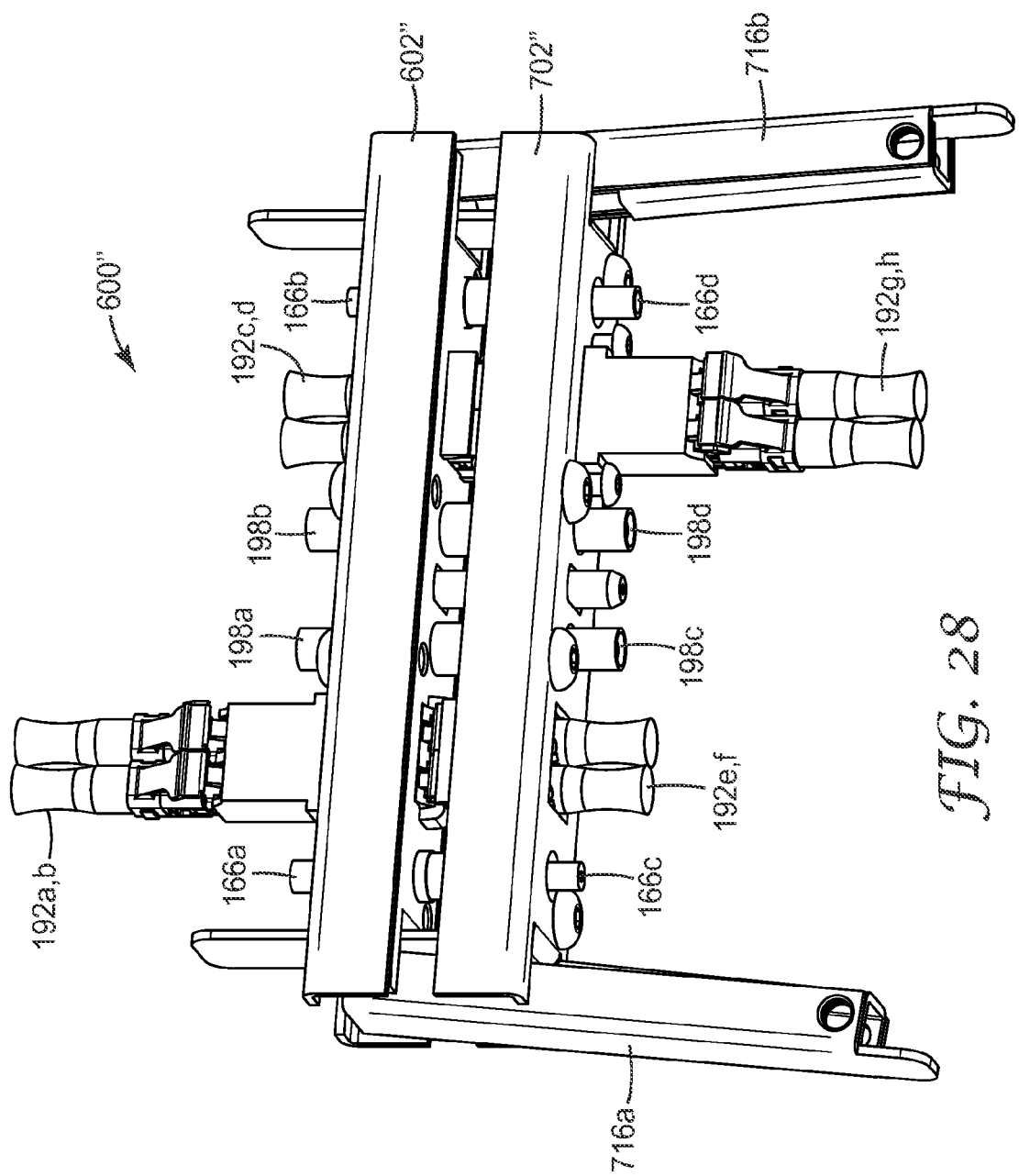
FIG. 28 is another isometric partial view of the alternative remote socket actuation mechanism of FIG. 25 according to another aspect of the invention.

FIG. 28 shows the socket interface 602" and remote electronics unit interface 702" in a fully connected state, with folding latch arms 716*a*, 716*b* placed back in their folded states. In this alternative aspect, the cover for the remote electronics unit 701" is removable so that the cover can be placed back on the unit after full connection is made.

Figure 29:
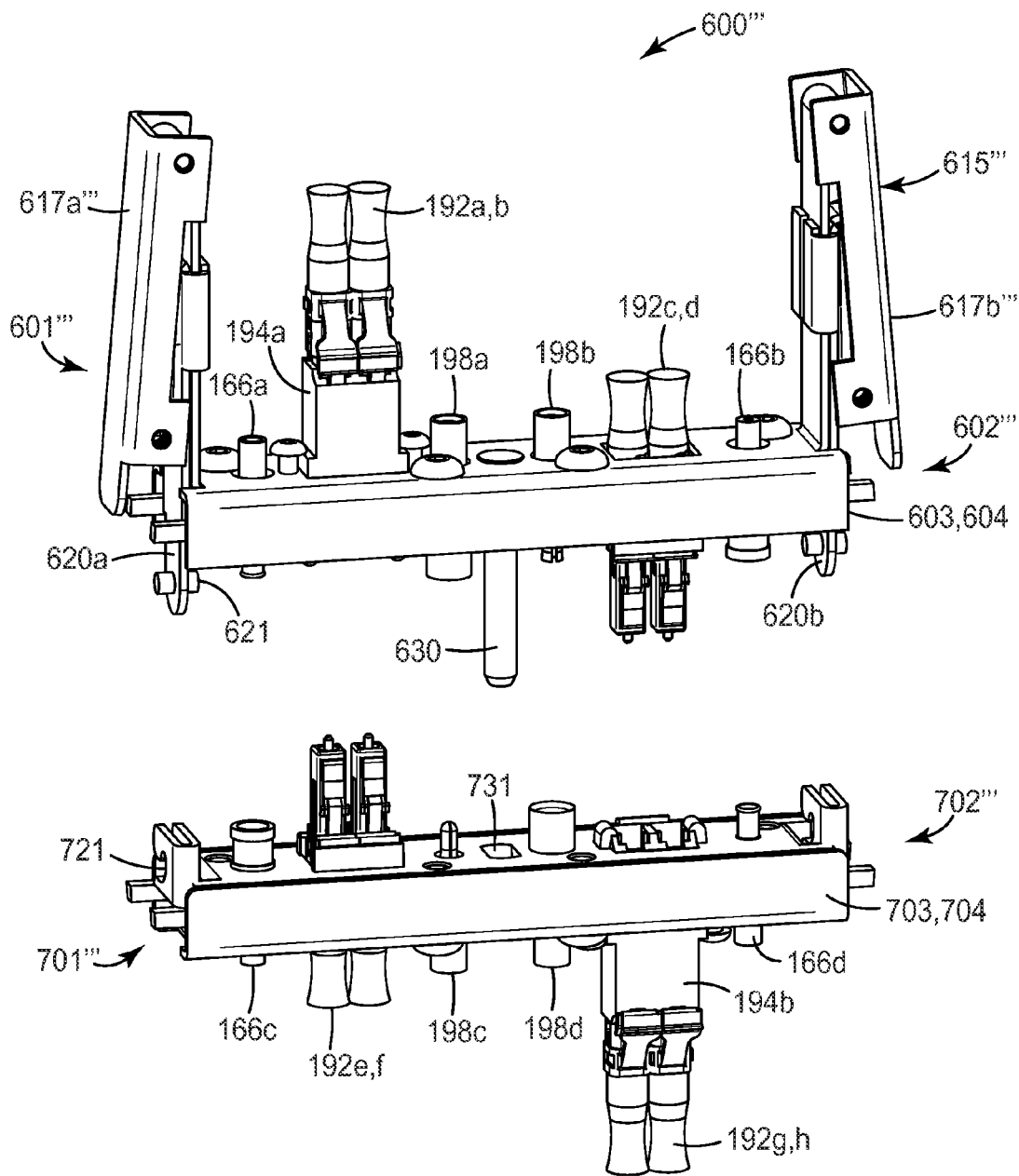
FIG. 29 is an isometric partial view of another alternative remote socket actuation mechanism according to another aspect of the invention.

FIGS. 29-32 show an alternative remote socket 600''', which includes a socket 601''' having an integral actuation mechanism 615''' with a different construction than actuation mechanism 615 and a remote electronics unit interface 701'''. In this alternative aspect, the covers, radio circuit, and general support structures for the socket 601''' and remote electronics unit 701''' can have a construction similar to those shown with respect to FIGS. 11-24, but have been removed for simplicity. FIG. 29 shows the socket interface 602''' and the remote electronics unit interface 702''' in a separated, disconnected state. Similar to the embodiments described above, the socket 601''' manages the connection of several different types of communication cables: one or more insulated copper wires for DC powering of the electronics/radio unit; one or more optical fibers, twisted pairs, or coaxial cables for RF signal distribution, and one or more coaxial or twin-axial cables for RF signal transmission to antennas. As such, the interfaces 602''', 702''' include corresponding connectors for each of those different media. Note that the interface bodies (603, 703) and backbones (604, 704) can have the same construction as described above with respect to the embodiment of FIGS. 11-24.

In this example, socket interface 602''' includes coaxial connectors 166*a*, 166*b* to provide a connection to the coaxial cables linking the remote socket to one or more of the distributed antennas, similar to those connectors described above. In addition, low voltage power line connectors 198*a*, 198*b* can be provided on socket interface 602''' to provide power to the remote electronics unit, similar to those connectors described above.

In addition, field terminated optical fiber connectors, 192*a,b* and 192*c,d* can be provided to couple the RF optical fiber signal to the remote electronics unit, similar to those optical fiber connectors described above. Connector adapters 194*a*, 194*b*, similar to those described above, can also be utilized.

Each of the aforementioned connectors can be mounted on the interface body 603, 703 via a corresponding port formed in the body. Various fasteners can be used to secure the different connectors or connector mounts in place. In a further exemplary aspect, for the optical fiber connectors, lead-in mount members, similar to those described above, can also be utilized.

The actuation mechanism 615''' of this alternative remote socket is integral with the socket 601'''. The actuation mechanism 615''' includes a pair of pivoting arms 617*a'''* and 617*b'''* that lower and raise extendable guide rails 620*a* and 620*b* via compression tension links 619''' (see FIG. 30) in the direction of arrows 629. The pivoting arms 617*a'''* and 617*b'''* have motion in the direction of arrows 628 shown in FIG. 30 (i.e., parallel to the plane of the mounting wall when mounted), such that when the pivoting arms are pulled out, the extendable guide rails are lowered. When lowered, guide rails 620*a* and 620*b* utilize pins 621 to engage corresponding engagement slots 721 disposed on the ends of remote electronics interface 702".

Figure 30:
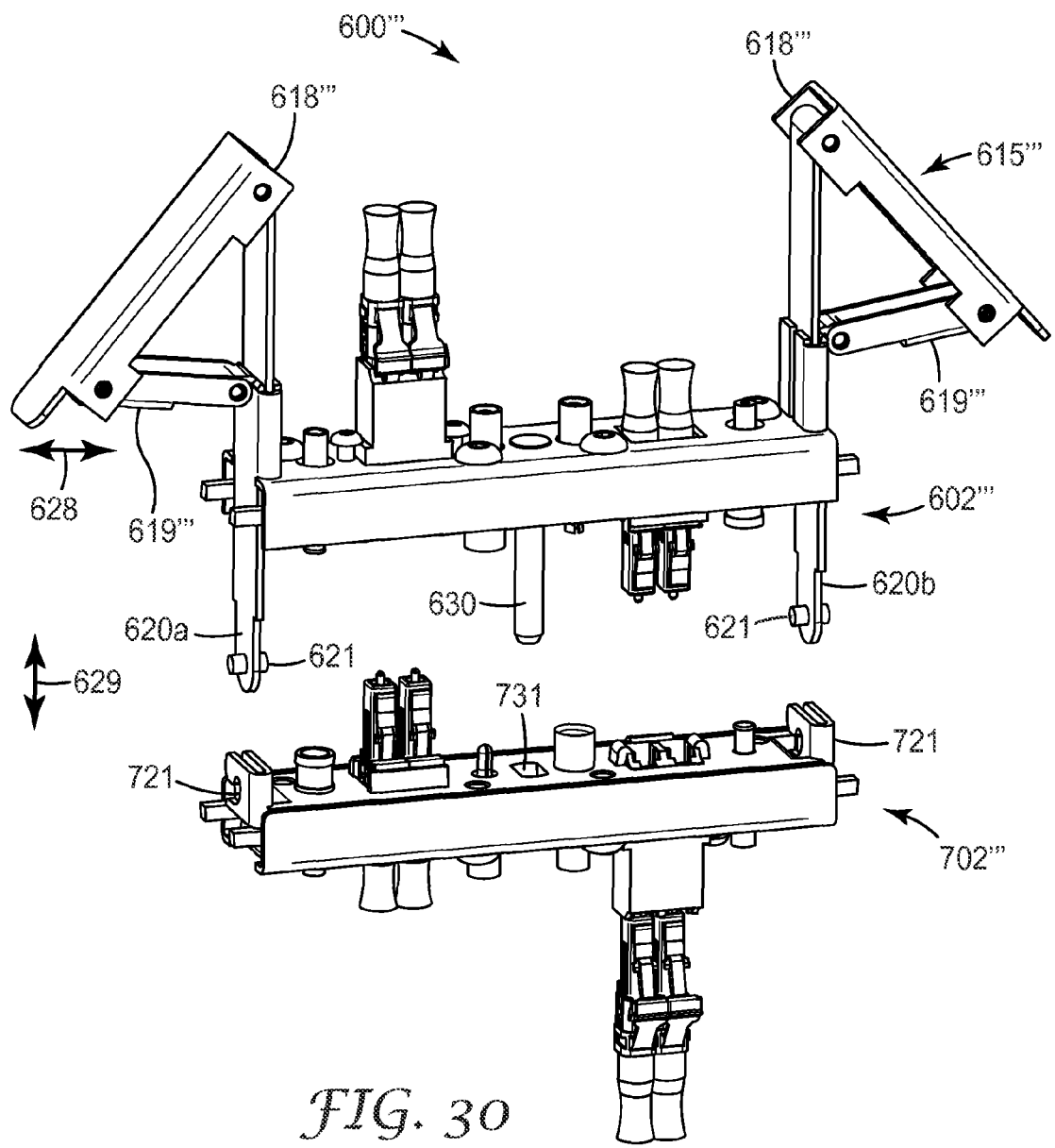
FIG. 30 is another isometric partial view of the alternative remote socket actuation mechanism of FIG. 29 according to another aspect of the invention.
Figure 31:
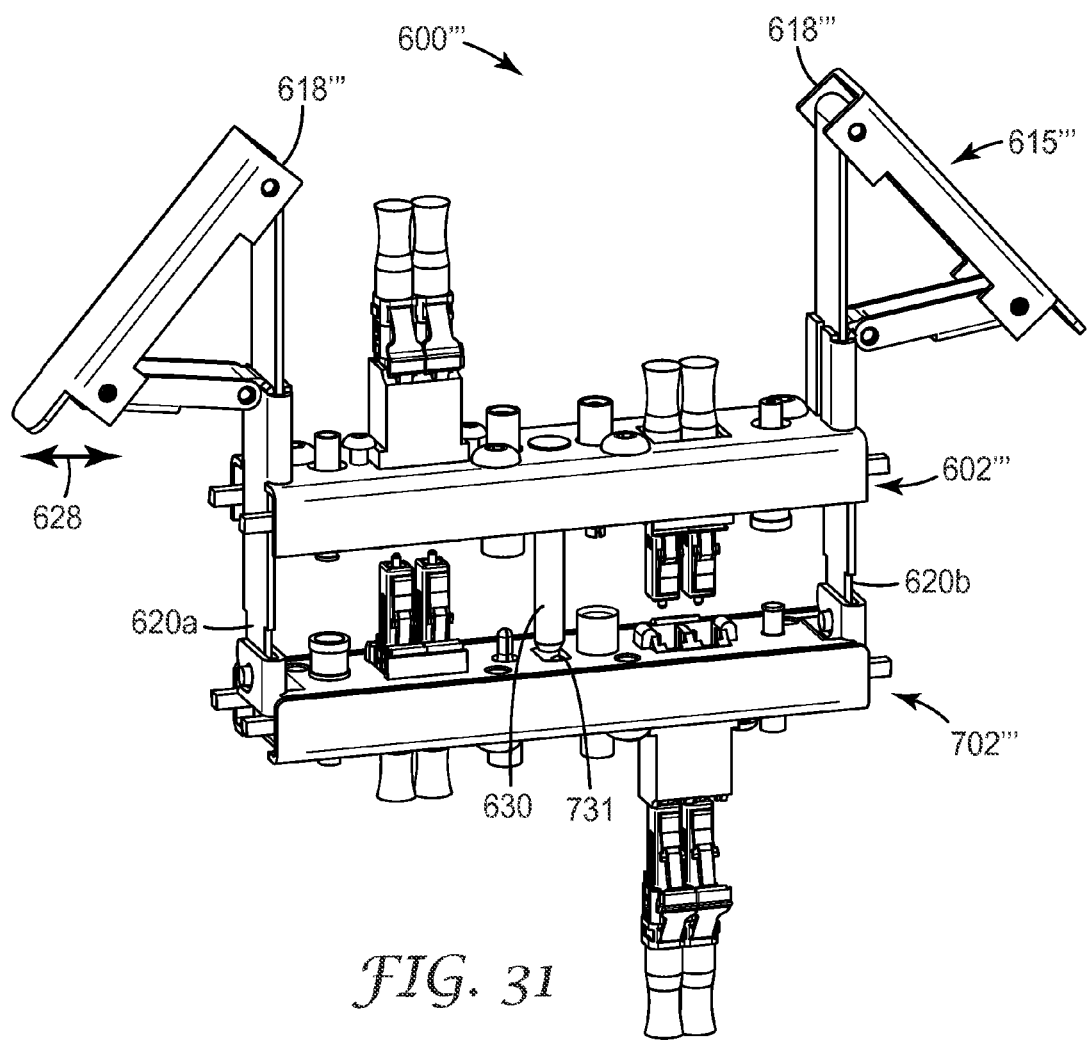
FIG. 31 is another isometric partial view of the alternative remote socket actuation mechanism of FIG. 29 according to another aspect of the invention.

FIGS. 30 and 31 also show a central guide pin 630 disposed in a central portion of socket interface 602'''. In a preferred aspect, the central guide pin 630 is received by a central guide port 731 formed in the remote electronics unit interface 702'''. The central guide pin can be configured to prevent a sideways slide of the interface bodies with respect to each other, as well as help align the interfaces during connection. Alternatively, the central guide pin 630 can be disposed in remote electronics unit interface 702''' and can be received by a central guide port formed in the socket interface 602'''.

Figure 32:
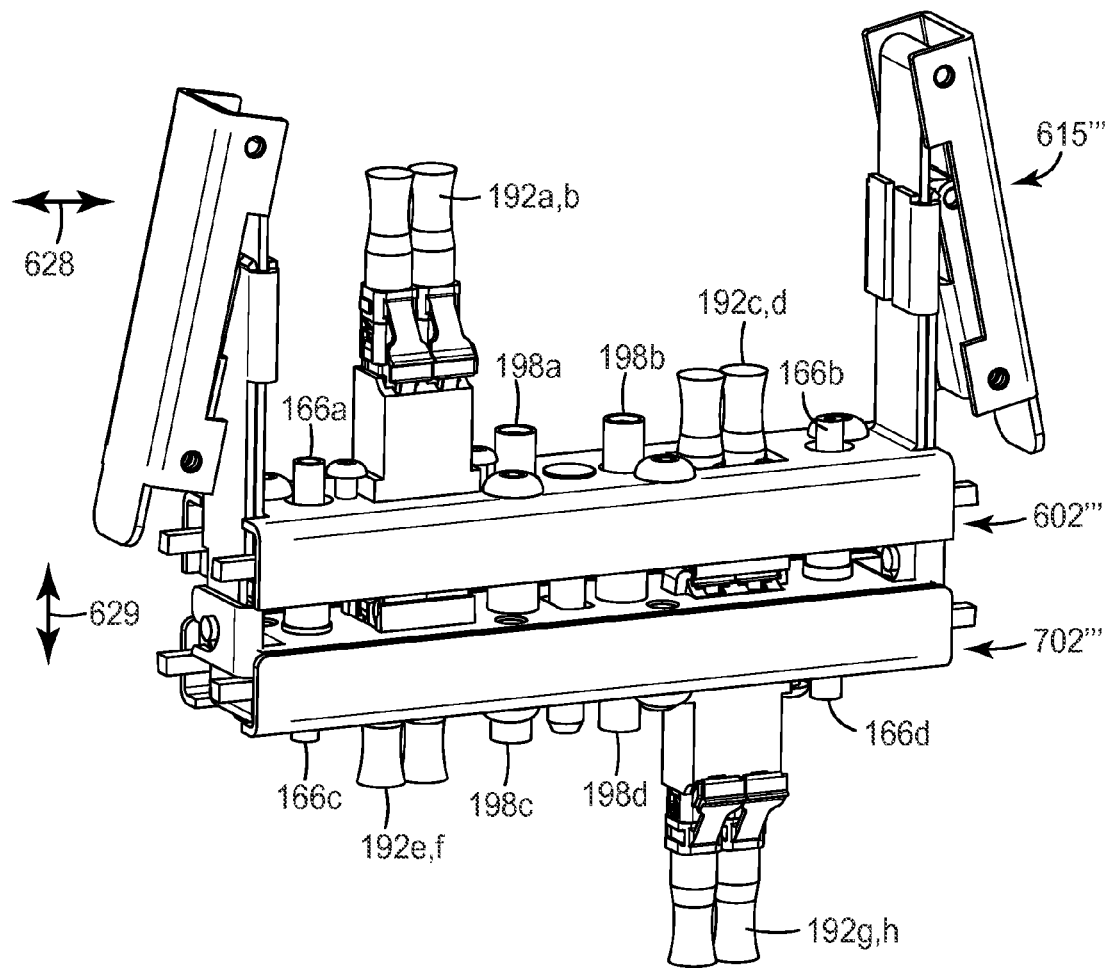
FIG. 32 is another isometric partial view of the alternative remote socket actuation mechanism of FIG. 29 according to another aspect of the invention.

Upon engagement of the guide rail pins 621 with the engagement slots 721, the pivoting arms 617*a*''' and 617*b*''' are moved inward (towards each other), raising the extendable guide rails 620*a* and 620*b*, which raises the remote electronics unit interface 702''' towards the socket interface 602''', thus simultaneously initiating the connection of coaxial connector 166*a* to connector 166*c*, coaxial connector 166*b* to connector 166*d*, power connectors 198*a* and 198*b* to connectors 198*c*, 198*d*, respectively, and optical fiber connectors 192*a,b* and 192*c,d* to connectors 192*e,f* and 192*f,g*, respectively. FIG. 32 shows the socket interface 602''' and remote electronics unit interface 702''' in a fully connected state, with pivoting arms 617*a*''' and 617*b*''' placed back in their original states. In this alternative aspect, the cover for the socket is removable so that the cover can be placed back on the socket after full connection is made.

Figure 40:
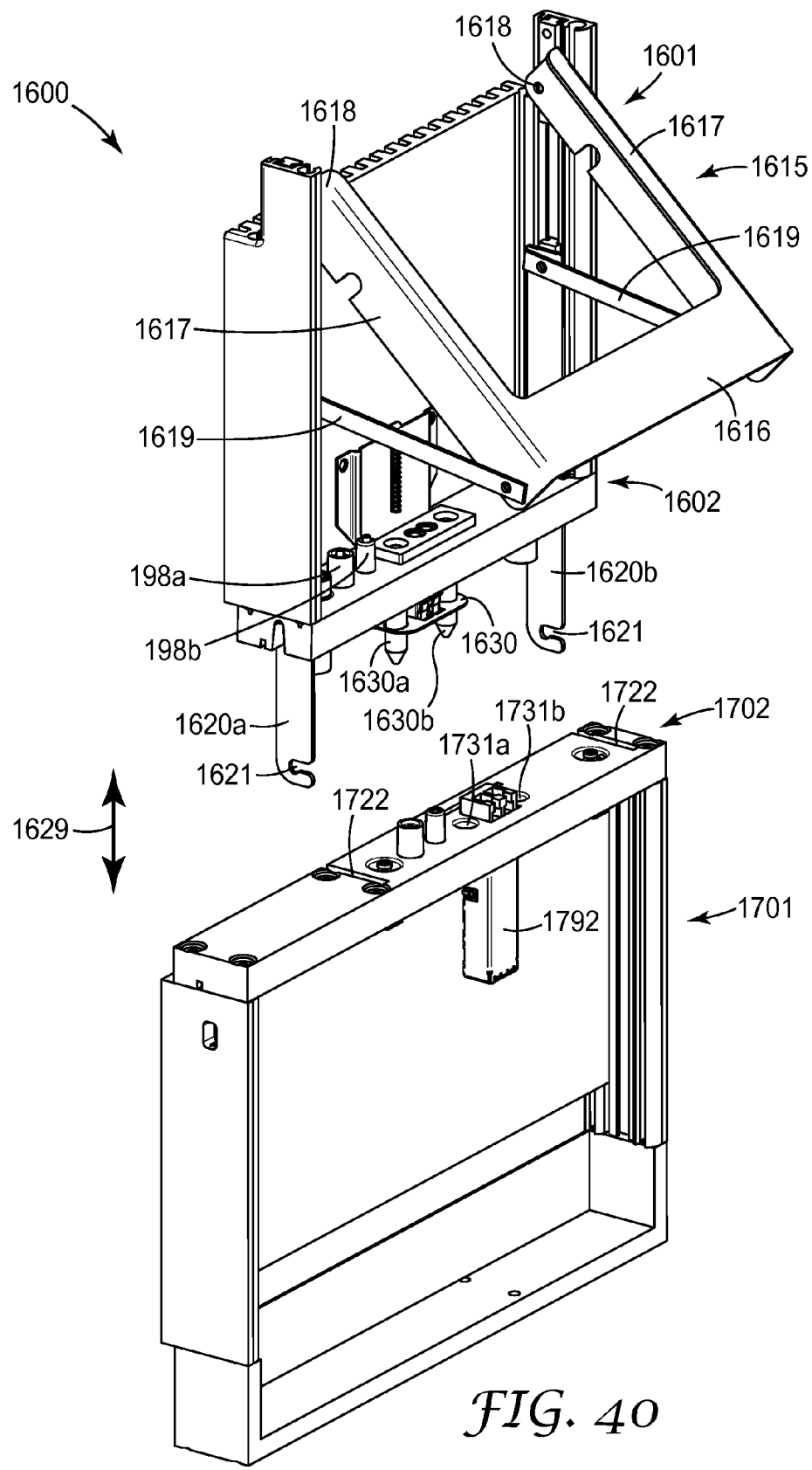
FIG. 40 is an isometric partial view of another alternative remote socket according to another aspect of the invention.
Figure 41:
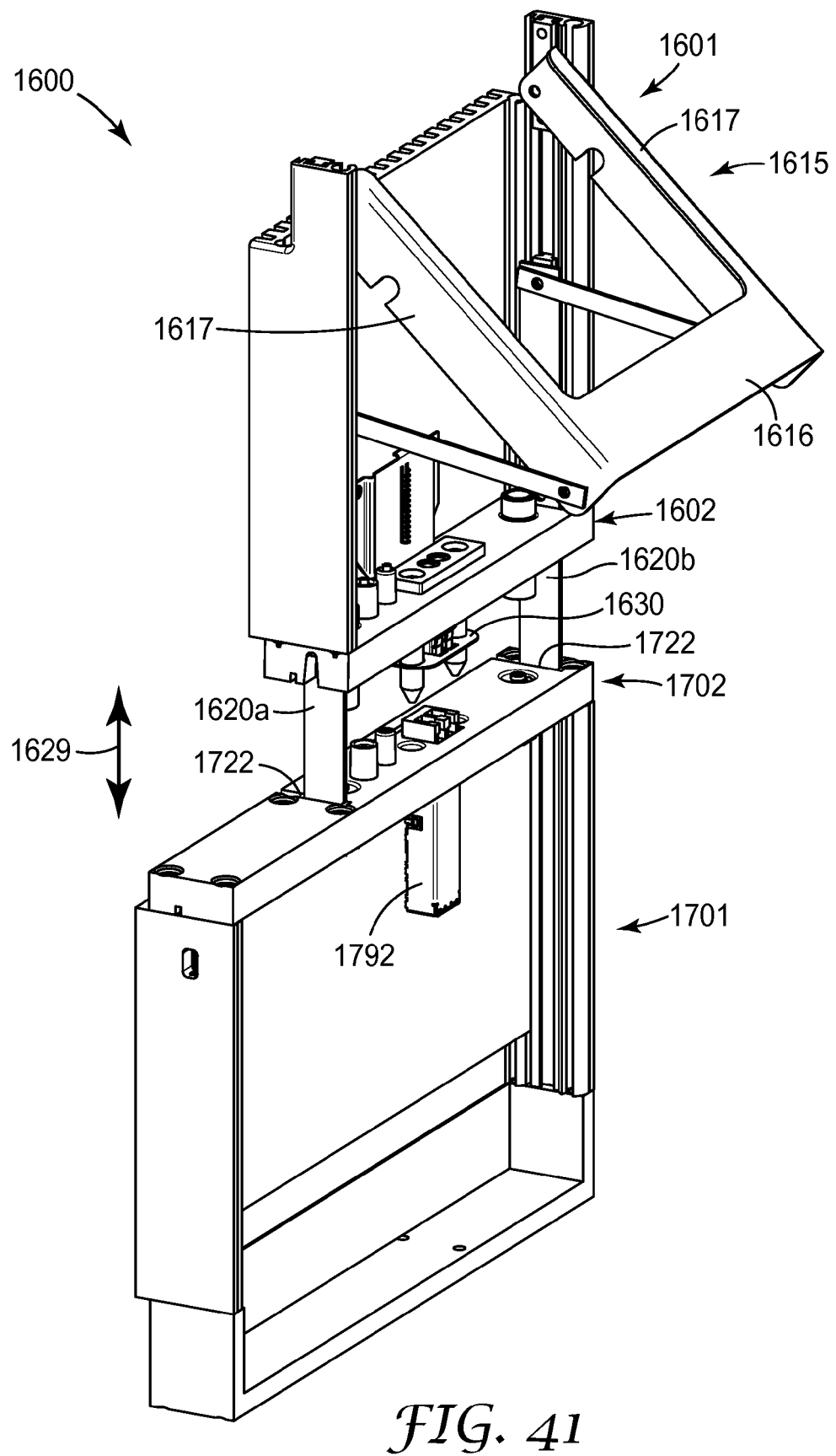
FIG. 41 is another isometric partial view of the alternative remote socket of FIG. 40 according to another aspect of the invention.
Figure 42:
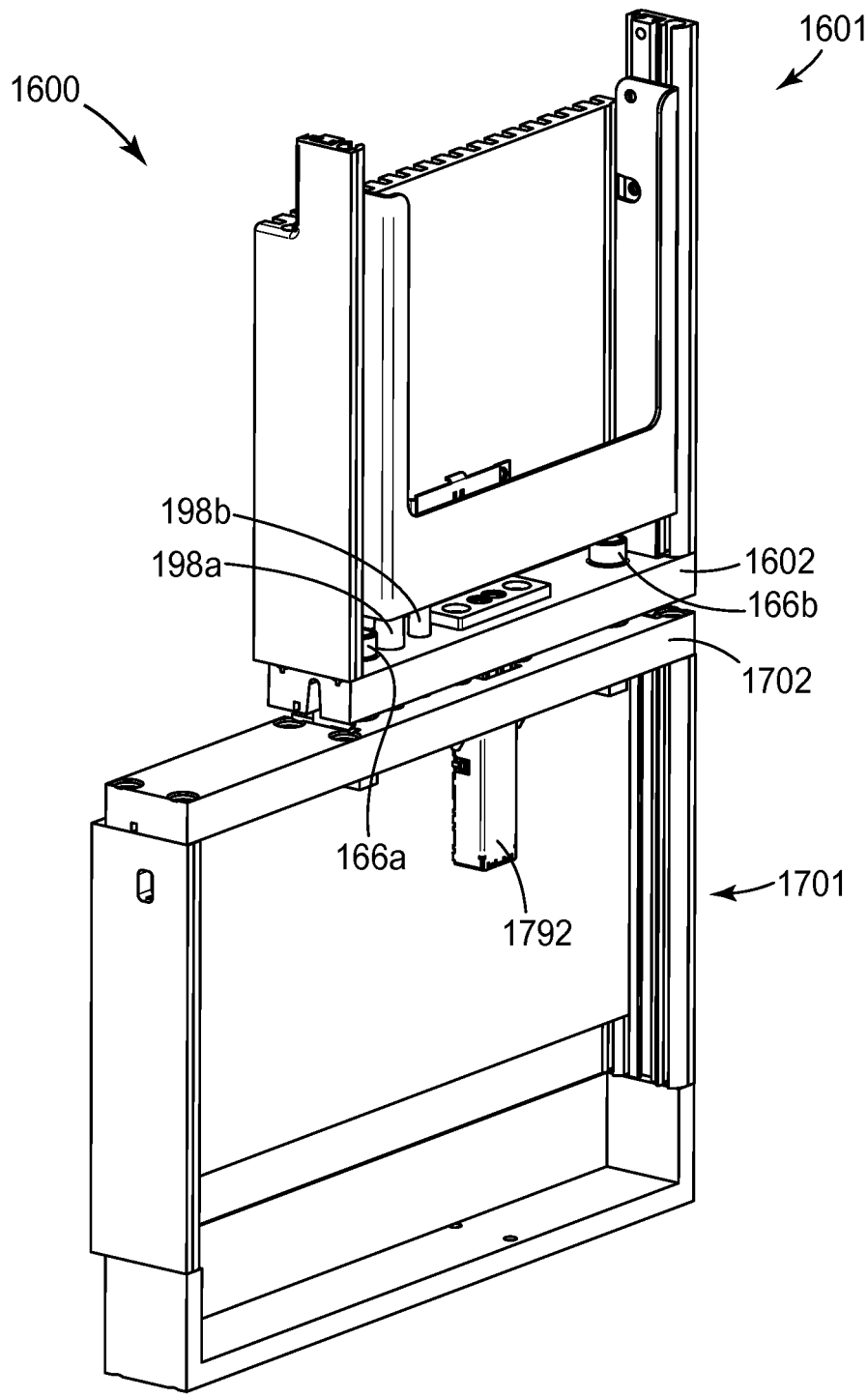
FIG. 42 is another isometric partial view of the alternative remote socket of FIG. 40 according to another aspect of the invention.

FIGS. 40-42 show an alternative remote socket 1600, which includes a socket 1601 having an integral actuation mechanism 1615 with a different construction than actuation mechanism 615. Socket 1601 is configured to mate with remote electronics unit 1701. While the socket interfaces 1602 and 1702 are configured differently than interfaces 602, 702, unless specified otherwise, the components and operation of socket 1601 and remote electronics unit 1701 are similar to corresponding components and operations described above with respect to socket 600.

FIG. 40 shows the socket interface 1602 and the remote electronics unit interface 1702 in a separated, disconnected state. Similar to the embodiments described above, the socket 1601 manages the connection of several different types of communication cables: one or more insulated copper wires for DC powering of the electronics/radio unit; one or more optical fibers, twisted pairs, or coaxial cables for RF signal distribution, and one or more coaxial or twin-axial cables for RF signal transmission to antennas. As such, the interfaces 1602, 1702 include corresponding connectors for each of those different media. In addition, the actuation mechanism 1615 can be oriented so that the pivoting arms 1617 pivot about a pivot mechanism 1618 that is disposed opposite from the socket interface 1602.

In this example, socket interface 1602 includes coaxial connectors 166*a*, 166*b* to provide a connection to the coaxial cables linking the remote socket to one or more of the distributed antennas, similar to those connectors described above. In addition, low voltage power line connectors 198*a*, 198*b* can be provided on socket interface 1602 to provide power to the remote electronics unit, similar to those connectors described above.

In addition, field terminated optical fiber connectors can be provided to couple the RF optical fiber signal to the remote electronics unit, similar to those optical fiber connectors described above. In this alternative embodiment, the socket interface can include a guide mechanism 1630 to support the optical fiber connectors. As shown in FIGS. 40-42, the guide mechanism 1630 can extend from the mating surface of socket interface 1602. A spring or other resilient member can be incorporated in the guide mechanism 1630 to provide a floating mechanism that creates a gradual bias against the direction of motion during the connection operation. In this alternative aspect, an SFP 1792, which can be configured similar to the SFP described above, can be mounted to remote electronics unit interface 1702 and house the optical fiber connectors for the remote electronics unit that mate with the fiber connectors of the socket 1601. In this particular aspect, SFP 1792 is configured to house at least one SC format optical fiber connector or at least two LC format optical fiber connectors.

Figure 43:
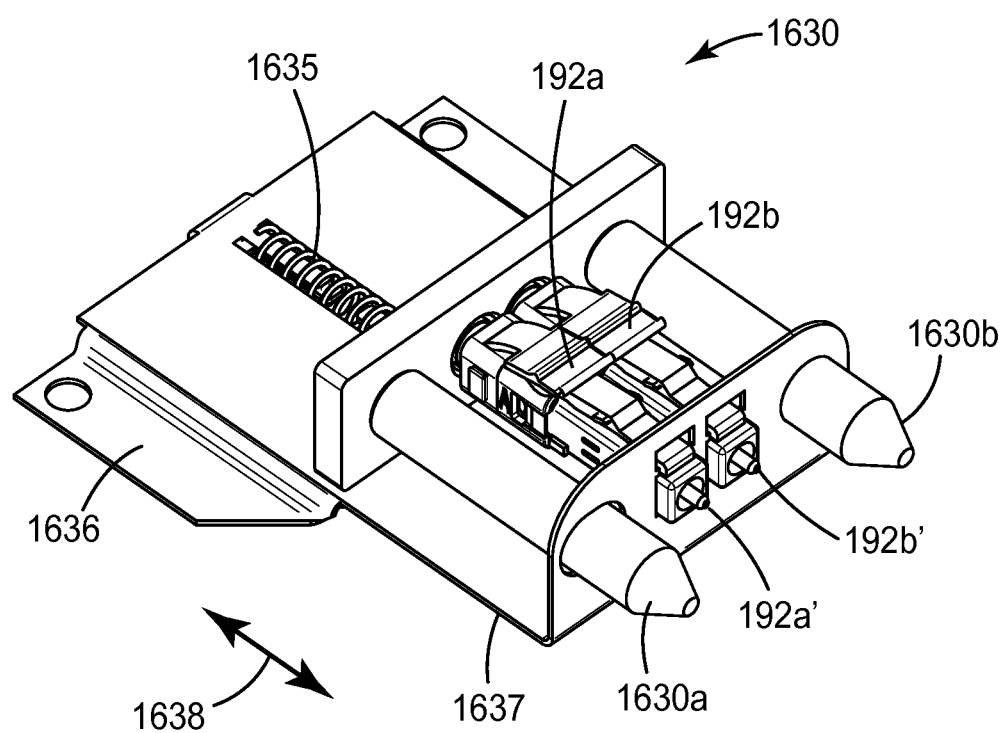
FIG. 43 is an isometric view of a guide mechanism according to another aspect of the invention.

FIG. 43 provides an isolated view of guide mechanism 1630. In this particular aspect, the guide mechanism 1630 includes a support bracket 1636 that is mountable to the base or other feature of the socket. The extension member 1637 is configured to support one or more optical fiber connectors (e.g., connectors 192*a*, 192*b*) and guide pins 1630*a* and 1630*b*, which extend beyond the position of connector ferrule tips 192*a*' and 192*b*'. In addition, a resilient member, such as spring 1635, can be utilized to allow the extension member 1637 to slide in either direction of arrows 1638. During a connection operation, in one aspect, the guide pins 1630*a*, 1630*b* can engage with corresponding guide ports 1731*a*, 1731*b* formed on the remote electronics unit interface 1702 to help with the mating of the optical fiber connectors 192*a*, 192*b* with corresponding connectors disposed in the remote electronics unit interface 1702.

The actuation mechanism 1615 of this alternative remote socket is integral with the socket 1601. A cross support bar 1616 stretches across vertical support bars 1617 and can be used as a handle. This support structure pivots outward (away from the general body of the remote socket) about pivot mechanism 1618, located distant from and generally at an opposite end from the socket interface 1602. The actuation mechanism 1615 is designed to lower and raise two extendable guide rails 1620*a*, 1620*b* (connected to the vertical support bars 1617 via compression/tension links 1619) that can engage the remote electronics unit interface 1702. The direction of motion of extendable guide rails 1620*a* and 1620*b* is illustrated as direction arrows 1629. When lowered, guide rails 1620*a* and 1620*b* extend into slots 1722 and utilize hooks 1621 to engage corresponding pins (not shown) housed in the remote electronics interface 1702. Note that in this alternative aspect, the connections for power, antenna, and RF optical fiber signals can be disposed on one side or the other of the remote electronics unit. Also, as with the embodiments describes above, the pin-hook structure can be reversed so that the guide rails employ pins and the remote electronics interface includes corresponding engagement hooks.

As shown in FIGS. 40 and 41, the guide mechanism 1630 also includes guide pins 1630*a* and 1630*b* that are to be received in guide ports 1731*a* and 1731*b* formed in the remote electronics unit interface 1702. In a preferred aspect, the guide pins can be configured to reduce a sideways slide of the interface bodies with respect to each other, as well as to help align the interfaces during connection.

Upon engagement of the hooks 1621 with the engagement pins of the remote electronics unit interface, the handle 1616 and pivoting arms 1617 are moved towards the socket body, raising the extendable guide rails 1620*a* and 1620*b*, which pulls the remote electronics unit interface 1702 towards the socket interface 1602, thus simultaneously initiating the connection of coaxial connectors, power connectors, and optical fiber connectors. FIG. 42 shows the socket 1601 and remote electronics unit 1701 in a fully connected state. In this alternative aspect, the cover (not shown) for the socket can be removable.

FIGS. 44-45 show yet another alternative remote socket 1801 having an integral actuation mechanism 1815 with a different construction than actuation mechanism 1615. Socket 1801 is configured to mate with a remote electronics unit, such as remote electronics unit 1701 shown in FIGS. 40-42. Socket 1801 includes a socket interface 1802 configured to mate with a remote electronics unit interface, such as interface 1702. Unless specified otherwise, the components and operation of socket 1801 are similar to corresponding components and operations described above with respect to sockets 600 and 1600. A removable cover is not shown for simplicity.

FIG. 44 shows the socket 1801 in a disconnected state. FIG. 45 shows the socket 1801 in a connected stated (the remote electronics unit is not shown for simplicity). Similar to the embodiments described above, the socket 1801 manages the connection of several different types of communication cables: one or more insulated copper wires for DC powering of the electronics/radio unit; one or more optical fibers, twisted pairs, or coaxial cables for RF signal distribution, and one or more coaxial or twin-axial cables for RF signal transmission to antennas. In addition, the actuation mechanism 1815 can be oriented so that the pivoting arms 1817 pivot about a pivot mechanism 1818 that is disposed opposite from the socket interface 1802.

In this example, socket interface 1802 includes coaxial connectors, low voltage power line connectors, optical fiber connectors, guide pins and a guide mechanism similar to those described above with respect to remote socket 1600.

The actuation mechanism 1815 of this alternative remote socket is integral with the socket 1801. A cross support bar 1816 stretches across vertical support bars 1817 and can be used as a handle. This support structure pivots outward (away from the general body of the remote socket) about pivot mechanism 1818, located distant from and generally at an opposite end from the socket interface 1802.

The actuation mechanism 1815 is designed to lower and raise multiple extendable guide rails. A first set of extendable guide rails 1820a, 1820b are coupled to links 1819a and 1819c, respectively, and engage the remote electronics unit interface. When lowered, guide rails 1820a and 1820b extend into slots formed in the remote electronics unit (see e.g., slots 1722 shown in FIG. 40) and utilize hooks 1621 to engage corresponding pins (not shown) housed in the remote electronics interface. In addition, actuation mechanism 1815 further includes extendable stabilization rails 1820c and 1820d, which are coupled to links 1819c and 1819d. The extendable stabilization rails 1820c and 1820d extend into the remote electronics unit when the socket 1801 is placed in a connected state (see FIG. 45). The stabilization rails 1820c and 1820d extend through the remote electronics unit interface when connected to help stabilize the remote socket and prevent unwanted disconnection if the remote electronics unit experiences an unintended force.

Upon engagement of the hooks 1821 with the engagement pins of the remote electronics unit interface, the handle 1816 and pivoting arms 1817 are moved towards the socket body, raising the extendable guide rails 1820a and 1820b, which pulls the remote electronics unit interface towards the socket interface 1602, thus simultaneously initiating the connection of coaxial connectors, power connectors, and optical fiber connectors. In addition, as the handle 1816 and pivoting arms 1817 are moved towards the socket body, stabilization rails 1820c and 1820d are lowered to extend through the remote electronics unit interface, to further stabilize the connection.

As mentioned previously, the remote socket can be coupled to the distributed antennas 800 of the converged network via adhesive backed coaxial cables. In a preferred aspect, coaxial cable 160 (FIGS. 1 and 2) carries wireless signals between active remote electronics disposed within the remote socket to one or more of the distributed broadband antennas for wireless signal propagation to the environment. Coaxial cable 160 can be a standard coaxial cable such as a LMR-240 Coax Cable, LMR-300 Coax Cable, LMR-400 Coax Cable available from Times Microwave Systems (Wallingford, Conn.) or an adhesive-backed coaxial cable. Exemplary adhesive-backed coaxial cable 160, 160' are described in further detail with respect to FIGS. 7A and 7B.

Figure 7A:
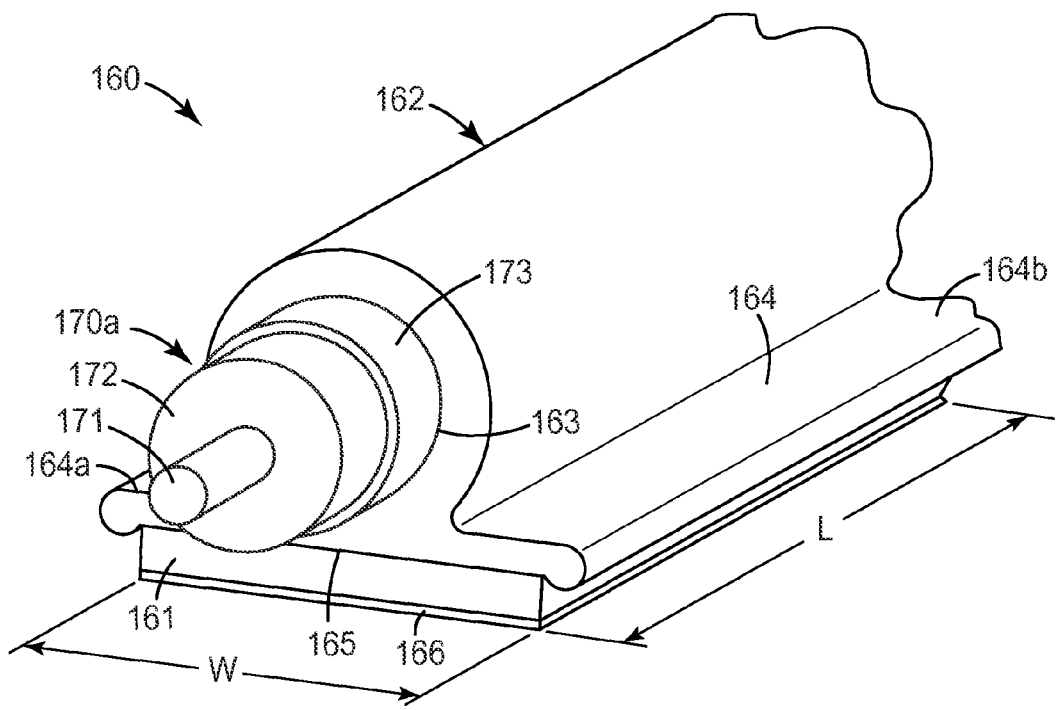
FIGS. 7A-7C are isometric views of exemplary adhesive backed coaxial cables according to an aspect of the invention.

In one exemplary aspect, an adhesive-backed coaxial cable 160 is shown in FIG. 7A. Adhesive-backed coaxial cable 160 includes a conduit portion 162 having a bore 163 extending longitudinally therethrough. Adhesive-backed coaxial cable 160 is an elongated structure that may have a length (L) of up to several tens of meters (depending on the application) or even hundreds of meters. The bore 163 is sized to accommodate one or more coaxial lines disposed therein. In this aspect, a coaxial core 170a can be accommodated in the bore of the conduit portion of the adhesive-backed coaxial cable. The coaxial core comprises a central inner conductor 171 surrounded by a dielectric layer 172. The inner conductor can be a single conductive element or wire or a plurality of smaller gauge bare metal wires surrounded by the dielectric layer. Shielding layer 173 can be disposed over the dielectric layer 172. The shielding layer can help ground the adhesive-backed coaxial cable, help control the impedance of the cable and prevent electromagnetic interference or emissions from the cable. The shielding layer can be in the form of a metal foil or a braid or woven metal layer or a combination thereof which is disposed over the dielectric layer wrapped around the first inner conductor.

While conduit portion 162 can have a generally circular cross-section, in alternative embodiments it may have another shape, such as a rectangle, square, or flat ribbon cross-section in the case it is used with either a twinax core or a multi-ax core structure.

In one aspect, adhesive-backed coaxial cable 160 is a continuous structure formed from a polymeric material such as polyvinyl chloride (PVC), making it flexible and robust. In another aspect, adhesive-backed coaxial cable 160 can comprise an exemplary material such as a polyurethane elastomer, e.g., Elastollan 1185A10FHF. In yet another aspect, adhesive-backed coaxial cable 160 can comprise a polyolefin material that optionally includes one or more flame retardant additives. As such, adhesive-backed coaxial cable 160 can be guided and bent around corners and other structures without cracking or splitting. Adhesive-backed coaxial cable 160 can be continuously formed by extruding the conduit portion around the coaxial core structure.

Adhesive-backed coaxial cable 160 also includes a flange 164 or similar flattened portion to provide support for the adhesive-backed coaxial cable 160 as it is installed on or mounted to a wall or other mounting surface, such as a floor, ceiling, or molding. In most applications, the mounting surface is generally flat. The mounting surface may have texture or other structures formed thereon. In other applications, the mounting surface may have curvature, such as found with a pillar or column. Flange 164 extends along the longitudinal axis of the duct. Exemplary adhesive-backed coaxial cable 160 includes a double flange structure, with flange portions 164a and 164b, positioned (in use) below the centrally positioned conduit portion 162. In an alternative aspect, the flange can include a single flange portion. In alternative applications, a portion of the flange can be removed for in-plane and out-of-plane bending. In an alternative aspect, the flange does not extend beyond the conduit portion 162, yet retains its flat edge, thus forming a 'D' shaped duct.

In a preferred aspect, flange 164 includes a rear or bottom surface 165 that has a generally flat surface shape. This flat surface provides a suitable surface area for adhering the adhesive-backed coaxial cable 160 to a mounting surface, a wall or other surface (e.g., dry wall or other conventional building material) using an adhesive layer 161. For example, in a preferred aspect of the present invention, the adhesive layer 161 comprises a pressure sensitive adhesive, such as a transfer adhesive or double-sided tape, disposed on all or at least part of bottom surface 165. These types of adhesives do not exhibit macroscopic flow behavior upon application to a mounting surface and thus do not substantially change dimensions upon application to the mounting surface. In this manner, the aesthetic quality of the applied duct is maintained. Alternatively, adhesive layer can comprise an epoxy.

In one aspect, bottom surface 165 is backed with an adhesive layer 161 having a removable liner 166, such as those described above for the horizontal cabling.

Figure 7B:
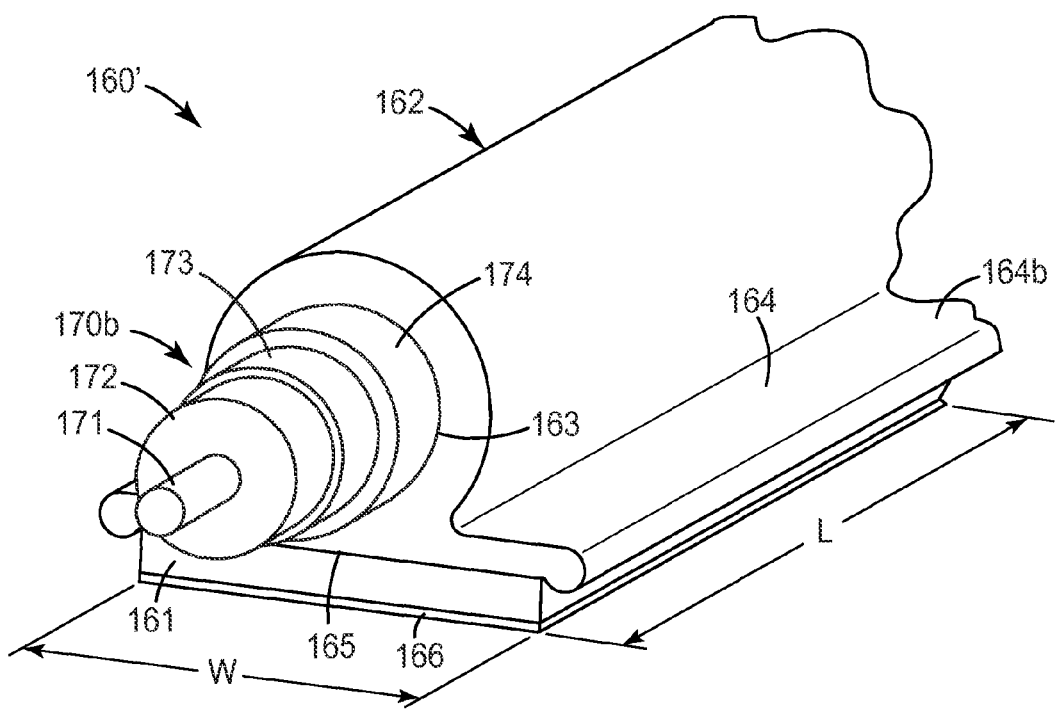

In a further alternative aspect, an alternative adhesive-backed coaxial cable 160' is shown in FIG. 7B, which includes a conduit portion 162 having a bore 163 extending longitudinally therethrough. The bore 163 is sized to accommodate one or more coaxial core structures 170b disposed therein. In this aspect, a coaxial core 170a can be a traditional coaxial cable, such as LMR-300 Coax Cable available from TESSCO Technologies Incorporated (Hunt Valley, Md.), that can be accommodated in the bore of the conduit portion of the adhesive-backed coaxial cable. The coaxial core structure 170b includes a central inner conductor 171 surrounded by a dielectric layer 172. The inner conductor can be a single conductive element or wire or a plurality of smaller gauge bare metal wires surrounded by the dielectric layer. Shielding layer 173 can be disposed over the dielectric layer 172 and an insulating jacket can be disposed over the shielding layer.

Adhesive-backed coaxial cable 160' also includes a flange 164 or similar flattened portion to provide support for the adhesive-backed coaxial cable 160' as it is installed on or mounted to a wall or other mounting surface, such as those described above. The flange extends along the longitudinal axis of the duct. Exemplary adhesive-backed coaxial cable 160' includes a double flange structure, with flange portions 164a and 164b, positioned (in use) below the centrally positioned conduit portion. In an alternative aspect, the flange can include a single flange portion. In alternative applications, a portion of the flange can be removed for in-plane and out-of-plane bending. In an alternative aspect, the flange does not extend beyond the conduit portion 162, yet retains its flat edge, thus forming a 'D' shaped duct.

In a preferred aspect, the flange 164a, 164b includes a rear or bottom surface 165 that has a generally flat surface shape. This flat surface provides a suitable surface area for adhering the adhesive-backed coaxial cable 160' to a mounting surface, a wall or other surface (e.g., dry wall or other conventional building material) using an adhesive layer 161. The adhesive layer 161 may comprise any of the adhesive materials described previously.

Figure 7C:
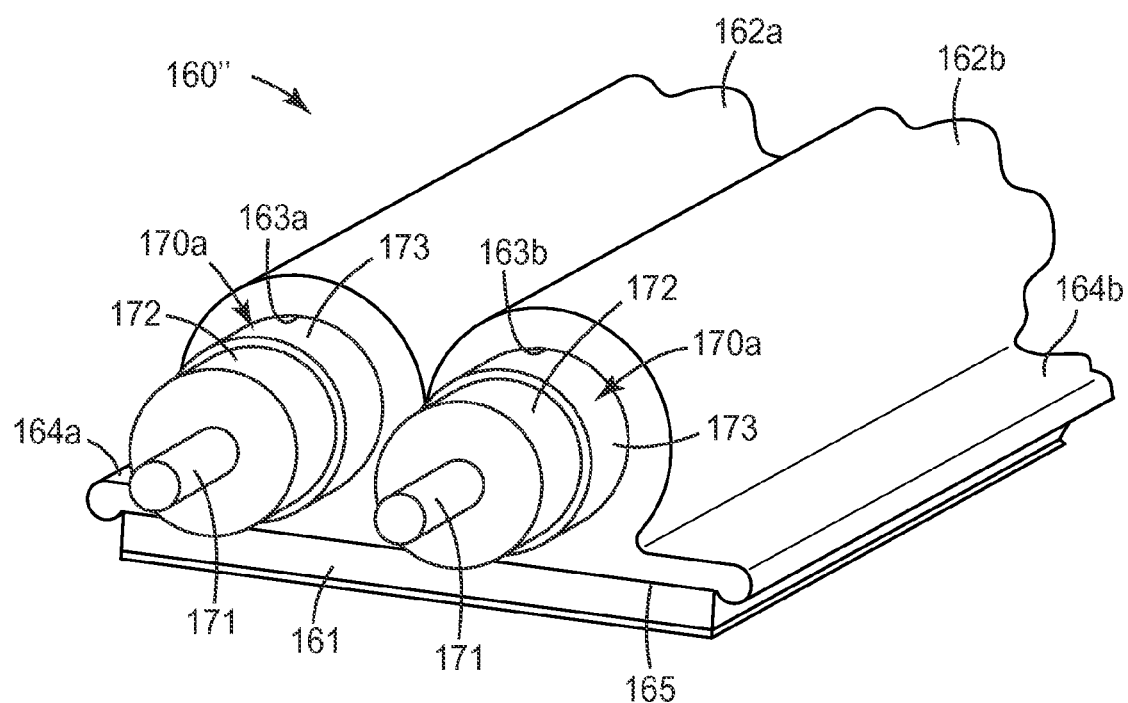

In a further alternative aspect, an alternative adhesive-backed coaxial cable 160" is shown in FIG. 7C, which includes a pair of conduit portions 162a, 162b having a bores 163a, 163b extending longitudinally therethrough. Coaxial cable 160" can be used to interconnect a remote socket to an antenna when two coaxial connections are needed to feed the RF signals to and from the antenna such as coaxial cable 160c' shown in FIG. 3.

The bores 163a, 163b are sized to accommodate coaxial core structures 170a within each bore. The coaxial core structures 170a include a central inner conductor 171 surrounded by a dielectric layer 172. The inner conductor can be a single conductive element or wire or a plurality of smaller gauge bare metal wires surrounded by the dielectric layer.

Adhesive-backed coaxial cable 160" also includes a flange or similar flattened portion to provide support for the adhesive-backed coaxial cable 160" as it is installed on or mounted to a wall or other mounting surface, such as those described above. The flange extends along the longitudinal axis of the duct. Exemplary adhesive-backed coaxial cable 160" includes a double flange structure, with flange portions 164a and 164b, positioned (in use) below the pair of conduit portions.

In a preferred aspect, the flange 164a, 164b includes a rear or bottom surface 165 that has a generally flat surface shape. This flat surface provides a suitable surface area for adhering the adhesive-backed coaxial cable 160" to a mounting surface, a wall or other surface (e.g., dry wall or other conventional building material) using an adhesive layer 161. The adhesive layer 161 may comprise any of the adhesive materials described previously.

Indoor broadband distributed antennas are incorporated in the converged system to convey analog RF electrical radiation from the in building wireless distribution system remote/socket over the ducted coaxial cabling to the indoor environment. The broadband antenna subsystem may include the following components: the radiating elements or antennas, an antenna housing to provide aesthetic appeal, protection and support to the antenna, a broadband balun to provide a differential feed to the structure, and RF connectors to attach the antenna to the RF transmission systems, i.e. coaxial cabling.

The distributed antennas can be attached at the end of coaxial cable or can be located along a midspan of coaxial cable such a coaxial cable 160a' (FIG. 3) via a connection mechanism. In conventional practice, in order to make a midspan connection to a run of coaxial cable, the cable needs to be cut to allow placement of the connection mechanism. Exemplary conventional connection mechanisms include a coaxial splitter, a T-connect or T-splice to be added to the line, or the coaxial cable can be tapped with a coaxial cable vampire tap and typically surround the coaxial cable at the point of the connection. When using an adhesive backed cable, it would be preferable to not debond the cable from the wall in order to put the connection mechanism around the coaxial cable. Thus, it would be advantageous to have a connection mechanism for making midspan connections that only partially encloses the perimeter of the adhesive backed coaxial cable allowing the cable to remain securely connected to the surface on which it is mounted.

Figure 33:
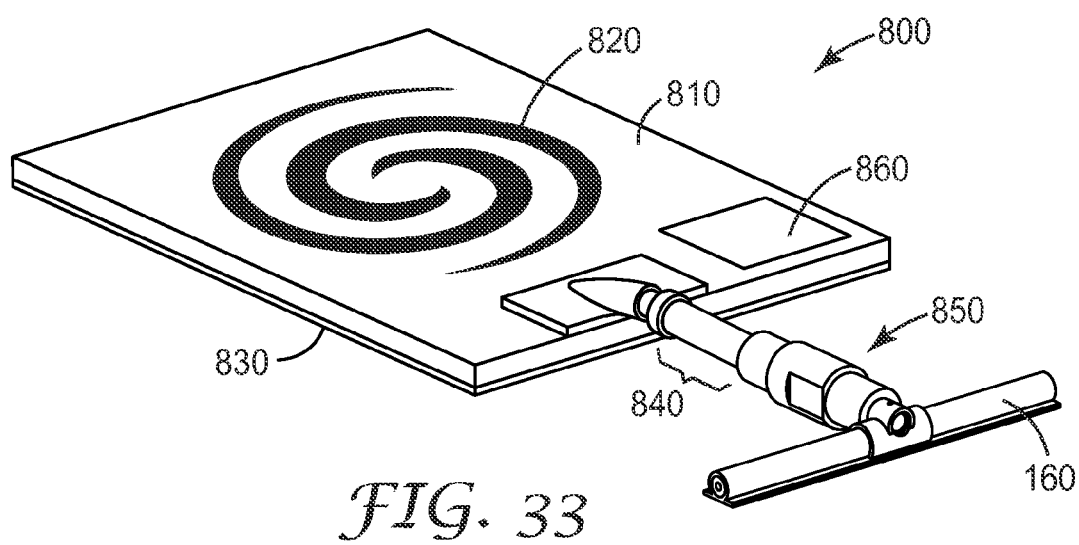
FIG. 33 is an isometric view of a distributed antenna assembly according to an aspect of the invention.

In an exemplary aspect, antenna 800 can be wall mounted as shown in FIG. 33 and connected to the adhesive backed distribution cable by a connection mechanism 850. The RF distribution cable can include at least one of one or more coaxial cables, one or more twin-axial cables and one or more twin lead cables. In one exemplary aspect, the adhesive backed RF distribution cable is an adhesive backed coaxial cable 160.

In an alternative aspect, the antennas may be mounted on the back side of ceiling tiles in buildings having a drop ceiling while in another exemplary aspect the antennas can be disposed in the cover of the remote socket.

Antenna 800 can be a planar assembly supported on a substrate 810. The substrate can be a printed circuit board having the antenna element 820 formed on a first major surface thereof and a conducting ground plane 830 formed on the second major surface opposite the antenna element. The antenna element can be a spiral antenna a planar inverted F-antenna, a planar patch antenna, or any other design of a broadband antenna element. In one exemplary aspect, substrate 810 can be a printed circuit board where in the signal routing can take place in the traces of the board. Substrate 810 can have a passive portion 860 which includes the antenna balun formed integrally with the antenna assembly.

Antenna element 820 has a coaxial connection 840 attached thereto. The antenna's coaxial connection can provide quick attachment to an adhesive back duct using connection mechanism 850. In an exemplary aspect connection mechanism 850 can be coaxial tap connector as described in more detail below.

Figure 34A:
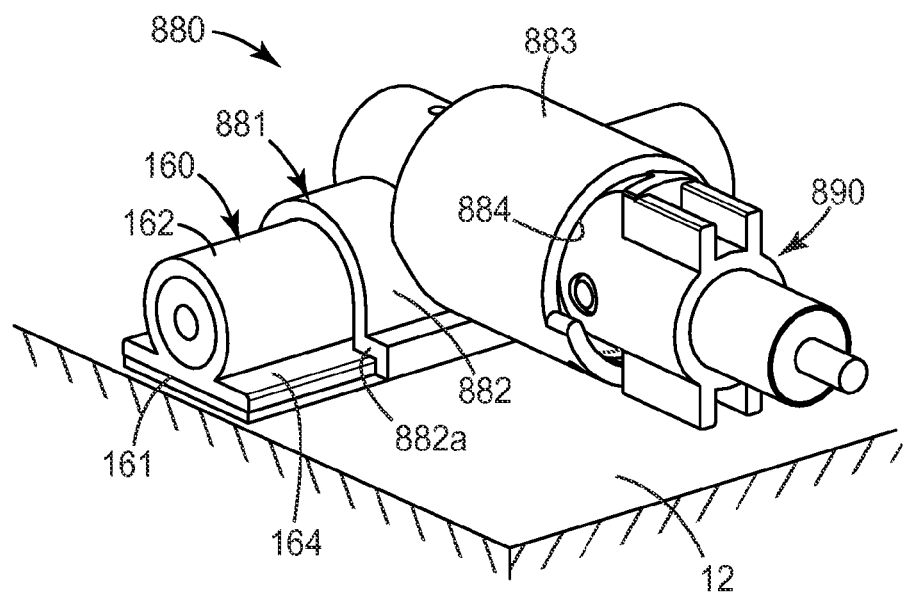
FIGS. 34A-34B are several alternative views of the exemplary coaxial tap connector according to an aspect of the invention.

FIG. 34A shows an exemplary coaxial tap connector 880, which can be referred to as a vampire tap, mounted on a section of adhesive backed coaxial cable 160 mounted on a surface or wall 12 of an MDU by adhesive layer 161. A typical vampire tap pierces through the insulating layer of an electrical cable to make direct contact with the conducting core. This is complicated in a coaxial cable because the vampire tap must also pierce the shielding layer surrounding the insulating layer. The tap (i.e. the portion that contacts the inner conductor (i.e. the conducting core) of the coaxial cable must be isolated from the shield layer while still maintaining the integrity of the shield layer through the connection interface.

Figure 34B:
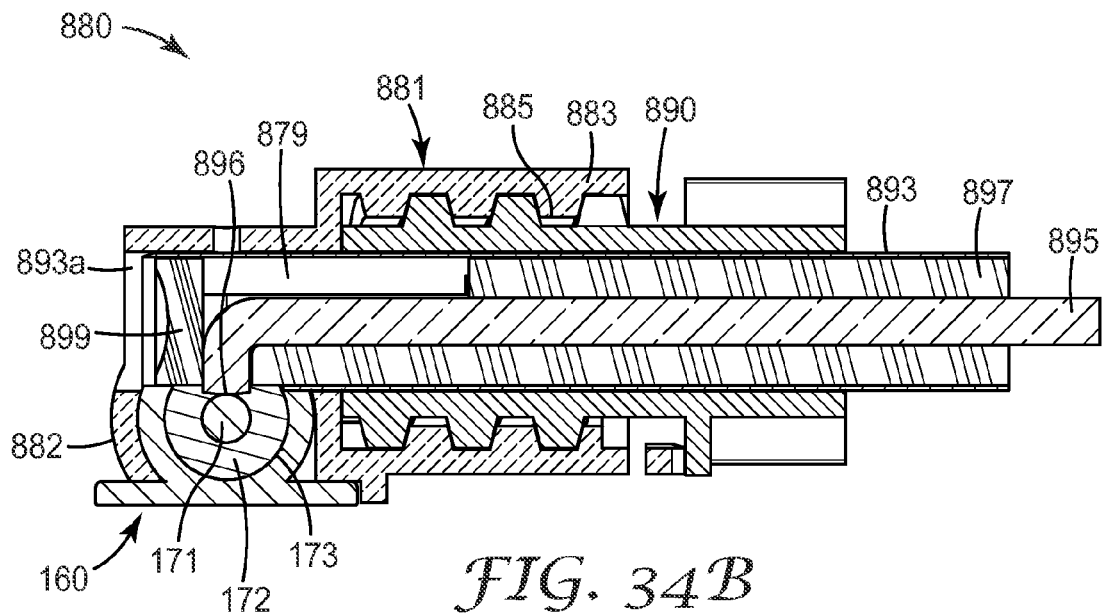
Figure 35A:
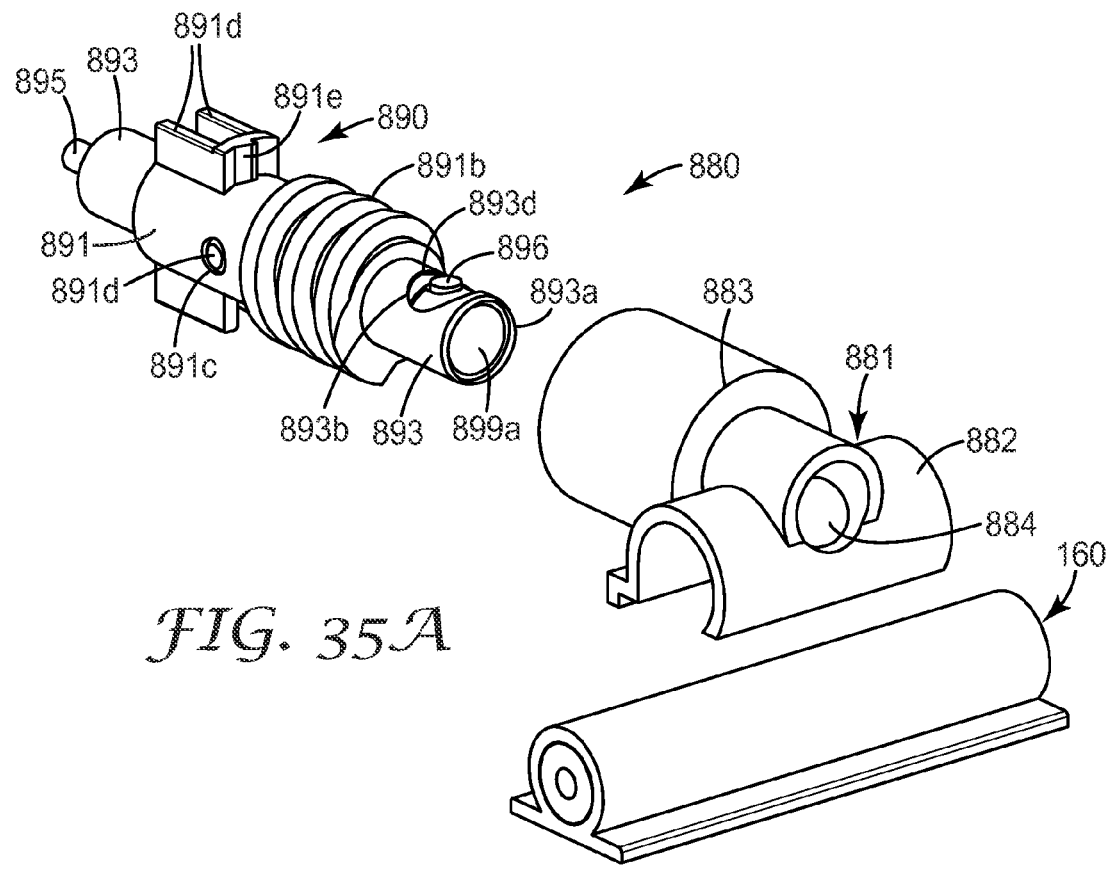
FIGS. 35A-35C are several alternative views of exemplary coaxial tap connector of FIG. 34A according to an aspect of the invention.
Figure 35B:
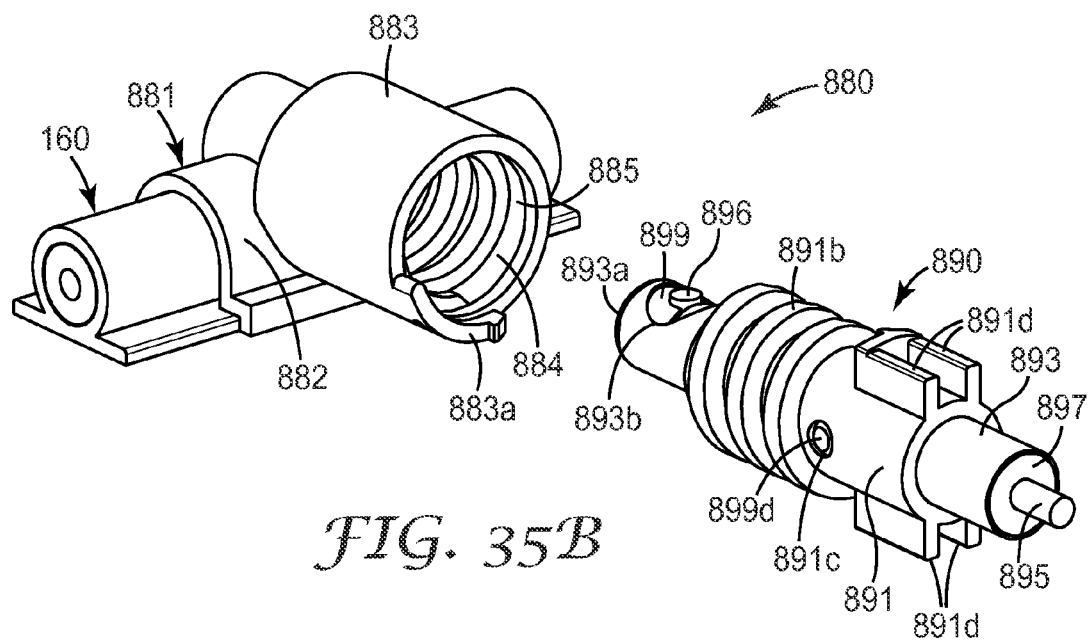
Figure 35C:
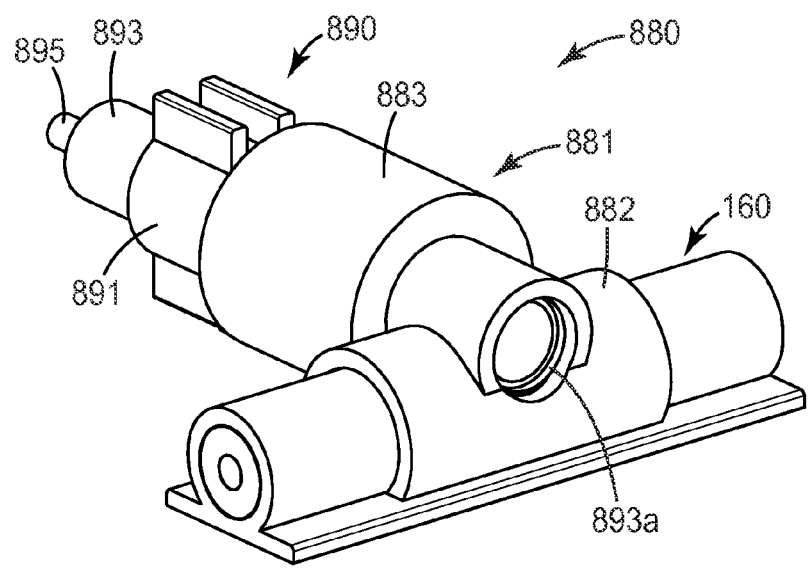
Figure 36A:
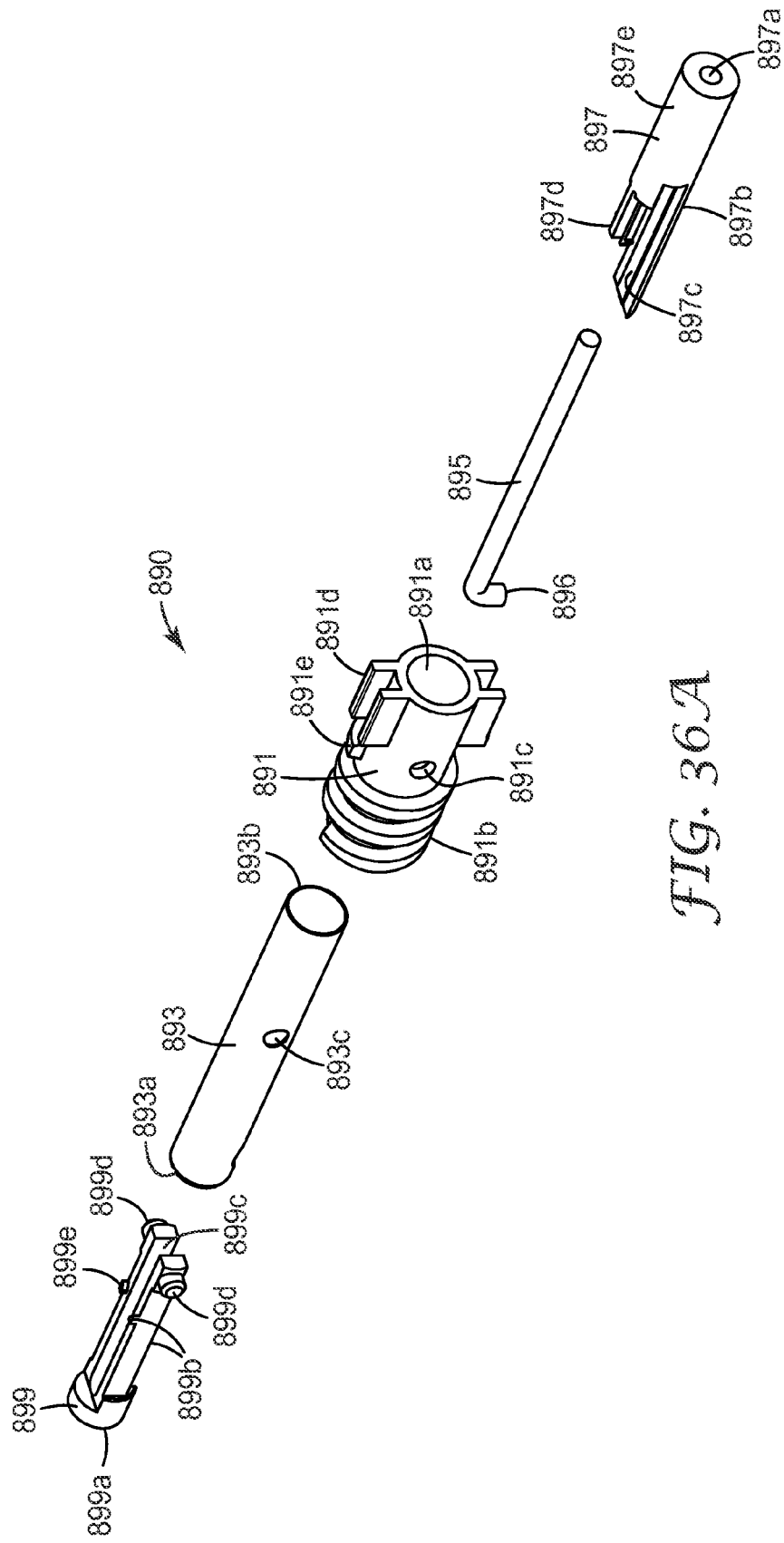
FIGS. 36A-36C are several views showing particular aspects of components of the exemplary coaxial tap connector of FIG. 34A according to an aspect of the invention.
Figure 36B:
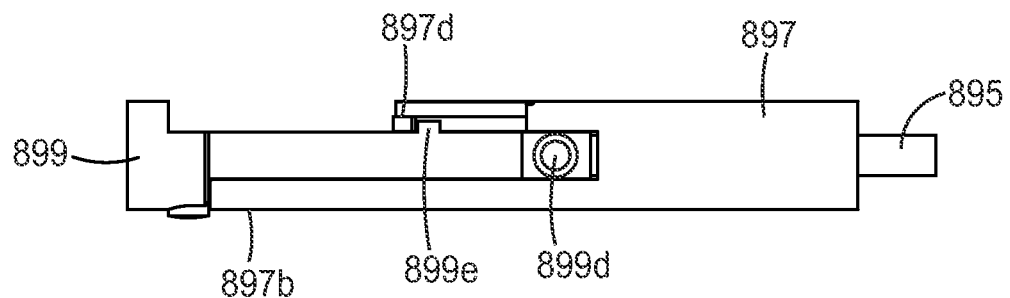
Figure 36C:
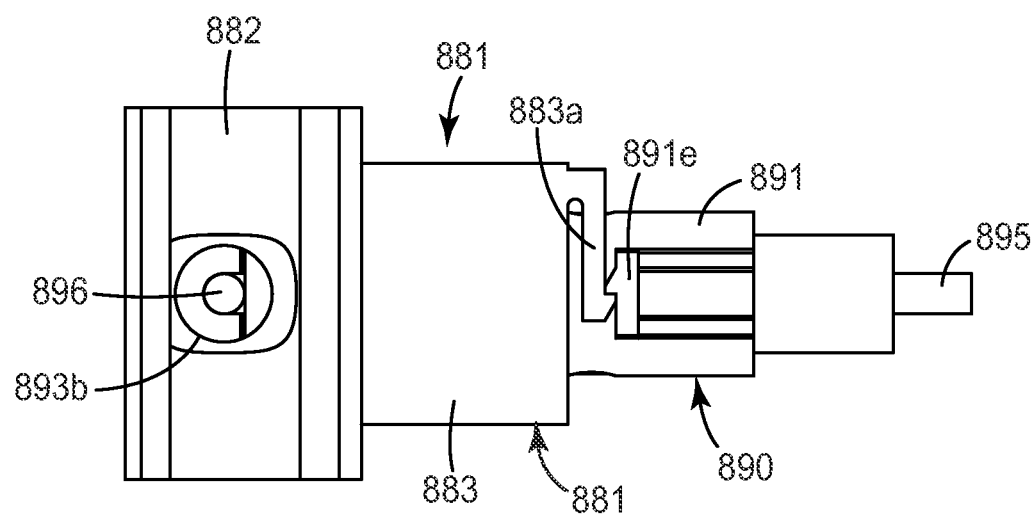

FIG. 34B is a cross-sectional view of an exemplary coaxial tap connector 880 on a section of adhesive backed coaxial cable 160 (with the adhesive layer not shown). FIGS. 35A-35C are several alternative views of exemplary coaxial tap connector 880. FIGS. 36A-36C are several views showing particular aspects of components of the exemplary coaxial tap connector.

Coaxial tap connector 880 comprises a cable engagement body 881 and a detachable tap portion 890. Cable engagement body 881 includes a clip portion 882 and a socket portion 883 oriented perpendicular to the clip portion. Clip portion 882 is configured to fit onto and over the outer shape of adhesive backed coaxial cable 160. The clip portion is configured to engage with conduit portion 162 via a snap fit. The clip portion of coaxial tap 880 can be mounted on the coaxial cable at nearly any midspan location on adhesive backed coaxial cable 160 allowing maximum flexibility in antenna placement. Clip portion 882 can be generally C-shaped such that it substantially covers conduit portion 162 of the coaxial cable. The clip portion can further include a lip 882a disposed along one edge of the C-shaped clip portion. The lip engages with the edge of flange 164 of the coaxial cable 160 to ensure proper alignment co coaxial tap connector 880 when it is attached to the coaxial cable.

The socket portion 883 is a generally tubular section having a passageway 884 extending therethrough that is perpendicular to coaxial cable 160. In the exemplary aspect shown in FIGS. 34A-B and 35A-C, the socket portion can have a larger diameter at its entrance and a smaller diameter disposed over coaxial cable to guide the cutting edge of tap portion 890. Passageway 884 includes interior threads 885 which engage with the external threads 891b on tap portion 890.

Figure 37A:
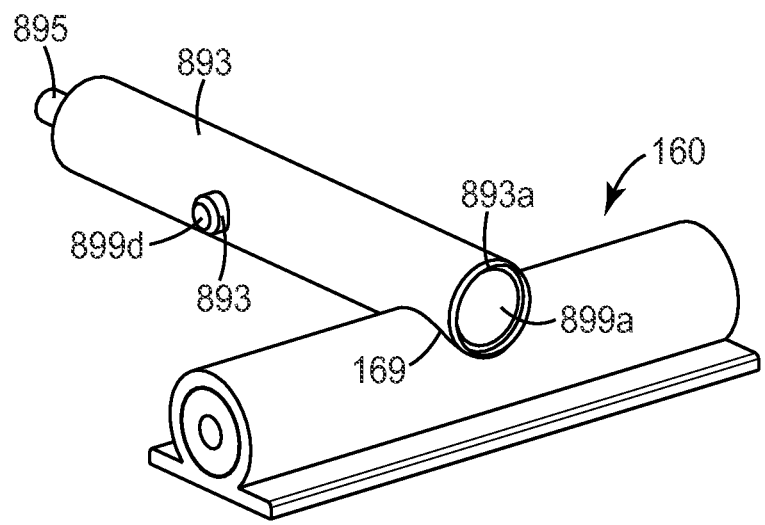
FIGS. 37A and 37B show views of the cutting edge of the exemplary coaxial tap connector of FIG. 34A accessing the interior of the coaxial cable according to an aspect of the invention.
Figure 37B:
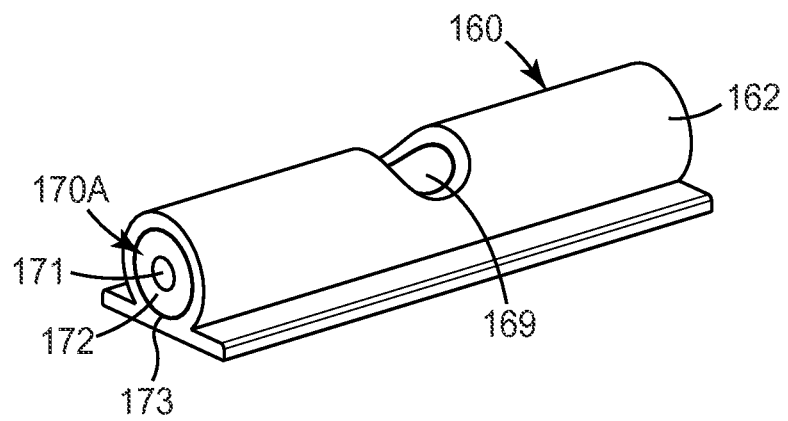

Tap portion 890 is configured to engage with socket portion 881 and to saddle cut a trough 169 into the coaxial cable. Referring to FIG. 37B, trough 169 is cut through the conduit portion 160 and well into the coaxial core structure 170a of the cable. Thus, the trough is cut through the shielding layer 173 and almost down to inner conductor 171. The final penetration through the remaining dielectric material will be made by the conductor pin of the tap connector 880.

Tap portion 890 includes a generally cylindrical tap body 891 having a passage 891a extending there through, a shielding tube 893 having a cutting edge 893a disposed on one end of the shielding tube, and a conductor pin 895 inserted into the shielding tube and electrically isolated from the shielding tube by insulating plug 897 and insulating clip 899.

Tap body 891 further includes an external threaded portion 891b disposed at a first end of the tap body which engages with internal threads 885 in the socket portion 883 of the cable engagement body 881. Tap body 891 also includes a plurality of torsion tabs 891d extending from the surface at the second end of the tap body. The torsion tabs provide a gripping/leveraging mechanism for the technician to use during the tapping of the coaxial cable enabling a tool-less installation of coaxial tap connector 880. Securing catch 891e can be disposed adjacent to the torsion tabs such that it can engage with flexing arm 883a (FIGS. 35B and 36C) on the socket portion 883 of the cable engagement body 881 to prevent the tap body and cable engagement body from becoming detached after installation of coaxial tap connector 880. Tap body 891 can further include a pair of alignment holes 891c located on opposite sides and through wall of the tap body about midway along the lateral length of the tap body.

Shielding tube 893 additionally includes a contact opening 893b to allow the contact point 896 of conductor pin 895 to protrude through it when the conductor pin is installed within the shielding tube. The shielding tube can further include a pair of alignment holes 893c through the shielding tube and located on opposite sides of the shielding tube about midway along the lateral length of the shielding tube. In an exemplary embodiment, shielding tube 883 is made of an electrically conductive material. For example, shielding tube 883 can be made from a length of stainless steel, copper or aluminum plated copper tubing having a thickness of 0.012 in. that has had the circumferential edge at one end of the tube sharpened to make a cutting edge capable of cutting through the conduit portion 162, the shielding layer 173 and the dielectric layer 172 of coaxial cable 160 as illustrated in FIGS. 37A and 37B.

Conductor pin 895 is generally L-shaped having a contact point disposed on an end thereof. The function of the contact point is to make electrical contact with the inner conductor 171 of adhesive backed coaxial cable 160 as shown in 34B. The conductor pin is held within the shielding tube and is electrically isolated from the shielding tube by insulating plug 897 and insulating clip 899.

Insulating clip 899 is a generally U-shaped member wherein the two arms of the U-shaped member are joined by pushing portion 899a and are separated from one another by gap 899C. In addition, insulating clip 899 includes a number of latching devices to secure all of the internal components (i.e. shielding tube 893, conductor pin 895, insulating plug 897 and insulating clip 899) of tap portion 890 within tap body 891. The first of the latching devices are pegs 899d which are disposed on the outside and near the end of the two arms of the U-shaped member.

The tap portion 890 of coaxial tap connector 880 is assembled by sliding the shielding tube 893 into tap body 891 until the cutting edge extends beyond the first end of the tap body (i.e. the end having the external surface thereof) such that alignment holes 893c, 891c of the shielding tube 893 and tap body 891 are aligned. Insulating clip 899 is slid into the open end of shielding tube 893 adjacent to cutting edge 893a until the pegs on the end of the arms of the U-shaped member snap into the aligned alignment holes 893c, 891c securing the tap body, shielding tube, and an insulating clip together.

Conductor clip 895 is slid into the second end of shielding tube 893 (i.e. the end opposite the cutting edge) and into the gap 899c between the arms of insulating clip 899 such that the contact point emerges through contact opening 893b as shown in FIGS. 34A and 34B. The insulating plug 897 is slid into the second end of the shielding tube until it catches on the second latching device (e.g. catch prongs 899e) as shown in FIG. 36B.

Insulating plug 897 has a tube portion 897e having an opening 897a therethrough and a platform portion extending longitudinally from one end of the tube portion. The opening in tube portion 897e and guide channel 899c in the platform portion help to keep contact pin 895 concentrically disposed in tap body 891. Insulating plug 897 also includes a catch finger 897d that is configured to engage with catch prongs 899e on the conductor clip as shown in FIG. 36B to secure the insulating plug within the tap portion. When the coaxial tap connector 880 is fully assembled, there is a free space 879, as shown in FIG. 34B, above the platform portion of the insulating plug and the conductor pin. This free space allows conductor pin 895 to apply a spring force to contact point 896 when the tap portion is fully engage with socket portion 881 ensuring good electrical contact between the contact point and the inner conductor 896 of coaxial cable 160.

In one exemplary aspect, each antenna should operate roughly at the same power level, and have the same loss/noise figure on uplink.

Figure 38A:
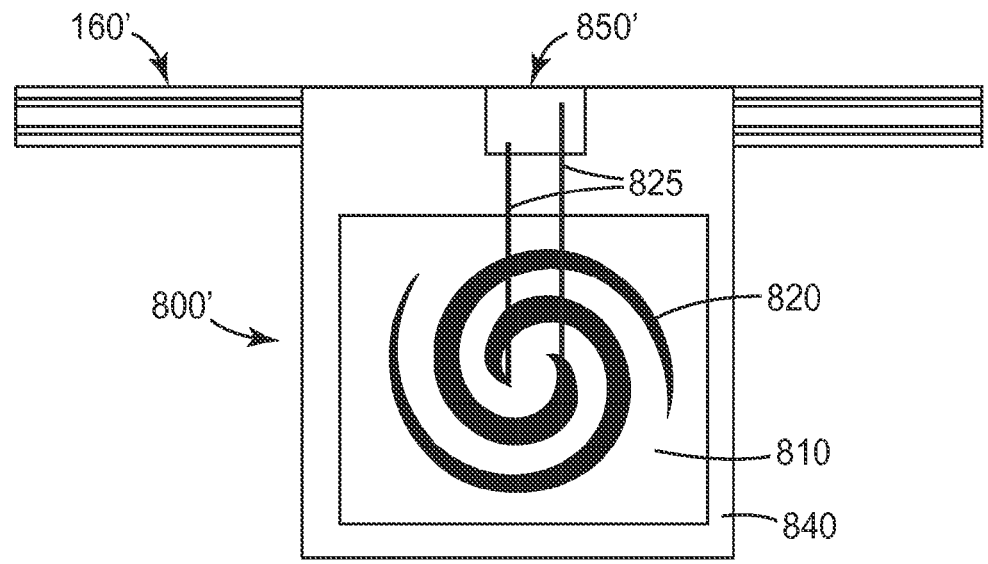
FIGS. 38A and 38B are schematic drawings of an alternative distributed antenna assembly according to an aspect of the invention.
Figure 38B:
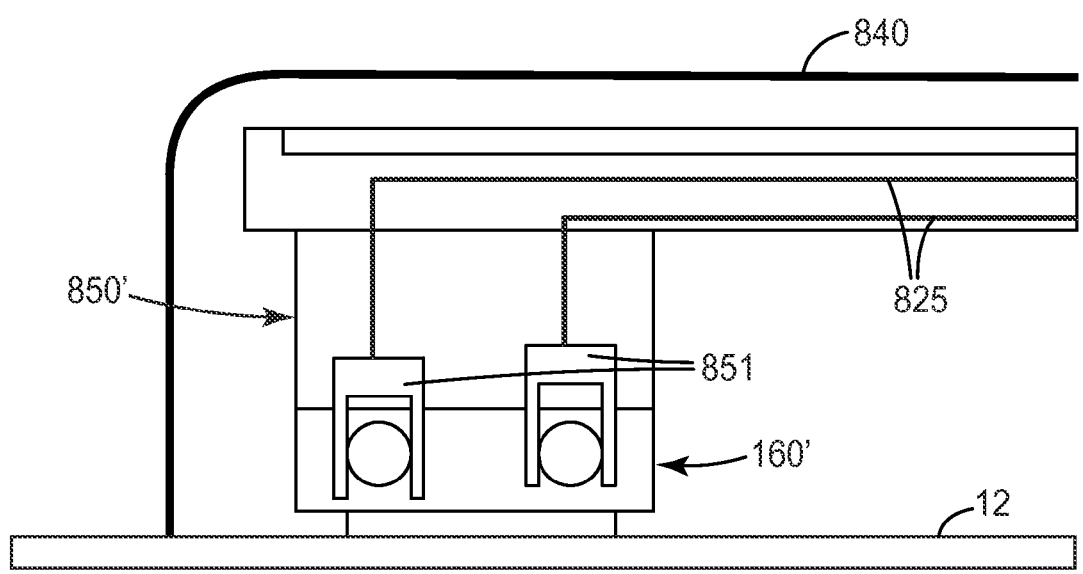

FIGS. 38A and 38B are schematic views of an alternative distributed antenna assembly according to an aspect of the invention. In an exemplary aspect, antenna 800' will be wall mounted and connected to an adhesive backed twin core coaxial cable 160' by a connection mechanism 850'. The twin core coaxial cable can be coaxial cable 160" shown in FIG. 7C or an adhesive backed twin lead cable.

The antenna assembly includes a radiating or antenna element 820 formed on a substrate 810, a differential feed transmission line 825 and a connection mechanism 850'. The substrate can be a printed circuit board having the antenna element 820 formed on a first major surface thereof. The antenna element can be a spiral antenna, a planar inverted F antenna, or a patch antenna. The exemplary spiral antenna is a broad band, differentially fed and balanced antenna structure. In one exemplary aspect, substrate 810 can be a printed circuit board where in the signal routing can take place in the traces of the board. In an alternative aspect, the substrate can be a flexible film substrate.

The connection mechanism can comprise a pair of insulation displacement contacts (IDCs). The antenna housing 840 can be used to provide the mechanical lever force to assist with the insertion of the IDCs into twin lead cable 160'. The housing tool will insert the IDCs to the proper depth within the twin core coaxial cable. Such a tool-less antenna connection allows the antenna to be placed anywhere along the cable path without special preparation of the cable.

The inventive converged in-building network provides a number of advantages. The wired and wireless networks can be installed at the same time, using common system components that promote ease of installation and synergy between networks. The adhesive backed cabling can be installed below the ceiling, providing for cable routing and management in buildings where modern drop ceilings are not present without having to fish cables through existing walls. The remote socket can facilitate "plug and play" connection of remote electronics (radios) by simultaneously connecting several types of communication media in a single motion. The 'plug and play' aspect of the remote/socket means that new radios can be installed in the system without changing any of the cabling to and from the remote radio. This feature facilitates maintenance of the radios and upgrade of the radios to the next generation of service (for example from 2G to 3G, or 3G to 4G, etc). The inventive system is further designed with components that allow for tool-less connection of antennas to installed adhesive backed cables.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A remote socket apparatus, comprising:
a socket to receive a remote electronics unit, wherein the socket is configured to house multiple media to connect to remote electronics housed in the remote electronics unit, wherein the multiple media includes one or more insulated copper wires for providing power to the remote electronics unit, cabling for RF signal distribution, and cabling for RF signal transmission to antennas, the socket including a socket interface configured to mate with a remote electronics unit interface, wherein at least one of the socket and remote electronics unit further includes an actuation mechanism configured to connect the multiple media simultaneously in a single action.

2. The remote socket apparatus of claim 1, wherein the cabling for RF signal transmission to antennas comprises at least one of one or more coaxial cables, one or more twin-axial cables and one or more twin lead cables.

3. The remote socket apparatus of claim 1, wherein the cabling for RF signal distribution comprises at least one of one or more optical fibers, one or more twisted pair wires, and one or more coaxial cables.

4. The remote socket apparatus of claim 1, wherein the cabling for RF signal distribution is provided from horizontal cabling accessed at the socket location.

5. The remote socket apparatus of claim 4, wherein the socket is mounted overtop the horizontal cabling.

6. The remote socket apparatus of claim 1, wherein the socket includes a cover and a generally planar support plate that is mountable to a wall.

7. The remote socket apparatus of claim 6, wherein the actuation mechanism is disposed in the socket and comprises a pivoting support bar structure coupled to extendable guide rails configured to engage the remote electronics unit interface.

8. The remote socket apparatus of claim 7, wherein the actuation mechanism lowers the extendable guide rails when the support bar structure is moved away from the support plate.

9. The remote socket apparatus of claim 7, wherein the actuation mechanism raises the extendable guide rails when the support bar structure is moved towards the support plate.

10. The remote socket apparatus of claim 7, wherein the actuation mechanism lowers the extendable guide rails when pivoting arms disposed opposite one another are pulled in a direction apart from each other in a plane parallel to the support plate.

11. The remote socket apparatus of claim 7, wherein the actuation mechanism raises the extendable guide rails when pivoting arms disposed opposite one another are pushed in a direction toward each other in a plane parallel to the support plate.

12. The remote socket apparatus of claim 1, further comprising a slack storage structure supported by the actuation mechanism, the slack storage structure configured to store and route excess lengths of optical fibers.

13. The remote socket apparatus of claim 12, wherein the slack storage structure comprises a plurality of slack storage reels supported on a rotatable frame.

14. The remote socket apparatus of claim 1, wherein the socket interface comprises a multi-piece structure that includes an interface body supported by an interface backbone, the interface body having a plurality of ports to receive multiple media connectors.

15. The remote socket apparatus of claim 14, wherein the interface body is formed from a molded plastic and the interface backbone is formed from a metal.

16. The remote socket apparatus of claim 14, wherein the socket interface body includes at least one coaxial connector having a coaxial cable coupled to a distributed RF antenna.

17. The remote socket apparatus of claim 16, wherein the coaxial cable comprises an adhesive-backed cable.

18. The remote socket apparatus of claim 1, wherein the one or more copper wires are coupled to horizontal cabling via a power tap and one or more power connectors disposed on the socket interface.

19. The remote socket apparatus of claim 4, wherein the cabling for RF signal distribution comprises a plurality of optical fibers, the optical fibers being terminated via field terminated optical connectors.

20. The remote socket apparatus of claim 19, wherein the field terminated optical connectors comprise LC connectors disposed in an LC connector adapter mounted in the socket interface.

21. The remote socket apparatus of claim 20, wherein the LC connector adapter is secured to the interface via lead-in mount members having a tapered construction for guiding approaching LC connectors into the LC connector adapter during a connection process.

22. The remote socket apparatus of claim 1, wherein the remote electronics unit comprises a remote radio circuit for wireless signal distribution.

23. The remote socket apparatus of claim 1, wherein the remote electronics unit comprises one of a wireless access point for Wi-Fi transmission and a low power wireless sensor.

24. The remote socket apparatus of claim 1, wherein the remote electronics unit interface comprises a multi-piece structure that includes an interface body supported by an interface backbone, the interface body having a plurality of ports to receive multiple media connectors.

25. The remote socket apparatus of claim 24, wherein the interface body is formed from a molded plastic and the interface backbone is formed from a metal.

26. The remote socket apparatus of claim 7, wherein the remote electronics unit interface comprises engagement slots located near edges of the remote electronics unit interface, each engagement slot configured to receive an engagement pin disposed on an end of the extendable guide rail.

27. The remote socket apparatus of claim 22, wherein the remote electronics unit comprises a remote electronics unit cover to enclose the remote electronics unit, wherein the remote electronics unit cover includes a plurality of vents to permit air passage in and out of the remote electronics unit.

28. The remote socket apparatus of claim 22, wherein the remote electronics unit comprises a support plate to support the remote electronics.

29. The remote socket apparatus of claim 28, further comprising guide fingers extending from a top portion of the support plate to provide an installer with a gross alignment prior to actuating a connection.

30. The remote socket apparatus of claim 1, wherein the actuation mechanism is disposed in the remote electronics unit.

31. The remote socket apparatus of claim 30, wherein the actuation mechanism comprises a folding arm structure coupled to extending guide rails configured to engage the socket interface.

32. The remote socket apparatus of claim 22, wherein, when the remote electronics unit interface is fully connected to the socket interface, the remote radio circuit is connected to one or more distributed RF antennas, one or more RF signal carriers, and one or more power lines.

33. The remote socket apparatus of claim 1, further comprising a central guide pin disposed in a central portion of the socket interface, the central guide pin configured to be received by a central guide port formed in the remote electronics unit interface, the central guide pin configured to prevent a sideways slide of the interfaces with respect to each other during connection.

34. The remote socket apparatus of claim 1, wherein at least one of the socket interface and the remote electronics unit interface includes a small, pluggable optical-to-electrical transceiver.

35. The socket of claim 1, wherein the socket contains an integrated antenna that transmits or receives wireless signals.

36. The socket of claim 1, wherein the socket interface includes a guide mechanism extending from a mating surface of the socket interface, the guide mechanism including resilient member.

37. The socket of claim 1, wherein at least one of the socket interface and remote electronics interface includes a keying feature to prevent incompatible electronics units from being mated at the remote socket.

38. A socket for receiving a remote electronics unit having a remote electronics unit interface, comprising:
  a socket interface having a plurality of ports to receive a plurality of connectors that accommodate different types of media, wherein the different types of media includes one or more insulated copper wires for providing power to the remote electronics unit, optical fiber cabling for RF signal distribution; and cabling for RF signal transmission to antennas;
  means for supporting the socket interface in the socket; and
  means for connecting the multiple connectors disposed in the socket interface to corresponding connectors disposed in the remote electronics unit interface simultaneously in a single action.

* * * * *